US012570103B2

(12) United States Patent
Godfrey et al.

(10) Patent No.: US 12,570,103 B2
(45) Date of Patent: Mar. 10, 2026

(54) SECURITY DEVICES AND METHODS OF MANUFACTURE THEREOF

(71) Applicant: DE LA RUE INTERNATIONAL LIMITED, Basingstoke (GB)

(72) Inventors: John Godfrey, Basingstoke (GB); Rebecca Locke, Basingstoke (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 0 days.

(21) Appl. No.: 18/026,060

(22) PCT Filed: Sep. 10, 2021

(86) PCT No.: PCT/GB2021/052362
§ 371 (c)(1),
(2) Date: Mar. 13, 2023

(87) PCT Pub. No.: WO2022/053827
PCT Pub. Date: Mar. 17, 2022

(65) Prior Publication Data

US 2023/0364935 A1 Nov. 16, 2023

(30) Foreign Application Priority Data

Sep. 11, 2020 (GB) ..................................... 2014325
Sep. 11, 2020 (GB) ..................................... 2014326
(Continued)

(51) Int. Cl.
*B42D 25/324* (2014.01)
*B41M 3/14* (2006.01)
(Continued)

(52) U.S. Cl.
CPC ........... *B42D 25/324* (2014.10); *B41M 3/148* (2013.01); *B42D 25/29* (2014.10); *B42D 25/351* (2014.10);
(Continued)

(58) Field of Classification Search
CPC .... B42D 25/324; B42D 25/29; B42D 25/351; B42D 25/369; B42D 25/425; B42D 25/46; B42D 25/382; B42D 25/387; B41M 3/14
(Continued)

(56) References Cited

U.S. PATENT DOCUMENTS

2006/0107854 A1 5/2006 Bauer et al.
2008/0024846 A1 1/2008 Tompkin et al.
(Continued)

FOREIGN PATENT DOCUMENTS

CA 2 841 862 A1 1/2013
DE 11 2010 003 249 T5 5/2013
(Continued)

OTHER PUBLICATIONS

Mar. 10, 2022 Combined Search and Examination Report issued in British Patent Application No. 2112959.8.
(Continued)

*Primary Examiner* — Justin V Lewis
(74) *Attorney, Agent, or Firm* — Oliff PLC

(57) ABSTRACT

A security device is provided, including: a surface relief structure formed of one or more cured materials on a substantially flat substrate, the surface relief structure defining a primary set of relief elements at a first scale and a secondary set of relief elements at a second scale which is smaller than the first, the primary set of relief elements including a plurality of raised protrusions spaced by recesses and the secondary set of relief elements being disposed on
(Continued)

the tops of at least one of the raised protrusions and/or in at least one of the recesses. A security device including a structure formed of cured material(s) and an embossed structure is also provided. Methods of manufacture are also disclosed.

13 Claims, 31 Drawing Sheets

(30) Foreign Application Priority Data

| | | |
|---|---|---|
| Sep. 11, 2020 | (GB) | 2014327 |
| Sep. 11, 2020 | (GB) | 2014328 |
| Sep. 11, 2020 | (GB) | 2014329 |
| Sep. 11, 2020 | (GB) | 2014330 |
| Sep. 11, 2020 | (GB) | 2014331 |

(51) Int. Cl.

*B42D 25/29* (2014.01)
*B42D 25/351* (2014.01)
*B42D 25/369* (2014.01)
*B42D 25/382* (2014.01)
*B42D 25/387* (2014.01)
*B42D 25/425* (2014.01)

(52) U.S. Cl.

CPC ......... *B42D 25/369* (2014.10); *B42D 25/382* (2014.10); *B42D 25/387* (2014.10); *B42D 25/425* (2014.10); *B41P 2200/10* (2013.01)

(58) Field of Classification Search

USPC ................................ 283/67, 72, 94, 98, 901
See application file for complete search history.

(56) References Cited

U.S. PATENT DOCUMENTS

| | | | | |
|---|---|---|---|---|
| 2008/0160226 | A1 | 7/2008 | Kaule et al. | |
| 2010/0109317 | A1 | 5/2010 | Hoffmuller et al. | |
| 2010/0194091 | A1 | 8/2010 | Heim et al. | |
| 2010/0320742 | A1* | 12/2010 | Hoffmuller ............ | B42D 25/29 428/156 |
| 2011/0045248 | A1 | 2/2011 | Hoffmuller et al. | |
| 2013/0175793 | A1 | 7/2013 | Mercier | |
| 2013/0182300 | A1 | 7/2013 | Muller et al. | |
| 2014/0290367 | A1 | 10/2014 | Domke et al. | |
| 2017/0165997 | A1 | 6/2017 | Holmes | |
| 2018/0178577 | A1* | 6/2018 | Lister ..................... | B42D 25/45 |
| 2019/0152244 | A1* | 5/2019 | Yamada ................... | B41N 1/06 |

FOREIGN PATENT DOCUMENTS

| | | | |
|---|---|---|---|
| DE | 102013015860 | A1 | 3/2015 |
| DE | 10 2017 010 060 | A1 | 6/2018 |
| EP | 0 420 261 | A2 | 4/1991 |
| EP | 2 445 726 | B1 | 10/2014 |
| EP | 2 886 356 | A2 | 6/2015 |
| EP | 3 401 117 | A1 | 11/2018 |
| GB | 2 480 227 | A | 11/2011 |
| GB | 2 486 994 | B | 3/2017 |
| GB | 2 594 300 | A | 10/2021 |
| JP | 2016-114776 | A | 6/2016 |
| WO | 2004/050376 | A1 | 6/2004 |
| WO | 2007/085808 | A1 | 8/2007 |
| WO | 2008/049533 | A2 | 5/2008 |
| WO | 2008/098753 | A1 | 8/2008 |
| WO | 2010149476 | A1 | 12/2010 |
| WO | 2011/000878 | A1 | 1/2011 |
| WO | 2011/017741 | A1 | 2/2011 |
| WO | 2013/010673 | A1 | 1/2013 |
| WO | 2016/016638 | A1 | 2/2016 |
| WO | 2017/009616 | A1 | 1/2017 |
| WO | 2017/009618 | A1 | 1/2017 |
| WO | 2017/009619 | A1 | 1/2017 |
| WO | 2017/009620 | A1 | 1/2017 |
| WO | 2017/055823 | A1 | 4/2017 |
| WO | 2018/011546 | A1 | 1/2018 |
| WO | 2018/153840 | A1 | 8/2018 |
| WO | 2018/206936 | A1 | 11/2018 |
| WO | 2019/063778 | A1 | 4/2019 |
| WO | 2019/063779 | A1 | 4/2019 |
| WO | 2019/153043 | A1 | 8/2019 |
| WO | 2020/030893 | A1 | 2/2020 |
| WO | 2020/070299 | A1 | 4/2020 |
| WO | 2020/070304 | A1 | 4/2020 |
| WO | 2020/156655 | A1 | 8/2020 |

OTHER PUBLICATIONS

Oct. 24, 2022 Examination Report issued in British Patent Application No. 2112959.8.

Mar. 23, 2022 International Search Report issued in International Patent Application No. PCT/GB2021/052364.

Mar. 23, 2022 Written Opinion of the International Searching Authority issued in International Patent Application No. PCT/GB2021/052364.

Mar. 10, 2022 Combined Search and Examination Report issued in British Patent Application No. 2112982.0.

Oct. 27, 2022 Examination Report issued in British Patent Application No. 2112982.0.

Mar. 22, 2022 International Search Report issued in International Patent Application No. PCT/GB2021/052362.

Mar. 22, 2022 Written Opinion of the International Searching Authority issued in International Patent Application No. PCT/GB2021/052362.

Mar. 11, 2022 Combined Search and Examination Report issued in British Patent Application No. 2112956.4.

Jan. 4, 2022 International Search Report issued in International Patent Application No. PCT/GB2021/052361.

Jan. 4, 2022 Written Opinion of the International Searching Authority issued in International Patent Application No. PCT/GB2021/052361.

U.S. Appl. No. 18/025,961, filed Mar. 13, 2023 in the name of Godfrey, J. et al.

U.S. Appl. No. 18/026,067, filed Mar. 13, 2023 in the name of Godfrey, J. et al.

Aug. 1, 2023 Combind Search and Examination Report issued in British Patent Applciation No. 2305182.4.

May 22, 2024 U.S. Office Action issued in U.S. Appl. No. 18/025,961.

Oct. 1, 2024 Notice of Allowance issued in U.S. Appl. No. 18/026,067.

Jul. 16, 2025 Notice of Allowance issued in U.S. Appl. No. 18/025,961.

Mar. 27, 2025 Office Action issued in U.S. Appl. No. 18/025,961.

* cited by examiner

SECURITY DEVICES AND METHODS OF MANUFACTURE THEREOF

CROSS-REFERENCE TO RELATED APPLICATIONS

The entire content of each of the six international patent applications filed on 10 Sep. 2021 in the name of De La Rue International Limited and claiming priority from the following British patent applications (each filed on 11 Sep. 2020) is hereby incorporated by reference: GB2014325.1, GB2014326.9, GB2014327.7, GB2014328.5, GB2014329.3, GB2014330.1 and GB2014331.9.

FIELD OF THE INVENTION

This invention relates to security devices such as may be used as a mark of authenticity associated with an object of value, such as a security document including banknotes, passports, certificates, licences and the like. Methods for manufacturing security devices are also disclosed.

BACKGROUND TO THE INVENTION

Objects of value, and particularly documents of value such as banknotes, cheques, passports, identification documents, certificates and licences, are frequently the target of counterfeiters and persons wishing to make fraudulent copies thereof and/or changes to any data contained therein. Typically such objects are provided with a number of visible security devices for checking the authenticity of the object. Examples include features based on one or more patterns such as microtext, fine line patterns, latent images, venetian blind devices, lenticular devices, moiré interference devices and moiré magnification devices, each of which generates a secure visual effect. Other known security devices include holograms, watermarks, embossings, perforations and the use of colour-shifting or luminescent/fluorescent inks. Common to all such devices is that the visual effect exhibited by the device is extremely difficult, or impossible, to copy using available reproduction techniques such as photocopying. Security devices exhibiting non-visible effects such as magnetic materials may also be employed.

One popular security feature found on many known security documents is a printed, tactile macro image such as a portrait, formed by intaglio printing. Intaglio printing lends itself well to the formation of tactile protrusions on traditional substrates such as paper. For instance, many banknotes in circulation carry an image, such as a portrait or an architectural drawing, applied by intaglio printing. Typically all or part of the image is formed of an array of image elements, such as fine lines or dots, which can be individually discerned under close inspection and/or magnification. The intaglio printing technique not only ensures high resolution and accurate reproduction of the image (which prevents the production of passable counterfeits by readily available commercial printing techniques), but can also be used to impart tactility to the image. This significantly increases the security level, since would-be counterfeiters may have access to highly accurate printing systems which can reproduce the visual appearance of an intaglio print, but not its three-dimensional quality and hence its haptics (feel). However, the tactility provided by intaglio printing is limited by the amount of ink that can be transferred to the substrate and the amount of thermal/pressure deformation that substrate can endure/retain. In particular, a polymer banknote has less thermal stability and cannot be embossed as much as paper. This results in a lower intaglio profile. There is therefore a desire to provide security features that overcome these drawbacks.

SUMMARY OF THE INVENTION

In accordance with a first aspect of the invention there is provided a security device, comprising: a surface relief structure formed of a one or more cured material(s) on a substantially flat substrate, the surface relief structure defining a primary set of relief elements at a first scale and a secondary set of relief elements at a second scale which is smaller than the first, the primary set of relief elements including a plurality of raised protrusions spaced by recesses and the secondary set of relief elements being disposed on the tops of at least one of the raised protrusions and/or in at least one of the recesses.

The security device according to the invention utilises a surface relief structure, formed of one or more cured material(s), that is formed on a substantially flat substrate. In other words, the relief elements of the surface relief structure in the present invention have not been formed by intaglio printing, where the substrate would exhibit local raised areas due to the embossing. The surface relief structure of the present invention is preferably formed by a casting process such as cast-cure. In this way, cast-cure structures can be used to replace intaglio. For example, intaglio trenches used in standard intaglio printing can be used for the casting emboss, with the height and width variable as per standard intaglio. In other words, relief elements which would conventionally be produced by trenches in an intaglio plate can instead be formed by cast-curing one or more suitable material(s) in a surface relief mould having recesses corresponding to the shape and arrangement of the intaglio trenches.

The present approach of using a surface relief structure formed of one or more cured material(s) provides a number of advantages over standard intaglio printing. For example, the cast-cure can be low temperature and low pressure (compared to standard intaglio printing). This means that the process is more substrate compatible as it does not deform the substrate. In other words, the surface relief structure is formed on a substantially flat substrate as detailed above (i.e. the substantially flat substrate does not exhibit localised raised areas which would be present following a conventional emboss process). This provides easier processing downstream of the casting process. For example, deformation of the substrate via standard intaglio printing typically makes registration of subsequent print processes more difficult to manage (an issue known as "flower-potting"). With the present technique, the relief elements of cured material are provided on a substantially flat substrate, which increases the ease with which subsequent print processes can be accurately and repeatedly performed, resulting in improved registration between different components of a security device or document.

As the present invention utilises cured material(s), set-off (the unwanted transfer of ink from one printed sheet to another)—which is common in production off intaglio inks on paper and polymer—can be avoided. Furthermore, the drying times of intaglio inks are long, and the use of cured materials in the present approach overcomes this disadvantage of conventional intaglio since the curing of the surface relief structure occurs substantially instantaneously.

Moreover, the use of cured material(s) means that the surface relief structure of the present invention is a much more faithful replication of the desired embossing, in contrast to intaglio where the replication of the structure is limited by the amount of ink that is able to be transferred from the intaglio plate/blanket to the substrate. In this way, the present invention allows greater flexibility in design and more tactile structures compared to conventional intaglio, thereby raising the security level of the device. Cast-cure may allow a surface relief structure that is a substantially exact replication of the embossing.

The use of conventional intaglio with optically variable (e.g. holographic) foils (particularly foil on polymer configurations) is limited due to set-off and potential damage of the foil gloss by the intaglio plates/blanket. Therefore, as compared to standard intaglio, the present invention is more compatible with additional security devices, particularly components susceptible to damage such as holographic foils.

Furthermore, the degradation of a surface relief structure formed on cured materials will be lower than that of a feature formed by intaglio. Therefore, a security device according to the present invention maintains its security level for an increased length of time compared to intaglio.

Consequently, the present invention overcomes a number of the known issues with the intaglio process.

The surface relief structure defines a primary set of relief elements at a first scale and a secondary set of relief elements at a second scale which is smaller than the first. For example, the secondary set of relief elements may define a plurality of peaks and depressions (e.g. a plurality of individual elements or as a continuous structure) on a single raised protrusion or within a single recess of the primary set of relief elements. The secondary set of relief elements are disposed on the tops of at least one (preferably at least some, more preferably each) of the raised protrusions and/or in at least one (preferably at least some, more preferably each) of the recesses. In embodiments, the secondary set of relief element are disposed on the tops of at least some of the raised protrusions and/or in at least some of the recesses. In other embodiments, the secondary set of relief elements are disposed on the tops of each of the raised protrusions and/or in each of the recesses.

In preferred embodiments, the secondary set of relief elements may be used to control the tactility of the surface relief structure. Thus, preferably, the secondary set of relief elements define tactile structure(s). The tactility level (e.g. the roughness or smoothness) of the tactile structures is typically configured to vary across the surface relief structure. For example, the tactility level may be configured to vary in accordance with an image that is exhibited by the relief elements of the surface relief structure (e.g. by the primary relief elements). The ability to control the perceived tactility (e.g. roughness or smoothness) of the cured surface relief structure across its domain provides a very secure device that is difficult or even impossible to produce using standard intaglio due to the limitations in ink transfer from the intaglio plate to the substrate. A tactile structure is preferably defined by a plurality (e.g. array) of individual secondary relief elements. In other embodiments, a particular (e.g. single) secondary relief element may exhibit a continuous relief of peaks and depressions at a smaller scale than the first scale to thereby define a tactile structure.

The tactility level may be configured to vary across the surface relief structure in a number of different ways. In some embodiments, the tops of the raised protrusions in a first region have a different (e.g. higher or lower) tactility level than those in a second region of the device. In other words, the secondary set of relief elements defining tactile structures are preferably disposed at least on the tops of the raised protrusions, with the tactile structures configured to provide different tactility levels across the surface relief structure. Herein, “top” is used to refer to the portion of a raised protrusion furthest from the substrate, independent of the device orientation. Such devices may be formed using a surface relief mould, where each “trench” or recess in the surface relief mould is provided with a sub-structure at its base which is on a scale within that of the individual element (trench). This may be a unique tactile sub-structure. Owing to the nature of the cast-cure process, this sub-structure will be replicated precisely on the top of the relief element which will be cast from the mould, in a manner which is not possible in intaglio. Hence the degree of tactility can be controlled and may be configured to be different on different elements within the surface relief structure.

Alternatively or additionally, recesses between the raised protrusions in a first region of the device may have a different (e.g. higher or lower) tactility level than those in a second region of the device. For example, the spaces between trenches on the mould could have a unique structure—e.g. a super smooth surface. These spaces will ultimately correspond to the recesses (e.g. regions of lower height) between raised protrusions in the cast surface relief structure. A sub-structure can be provided here to control the tactility, and will be replicated precisely in the cast material owing to the nature of the cast-cure process.

In some embodiments, both the tops of the raised protrusions and the recesses between the raised protrusions comprise tactile structures. The tactile structures on the tops of the raised protrusions may have a different (e.g. higher or lower) tactility level than those in the recesses between the raised protrusions.

Typically, the tactile structures define a tactility level dependent on at least one of the size, shape, orientation and/or spacing of the secondary set of relief elements. For example, the tactility level of a tactile structure may be dependent on at least one of the size, shape, orientation and/or spacing of the secondary set of relief elements making up the tactile structure. Secondary relief elements having a relatively small size and spacing (defining a “relatively fine” arrangement of secondary relief elements) will typically give a relatively low (e.g. “smooth”) tactility level, whereas secondary relief elements having a relatively large size and spacing (defining a “relatively coarse” arrangement) will typically give a relatively high (e.g. “coarse”) tactility level. The orientation of the secondary set of relief elements may also affect the tactility level, dependent upon the direction of travel of a user’s finger over the surface relief structure.

The use of a surface relief structure formed of one or more cured material(s) in the present invention (e.g. via cast-cure) advantageously allows for control of the secondary set of relief elements and enhanced design freedom in order to provide the desired tactile effect. In some embodiments, in at least one region of the surface relief structure (preferably all regions where the secondary set of relief elements are present), the size, shape, orientation and/or spacing of the secondary set of relief elements is substantially uniform. This may be a periodic arrangement of the secondary set of relief elements for example. Such an arrangement of the secondary relief elements provides a uniform tactility across the corresponding tactile structure (in a particular direction). Alternatively or in addition, in at least one region of the surface relief structure (preferably all regions where the secondary set of relief elements are present), the secondary set of relief elements may have an aperiodic (e.g. random) arrangement. This may provide further tactile effects.

In particularly preferred embodiments, in at least one region of the surface relief structure (preferably all regions where the tactile structures are present) the tactile structures have an asymmetrical arrangement whereby the tactility level in a first direction (e.g. across the tactile structures) differs from the tactility level in a second direction (e.g. across the tactile structures). The first and second directions are preferably perpendicular to each other. The asymmetrical arrangement of the tactile structures may be generated due to an asymmetrical arrangement of the secondary set of relief elements, or may be generated by the asymmetrical profile of a particular (e.g. continuous) secondary relief element defining the tactile structure. Such an arrangement will advantageously provide different sensations depending on the direction of movement of the user's fingertip over the surface relief structure. For instance, a structure may feel relatively smooth when the user passes their fingertip over the structure in one direction and relatively rough in the opposite, or perpendicular, direction. The tactile structures may provide such an asymmetrical arrangement in at least one of the size, shape, orientation and/or spacing of the secondary set of relief elements, whereby the tactility level in a first direction differs from the tactility level in a second direction. The ability to control the parameters of the secondary set of relief elements in this manner advantageously enables the complexity of the device to be increased, thereby increasing its difficulty to counterfeit.

In general, the secondary set of relief elements may have substantially any geometry that provides the desired tactile effect. This is a particular advantage of the use of cast-cure as the shape of the surface relief structure will exactly replicate the surface relief of the mould. In preferred embodiments, the secondary set of relief elements are in the form of at least one of: faceted structures such as (e.g. linear) prisms (e.g. having either a symmetrical or asymmetrical cross section), cubic structures, cones, pyramidal structures; curved structures; irregular structures. In some embodiments the secondary set of relief elements may comprise a further sub-structure at a smaller scale than the scale of the secondary set of relief elements, providing further control of the tactility, Preferably, the secondary set of relief elements have dimensions such that they are not discernible to the naked human eye. The unaided human eye is typically unable to resolve distances of less than 100 μm at typical viewing distances of the device (e.g. 30 cm). Therefore, the secondary set of relief elements typically have dimensions of less than 100 μm such that they are not readily discernible to the naked eye.

Typically, the secondary set of relief elements have a protrusion height (e.g. corresponding to the depth of the casting tool recess from which each element formed) of between 2 μm and 75 μm, preferably between 2 μm and 25 μm, more preferably between 2 μm and 10 μm. Preferably, the secondary set of relief elements have a width of between 2 μm and 75 μm, preferably between 2 μm and 25 μm, more preferably between 2 μm and 10 μm.

Thus far we have considered the case where the secondary set of relief elements define tactile structures. Alternatively or in addition, the secondary set of relief structures may define optical elements, preferably (e.g. an array of) faceted elements such as prisms or mirrors; focussing elements such as lenses or focussing mirrors; or a caustic structure. These devices may provide further optical effects. Such optical elements may be disposed on the tops of at least one of the raised protrusions and/or in at least one of the recesses between them. Such optical elements are typically located over a decorative layer or decorative mark (described in more detail below), whereby the optical elements and decorative layer/mark cooperate to exhibit an optically variable effect. For example, a decorative layer may define a microimage array and the optical elements may be in the form of an array of lenses, whereby the microimage array and lens array cooperate to exhibit a lenticular or moiré optically variable effect. The optical elements are typically refractive optical elements (e.g. focussing lenses), in which case the one or more cured materials are preferably at least partially transparent (e.g. to visible light), but may be in the form or reflective optical elements (e.g. focussing mirrors).

It is envisaged that the secondary set of relief elements may define both tactile structure and optical elements such that surface relief structure comprises a combination of tactile and optical structures.

As discussed above, the surface relief structure is typically formed by cast-cure techniques. Thus, typically, the (e.g. one or more) recesses between the raised protrusions comprise a base layer of the or another cured material(s), whereby the plurality of raised protrusions of the primary set of relief elements are joined by the base layer, the base layer having a lower height than the raised protrusions of the primary set of relief elements. In other words, an individual surface relief structure will comprise a continuous body of cured material with a varying height profile between the base layer and the relief elements. This would not be the case in a device having tactile protrusions formed of localised printed material (e.g. conventional intaglio), and therefore is a fundamentally different structure. This continuous nature of the surface relief structure needs to be taken into account in the design of the security device in order that it exhibits the desired optical effect, particularly when the cast-cure resin is dyed or pigmented.

The base layer typically has a thickness of between 0.5 μm and 1 μm. Preferably, a ratio of the height of at least one raised protrusion to the height of the base layer joining the raised protrusion to an adjacent raised protrusion is at least 20, and furthermore is preferably no greater than 400, preferably no greater than 200. In some embodiments, a ratio of the height of each raised element to the height of the base layer is at least 20, and furthermore is preferably no greater than 400, preferably no greater than 200. This is especially the case where the protrusions are configured to form image elements, particularly of multi-tonal images (such examples are described further herein).

In some embodiments, the base layer may extend over a peripheral region surrounding the raised protrusions. Such a peripheral region of base layer may in some cases be narrow, e.g. extending between 0.01 mm and 5 mm away from the plurality of raised protrusions. This might be the case if the device is disposed within a window region of a security document substrate defined by the localised absence of opacifying layers, for example. In other examples, the surface relief structure including the peripheral region of base layer may extend over a wider area, for example so as to act as a protective layer across a security document substrate or region thereof. In such examples the surface relief structure may extend over at least 5%, preferably at least 10% and even more preferably at least 50% of such a security document substrate. A preferred range is 10%-60%. The surface relief structure including the peripheral region of base layer may act as a protective layer over substantially the whole document substrate (similar to a varnish layer), in which case the surface relief structure may extend over at least 75% of the document substrate (including 100%).

Optionally, the height (or "thickness") of the base layer may vary across the surface relief structure. The height of the base layer could vary in a discrete manner (e.g. in the form of a "step change" where the height changes over a substantially zero lateral dimension), and/or in a continuous manner for example so as to define a sloped portion of the base layer. The additional complexity that may be added to the surface relief structure by varying the height of the base layer is typically not possible using conventional intaglio printing, thereby further increasing the security level of the presently disclosed devices. For example, varying the height of the base layer may allow tactile structures disposed on the tops of the raised protrusions to be at different relative heights above the substrate. As another advantage, the height of the base layer may be used to compensate for differences in thickness across a security document.

As discussed, the secondary set of relief elements may have varying parameters in order to control the tactile and/or optical properties exhibited by the device. In some embodiments, the heights and/or widths of the raised protrusions of the primary set of relief elements vary across the surface relief structure. This may provide additional tactile and/or optical effects. For example, in embodiments in which the secondary set of relief elements define tactile structures, varying the height of the raised protrusions allows tactile structures disposed on the tops of the raised protrusions to be located at different relative heights above the substrate, providing further variation and design freedom in the tactility level across the device. Variation in the height and/or width of the raised protrusions also allows further control of the tactility level across the surface relief structure. The height of the raised protrusions may vary within an individual raised protrusion, and/or across different raised protrusions (i.e one raised element has a different height from another).

The raised protrusions are typically large enough such that they can be individually discerned under close inspection (e.g. with a magnification aid). Typical lateral dimensions of the raised protrusions (e.g. corresponding to a linewidth of a line element) are in the range of 20 μm-8 mm (the upper limit being implemented for block prints for example), more preferably 30 μm-3 mm, even more preferably 30 μm-1 mm even more preferably 50 μm-500 μm. Typical spacings between raised protrusions are greater than 30 μm. Preferred heights of the raised protrusions are in the range of 20 μm to 200 μm, preferably 20 μm to 150 μm, more preferably 20 μm to 100 μm and even more preferably 20 μm to 50 μm. Due to the nature of the cast-cure process used to form the surface relief structure, these preferred dimensions may be implemented on both paper and polymer substrates, which provides a further advantage over conventional intaglio processes where the dimensions are typically dependent on the substrate.

In preferred embodiments, the plurality of raised protrusions of the primary set of relief elements correspond to elements of an image, preferably a screened image. In such embodiments, the raised protrusions of the primary set of relief elements may be referred to as raised elements. For instance, the raised elements could define a line-work (e.g. similar to a conventional line intaglio image) or a dot screen of image elements, such as a half tone screen. The elements may be (e.g. rectilinear or curvilinear) line elements, dot elements or define indicia such as letters, numbers, currency symbols (e.g. £, $ etc.). The image may comprise a Guilloche pattern. Desirably the image is a portrait or architectural drawing. Preferably, the image is of a 3D object or scene. In embodiments in which the image is a screened image, the elements of the image are preferably arranged on a regular grid, although in general the elements may or may not be arranged on a regular grid. Preferably, the size, shape, orientation, spacing and/or colour density of the raised protrusions (raised elements) vary across the surface relief structure so as to exhibit a multi-tonal version of the image. In this way, the image exhibited by the device may closely replicate conventional intaglio images. However, the raised elements may be in the form of a regular array that does not exhibit tonal variations. At least one of the raised elements may be in the form of a continuous or "block" print defining an element of the image.

In embodiments in which the secondary set of relief elements define tactile structures, these may advantageously provide additional tactility to the image. In particularly preferred embodiments, the secondary set of relief elements define tactile structures, and wherein the tactility level of the tactile structures is configured to vary across the surface relief structure in accordance with the image. This provides an additional security feature, advantageously further enhancing the security level of the device. For example, the tactile structures may be configured such that a particular region of the image exhibits a coarse tactility, and a different region of the image exhibits a finer tactility.

In some preferred embodiments, the secondary set of relief elements define tactile structures, and wherein the device comprises first and second regions that each exhibit substantially the same image, but wherein the tactility level of tactile structures in the first and second regions differ, preferably wherein the tactility level of the tactile structures in the first and second regions differ along a first direction. In alternative embodiments, the secondary set of relief elements define tactile structures, and wherein the device comprises first and second regions exhibiting different (preferably related) images, but wherein the tactile structures in the first and second regions are substantially the same. In such embodiments, the relationship of the visual and tactile effects across different regions of the device allows for a particularly secure device. The different regions may constitute different surface relief structures, or different regions of the same surface relief structure.

In some embodiments, the plurality of raised protrusions include a raised platform, and wherein the secondary set of relief elements are at least partly located on the raised platform. Such embodiments may be particularly preferred in cases where the secondary set of relief elements define optical elements such lenses, For example, a lens array may be disposed on the top of the platform, with the height of the raised platform being such that a decorative layer designed to cooperate with the lenses is located substantially within the focal plane of the lenses.

In some embodiments, the tops of the raised protrusions and/or the tops of the secondary set of relief elements have a substantially constant height across at least a part (preferably all) of the surface relief structure. For example, in embodiments where the secondary relief elements are disposed only in the recesses between the plurality of raised protrusions, the heights of the individual secondary elements may be such that the tops of the secondary elements and the tops of the raised protrusions are at substantially the same height across the surface relief structure (e.g. with respect to the substrate). In some arrangements the tactile structures may be disposed on the tops of the raised protrusions and in the recesses between them, and the heights of the individual secondary elements vary in accordance with the heights of the raised protrusions such that the tops of the secondary relief elements have a substantially uniform height above the substrate.

Such embodiments, which exhibit variations in tactility due to the variation in height of the individual secondary relief elements and/or raised protrusions, may advantageously compensate for differences in thickness across a security document due to the substantially uniform height of the tops of the raised protrusions and/or secondary set of relief elements (e.g. with respect to the substrate). This may advantageously improve ream shape and handling properties in downstream processes for example.

The one or more cured materials of the surface relief structure could be transparent and colourless (under standard white lighting), which may be desirable to provide a tactile feature which is only covertly visible as a result of reflections off its surface. Alternatively, the one or more cured material(s) may have a colour which is visible to the naked eye under at least some viewing conditions (preferably white light illumination, but alternatively under special illumination such as UV).

Preferably, the one or more cured material(s) is at least semi-transparent. As highlighted above, in embodiments where a base layer extends between the raised protrusions, the continuous nature of the surface relief structure needs to be taken into account in the design of the security device in order that it exhibits the desired optical effect (such as a multi-tonal or multi-coloured image). Here, the use of a cured material that is at least semi-transparent is desirable so that the base layer has low optical density. However, surface relief structures that are substantially opaque are also envisaged. The at least one cured material may be transparent and colourless. In embodiments, the at least one cured material preferably comprises a visible colourant. Typically, the at least one cured material carries a tint of at least one colour, i.e. the cured material is at least semi-transparent whilst having a colour visible under at least some viewing conditions. Such embodiments are particularly advantageous for exhibiting multi-tonal images, as the variation in the surface relief structure (e.g. varying size, shape, orientation, spacing and/or colour density of the raised protrusions corresponding to elements of the image) means that the perceived colour intensity varies across the surface relief structure(s).

In some embodiments, the at least one cured material comprises a machine-readable substance. Examples of suitable machine readable substances (e.g. that react to an external stimulus) include any luminescent, fluorescent or phosphorescent material, or a material which exhibits Raman scattering. Magnetic materials may be used. In this way, the surface relief structure of the device may be detected by a detector configured to detect the machine-readable substance ("taggant"). Typically, the external stimulus required and/or the emission of the machine readable substance is outside the visible range of the electromagnetic spectrum (typically in the infra-red, IR, or ultraviolet, UV, ranges), such that detection of the machine readable substance does not occur under standard visible light conditions. This advantageously increases the security level of the device as a would-be counterfeiter not only needs to replicate the tactility exhibited by the surface relief structure but also the machine-readable emission. Moreover, the detection signal varies in accordance with the amount of taggant present. Preferably, the amount of the machine readable substance present in each region of the surface relief structure varies according to the height of the region with respect to the substrate (e.g. the thickness of cured material in that region), whereby the detection signal likewise varies in accordance with the height of the surface relief structure. This can generate a machine-readable code. Such a variation of the detection signal corresponding to the height of the surface relief structure provides further increases in security level. Furthermore, this may allow improved quality control during manufacture of the devices, since the detection signal from the machine readable substance can be analysed in order to assess the quality of the structure (as well as a determination as to whether the structure is present or absent). In embodiments in which the curable material comprises a machine readable substance, the amount of machine readable substance present (e.g. dependent on both the particle size of the taggant and its concentration) is preferably sufficiently low that the curable material is optically clear. It has been found that (e.g. transmission) haze values of less than 50%, preferably less than 30%, more preferably less than 10%; and/or optical density values of less than 0.3, preferably less than 0.15, more preferably less than 0.05 are preferred.

In some embodiments, the device may further comprise a decorative layer formed on a first and/or second surface of the substrate, where the surface relief structure at least partially overlaps with the decorative layer such that under at least some viewing conditions the decorative layer and the surface relief structure may be viewed in combination. Thus, at least at one viewing angle, an observer of the device will perceive the combined effect of both the decorative layer (or decorative layers) and the surface relief structure, with either the surface relief structure being positioned between the decorative layer and the observer, or the decorative layer being positioned between the surface relief structure and the observer. This enables further complex effects to be exhibited by the device, thereby further enhancing its security level.

The decorative layer may comprise one or more of: a print layer; an optically variable layer such as a colour shifting layer or a diffractive structure; a reflective (e.g. metallic) layer. In cases in which the decorative layer comprises a print layer, this is preferably in the form of a lithographic print working. For example, the surface relief structure may be disposed on a lithographic print working as part of a conventional banknote manufacturing process. However, such a print layer may be provided by other printing techniques such as gravure, offset, flexographic, inkjet or other convenient method. These print techniques may be described as providing "flat" print workings, i.e. they do not comprise a plurality of raised elements.

The decorative layer may comprise an optically variable layer such as a colour shifting layer or a diffractive foil. These are examples of fragile features that would conventionally have been difficult or impossible to combine with standard intaglio workings as the temperatures and pressures involved with the conventional intaglio process would typically damage such a feature. However, the present techniques employing cured materials (e.g. via cast curing) rather than embossing advantageously allows the combination of such optically variable features with the surface relief structure. By optically variable effect we mean an optical effect that varies with viewing angle, e.g. that varies upon tilting the device. Examples of colour shifting layers include layers incorporating liquid crystals (e.g. a liquid crystal film), interference pigments (including magnetically orientated interference pigments), pearlescent pigments, structured interference materials (including dielectric and Fabry-Perot structures), photonic crystals or thin film interference structures including Bragg stacks. A diffractive structure may be in the form of a diffractive optically variable image device ("DOVID"), such as a holographic foil or cast-cure hologram (e.g. with accompanying metallic or high refractive index layer). Other examples include nano-diffractive structures and plasmonic and other sub-wavelength structures.

The decorative layer could comprise a (e.g. printed) plasmonic ink or a metallic ink.

Particularly in embodiments in which the security device comprises a decorative layer, the invention also provides a plurality of substantially identical security devices, each as described above, in each of which the respective surface relief structures and decorative layers have the same position relative to one another. This arises from the two constituents being accurately registered to one another during manufacture. By "same position" it is meant that the relative position of the respective surface relief structures and print layers varies by an amount less than can be detected by the naked eye between the security devices, if at all. For example, the translational variation in the machine or cross-direction may be +/−75 μm or less. The skew variation is preferably 1 degree or less, more preferably 0.1 degree or less, still preferably 0.05 degrees or less, most preferably 0.02 degrees or less. The plurality of security devices will typically be produced sequentially on the same manufacturing line and according to the same design—for instance the plurality may include a whole batch of security devices, or the whole of a print run. The plurality may include at least 10 security devices, more preferably at least 100 security devices. Each security device of the plurality may ultimately be located on a different security document. Most preferably, the formation of the surface relief structure and the formation (e.g. printing) of the decorative layer (e.g. print layer) are simultaneous, taking place at the same position along the machine direction, at the same time. This achieves the highest level of registration between the two constituent parts of the security device, since there can be no slippage or distortion of the substrate occurring after one step is performed and before the other (since there is no interval between them). Suitable apparatus for performing simultaneous cast-curing and printing on opposite sides of a substrate is disclosed in WO-A-2018/153840 and WO-A-2017/009616. The level of registration that can be provided by simultaneous casting and printing using the apparatus disclosed therein cannot be achieved on a web press or in two separate processes.

In accordance with a second aspect of the invention, there is provided a security device, comprising a surface relief structure formed of one or more cured material(s) on a substrate and, on or adjacent the cured material(s) on the substrate, an embossed structure. Thus, a security device according to the second aspect of the invention may advantageously comprise both cast-cured elements and elements formed by conventional intaglio printing. Preferably the surface relief structure formed of one or more cured material(s) is applied first (e.g. by cast cure), and then the embossed structure is applied, although this could be reversed.

The embossed structure may be adjacent the cured surface relief structure. This may advantageously contrast two areas of tactility that can be achieved from both processes. If the cast-cured and embossed regions are located adjacent (preferably abutting) one another, the tactility contrast will be particularly well defined.

The embossed structure may be disposed on the cured material(s) on the substrate. For example, in embodiments the surface relief structure formed of the one or more cured material(s) defines a plurality of raised protrusions spaced by recesses and raised portions of the embossed structure are located in at least one (preferably at least some, more preferably each) of the recesses and/or on at least one (preferably at least some, more preferably each) of the raised protrusions. This provides further complex tactile effects in addition to those generated by the cured material(s). Typically, the recesses between the raised protrusions of the surface relief structure comprise a base layer of the or another cured material(s), the base layer preferably having a lower height than the raised protrusions of the surface relief structure. Hence, raised portions of the embossing may be located on recessed regions of base layer.

In some embodiments the surface relief structure formed of the one or more cured material(s) defines at least one platform, the platform being higher than the adjacent region, raised portions of the embossed structure being located on the platform and/or on the adjacent region. Typically, the adjacent region is a base layer regions of the surface relief structure. Locating the embossing on such a platform formed of the cured material(s) can advantageously improve the height range of embossed (e.g. intaglio) workings compared to standard intaglio, particularly on polymer substrates. Such embodiments are particularly advantageous as the raised platform allows an intaglio working of varying height to be formed using a single intaglio plate.

An elastomeric curable material may be used for the cast-cured elements to provide it with additional resilience to help withstand the embossing (e.g. intaglio) process, although this is not essential.

In preferred embodiments, the raised portions of the embossed structure comprise one or more inks. The inks may be coloured inks, for example having the same or different colour to the cured material(s) of the surface relief structure. However, in general the embossed structure may be inked or un-inked (i.e. a "blind" embossing).

Preferably, the embossed structure is formed by intaglio printing. The raised portions of the embossed structure may correspond to elements of an image, preferably a screened image. The image may be a multi-tonal and/or multi-coloured image. Typically, the raised protrusions of the cast surface relief structure correspond to elements of an (e.g. screened) image. The raised portions of the embossed structure and/or the raised protrusions of the cast surface relief structure may vary in at least one of size, shape, orientation, spacing and colour density so as to exhibit a multi-tonal image. In embodiments, both the cast surface relief structure and the embossed structure exhibit images, which images may complement each other or be component parts of the same common image.

In some embodiments of the second aspect, the surface relief structure formed of one or more cured material(s) defines a primary set of relief elements at a first scale and a secondary set of relief elements at a second scale which is smaller than the first, the primary set of relief elements including a plurality of raised protrusions spaced by recesses and the secondary set of relief elements being disposed on the tops of at least one (preferably at least some, more preferably each) of the raised protrusions and/or in at least one (preferably at least some, more preferably each) of the recesses. Preferably, the secondary set of relief elements define tactile structures as has been described herein. In preferred embodiments, the tactility level of the tactile structures is configured to vary across the surface relief structure in accordance with an image exhibited by the surface relief structure and/or the embossed structure. In other embodiments, the secondary set of relief elements may define optical elements.

In embodiments of the second aspect of the invention, the surface relief structure formed of one or more cured material(s) on a substrate may be a surface relief structure as defined in any of the embodiments discussed in the first aspect of the invention.

Further disclosed is a security device, comprising a surface relief structure formed of one or more cured material(s) on a substantially flat substrate, the surface relief structure following the contours of a three-dimensional image, preferably a portrait. Further preferred features of this aspect include:

Depth control of cast-cure allow better 3D representation of tactility—pseudo reliefs.

Produce fully 3D tactile structures—i.e. a contour map of a mountain or face profile.

In general, the substrate may comprise paper, polymer (e.g. biaxially oriented polypropylene, BOPP, or polycarbonate), cellulose or a combination thereof. Preferably the substrate is a polymeric substrate, optionally provided with one or more opacifying layers.

In accordance with a third aspect of the invention, there is provided a security document comprising a document substrate and a security device thereon, the security device being in accordance with any of the examples described above, wherein the document substrate may or may not act as the substrate of the security device, the document substrate preferably comprising paper, polymer, cellulose or a hybrid thereof. It will be understood that the security document could therefore include a single substrate, which acts as both the document substrate (i.e. the self-supporting sheet forming the body of the document) and as the security device substrate (i.e. that carrying the surface relief structure).

In preferred embodiments the security device is located at least in part in a window or half-window region of the document substrate, which has a lower optical density than the surroundings thereof. The window region may be a half window region, in which case the optical effect of the security device (for example where the raised protrusions of the primary set of relief elements correspond to elements of an image) may be observed in reflection, or transmission if the opacity of the non-transparent side of the half window is low enough for the transmission of light. The window may be a full widow, in which case the device is intended for viewing in transmission. In some embodiments, the security device may be located at least in part in a non-window region of the document substrate, which may be non-transparent and where the device is generally intended for viewing in reflection.

In preferred examples, the document substrate comprises a core polymer substrate with at least one opacifying layer disposed on one or both surfaces of the core polymer substrate, optional gaps in one or more of the opacifiying layers forming window or half-window regions of the document substrate. For example the security document could be a polymer banknote. The opacifying layers are preferably of non-fibrous materials such as a coating of binder containing light-scatting pigments, preferably white, off-white or grey in colour (such as $TiO_2$).

In some embodiments, the document substrate further comprises an integral decorative mark preferably at least partially overlapping with the surface relief structure. "Decorative marks" (unlike the decorative layer described above) are incorporated into the substrate during its production rather than during its later processing into security documents. For instance, the decorative mark may be applied during the same process as that by which the opacifying layers are applied, e.g. gravure printing. The decorative mark is integral to the document substrate. The integral decorative mark could be unrelated to the presently disclosed security device. However, preferably, the integral decorative mark at least partially overlaps with the surface relief structure (and/or with the embossed structure in embodiments in which the device comprises adjacent cured and embossed structures) such that under at least some viewing conditions the decorative mark and the surface relief structure may be viewed in combination. For example, the decorative mark and the surface relief structure may each define the same image and may be disposed in overlapping alignment with each other (e.g. in register). The decorative mark could be a watermark in a paper substrate. Although the decorative mark will most typically carry a colour that is visible in white light, it may have a colour visible under special illumination such as IR or UV. Although an integrated decorative mark will typically be in the form of a print working ("print mark") as described above, the decorative mark could comprise or be in the form of other elements or components such as an optically variable component (e.g. colour shifting layers or holographic foils) or reflective/metallic component as described above with reference to embodiments including decorative layers.

In cases where the security device is not formed directly on the document substrate, the security device substrate may be affixed to or incorporated into the document substrate, preferably over a transparent or translucent region of the document substrate optionally formed as an aperture. However, it is envisaged that a device may be affixed to the document substrate over a non-transparent region (e.g. over an opacifying layer region), in which case the device is designed to be viewed in reflection.

Preferably, the security document is any of: a banknote, passport, identification document, identification card, bank card, driving licence, visa, stamp, cheque or certificate.

In accordance with a fourth aspect of the invention, there is provided a method of manufacturing a security device, comprising forming a surface relief structure on a substantially flat substrate from a one or more curable material(s) and curing the material(s), wherein the surface relief structure is formed by: providing a casting tool having a relief structure defined in a surface thereof, the relief structure corresponding to the surface relief structure; applying the one or more curable material(s) to the substrate and/or to the relief structure of the casting tool; bringing the substrate and the casting tool together, to thereby form the curable material(s) in accordance with the relief structure and curing the curable material(s) such that the surface relief structure formed of the cured material(s) is retained on the substrate; wherein the surface relief structure defines a primary set of relief elements at a first scale and a secondary set of relief elements at a second scale which is smaller than the first, the primary set of relief elements including a plurality of raised protrusions spaced by recesses and the secondary set of relief elements being disposed on the tops of at least one (preferably at least some, more preferably each) of the raised protrusions and/or in at least one (preferably at least some, more preferably each) of the recesses.

This is a cast-cure process. The mode of curing will depend on the type of curable material used. In preferred examples the material is radiation-curable (e.g. UV-curable) and the curing step(s) will involve irradiating the material with appropriate wavelength radiation so as to cause cross-linking of the material. The curing of the curable material(s) may take place during and/or after bringing the substrate and casting tool together. The one or more curable material(s) are typically applied to the substrate or alternatively to the relief structure of the casting tool. However, in some embodiments the curable material may be applied to a combination of both the substrate and the casting tool, particularly if more than one curable material is being used. As the cast cure process does not have the same pressure/thermal constraints of intaglio printing, the surface relief structure may be formed at substantially any stage in the manufacturing process of the security device or security document, increasing the flexibility in the workflow. For example, the surface relief structure may be applied before or after conventional lithographic print workings or applications of foils in a banknote manufacturing process.

The method therefore provides a device exhibiting all of the advantages outlined above in relation to the first aspect of the invention.

Preferably, the relief structure of the casting tool comprises a plurality of trenches spaced by raised areas, the trenches corresponding to the primary set of relief elements, and wherein a base of at least one (preferably at least some, more preferably each) of the trenches and/or at least one (preferably at least some, more preferably each) of the raised areas (e.g. spaces) between the trenches are provided with a sub-structure that corresponds to the secondary set of relief elements. As previously discussed, the secondary set of relief elements preferably define tactile structures, such that the sub-structure of the casing tool forms tactile structures in the cast surface relief structure. Alternatively, the sub-structure of the casting tool may be used to form optical elements such as prisms, mirrors or focussing elements, as described above.

In accordance with a fifth aspect of the invention there is provided a method of manufacturing a security device, comprising: a) forming a surface relief structure on a substrate from one or more curable material(s) and curing the material(s), wherein the surface relief structure is formed by: a1) providing a casting tool having a relief structure defined in a surface thereof, the relief structure corresponding to the surface relief structure; a2) applying the one or more curable material(s) to the substrate and/or to the relief structure of the casting tool; a3) bringing the substrate and the casting tool together, to thereby form the curable material(s) in accordance with the relief structure and curing the curable material(s) such that the surface relief structure formed of the cured material(s) is retained on the substrate; and b) performing intaglio printing on the substrate to form an inked or un-inked embossing thereon, the embossing being located on or adjacent the surface relief structure.

The method therefore provides a device exhibiting all of the advantages outlined above in relation to the second aspect of the invention.

In the cast cure process described above in the fourth and fifth aspects of the invention, the one or more curable material(s) are applied to either the substrate or to the relief structure of the casting tool. In embodiments, the curable material(s) are applied to the relief structure of the casting tool so as to substantially completely fill recesses of the relief structure defined in the surface of the casting tool and form a layer of the curable material(s) over elevations of the relief structure. Substantially the whole body of curable material (including the parts inside the recesses and the layer over the elevations) will be cured and transferred onto the substrate. In other words, no removal ("doctoring") of the curable material(s) from the surface of the casting tool occurs which would otherwise remove the curable material(s) from the elevations, such that the surface relief structure retained on the substrate comprises an integral base layer of the curable material(s) between the raised protrusions, as described above.

However, in alternative examples, the curable material(s) are applied only to recesses of the relief structure of the casting tool, preferably through the use of a removal means such as a doctor blade, and the method further comprises, subsequent to applying the one or more cured materials to the relief structure and before bringing the substrate and casting tool together, applying a further layer of the or another curable material(s) to substantially the whole surface of the casting tool so as to improve the retention of the cured material(s) on the substrate. In such examples, the further layer acts to improve the adhesion of the curable material(s)—which are located only within the recesses of the casting tool relief structure—to the substrate. As the further layer is applied to substantially the whole surface of the casting tool (i.e. over the filled recesses of the relief structure in the surface of the tool and the elevations between them), the resulting surface relief structure comprises an integral base layer as described above. The curable material of the further layer may be the same curable material or materials used to form the elements of the surface relief structure, or may be a different curable material.

In a yet further aspect of the invention there is provided a method of manufacturing a security document, comprising providing a document substrate and either forming a security device on the document substrate or on a security device substrate affixed to or integrated within the document substrate, or forming a security device on a security device substrate, and then applying the security device substrate to or incorporating the security device substrate into the document substrate, in each case using one or more or the methods above to manufacture the security device. The method may be configured to provide a security document with any of the preferred features described above.

During manufacture of a security device or security document according to the invention, the substrate could be processed in the form of a web or a plurality of sheets.

Further disclosed herein is a security article comprising a security device according to any of the examples described above, preferably wherein the security article is security thread, strip, insert, foil or patch. The invention also provides a security document comprising such a security article.

Further disclosed is a casting tool for forming a surface relief structure formed of one or more cured materials, the casting tool having a relief structure comprising a plurality of trenches having a first scale, the trenches being spaced by raised areas, and wherein a base of at least one (preferably at least some, more preferably each) of the trenches and/or at least one (preferably at least some, more preferably each) of the raised areas between the trenches are provided with a sub-structure having a second scale that is smaller than the first scale. Such a casting tool may be used to manufacture a device according to the invention as described above, preferably by a cast cure process. The sub-structure typically comprises a plurality of sub-structure elements.

BRIEF DESCRIPTION OF THE DRAWINGS

Examples of security devices and security documents in accordance with the present invention, as well as their methods for their manufacture, will now be described with reference to the accompanying drawings, in which:

FIG. 8(*b*) is a cross-sectional view through a portion of the security device;

DETAILED DESCRIPTION OF THE DRAWINGS

The following description will focus on security devices formed directly on document substrates ultimately used as the basis for security documents such as banknotes, passports, certificates, licences, ID cards and the like. However, as will be explained with reference to FIG. 46(*b*), all embodiments of the security device could alternatively be formed on a separate substrate for later application to (or incorporation into) a security document.

Figure 1:
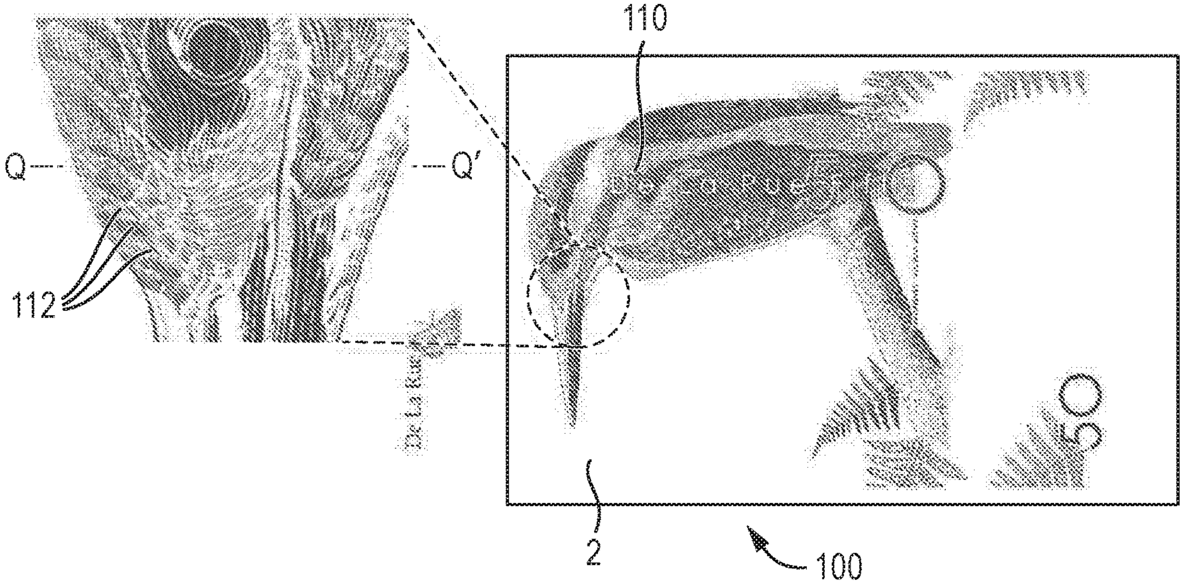
FIG. 1 shows an example of a conventional security device in the form of an intaglio print on a security document.

For comparison, FIG. 1 shows an example of a conventional security device in the form of an intaglio print 110 on a security document 100. FIG. 1 shows the security document 100 in plan view together with an enlarged portion of the intaglio print, and FIG. 2(*a*) shows a schematic cross-section along the line Q-Q'. It should be noted that, for simplicity, FIG. 2(*a*) does not show the embossed nature of the substrate which is caused by intaglio printing and will be present in practice. This is shown in the enlarged detail of FIG. 2(*b*). In this example, the intaglio print is shown as being formed on a document substrate 2 formed of an inner core substrate 2*a*, which may be a polymer material such as BOPP, and outer opacifying layers 2*b*, such as white ink. This is a typical construction of a polymer banknote substrate. However, intaglio prints 110 can be formed on any document substrate, including paper substrates.

As is shown in FIG. 1, in this example the intaglio print 110 comprises a linework image of a kingfisher. The image of the kingfisher is multi-tonal, being made up of an array of image elements 112 in the form of spaced ink lines of varying size and spacing, configured as necessary to convey the features of the image. With reference to FIG. 3, the intaglio process involves providing a printing plate 500 into which is etched all the lines 510 of the desired image elements 112 (shown in FIG. 3(*a*)). Ink 114 is applied to respective regions of the printing plate corresponding to the desired image elements 112 (FIG. 3(*b*)). The ink is forced into the etched lines 510 and cleaned off the intervening surfaces of the plate using a wiper blade or similar. The printing plate 500 is then applied to the substrate 2 against an impression roller (not shown) at high pressure, forcing the substrate 2 into the etched lines (FIG. 3(*c*)), thereby causing embossing of the substrate 2. Upon separation, the ink 114 is transferred from the printing plate onto the tops of the raised elements of the now-embossed substrate 2 (FIG. 3(*d*)). The raised elements and the ink carried thereon form the image elements 112 of the intaglio print 110. For completeness, FIG. 3 also schematically illustrates the process of "blind embossing" where no ink is applied to the printing plate 500, but the substrate is embossed as shown by the image elements 112 in region B of the substrate FIG. 3(*d*).

The embossed nature of the print 110 provides a tactile quality. However, the tactility provided by intaglio printing is limited by the amount of ink that can be transferred to the substrate 2 and the amount of thermal/pressure deformation that the substrate can endure/retain. In particular, a polymer-based substrate (as commonly seen on banknotes) has less thermal stability and cannot be embossed as much as paper, resulting in a lower intaglio profile. Furthermore, the conventional intaglio process causes a number of problems such as the difficulty of controlling subsequent print processes ("flower potting"), set-off and possible damage to frangible components such as optically variable inks and foils, as have been discussed above.

Figure 4:
FIG. 4 illustrates a further example of a printed feature that may conventionally be formed using intaglio printing.

FIG. 4 illustrates a further example of a typical printed feature which may conventionally be formed using intaglio printing, in plan view. In embodiments of the present invention features such as those shown in FIG. 1 and FIG. 4 may be formed by cast-curing a surface relief structure instead of (or as well as) intaglio printing. The examples shown in FIGS. 1 and 4 are screened, multi-tonal images made up of an array of screen elements—in this case line elements—which vary in thickness and/or spacing across the device so as to give the appearance of different tones. However, any image exhibited by the device need not be multi-tonal.

Figure 5A:
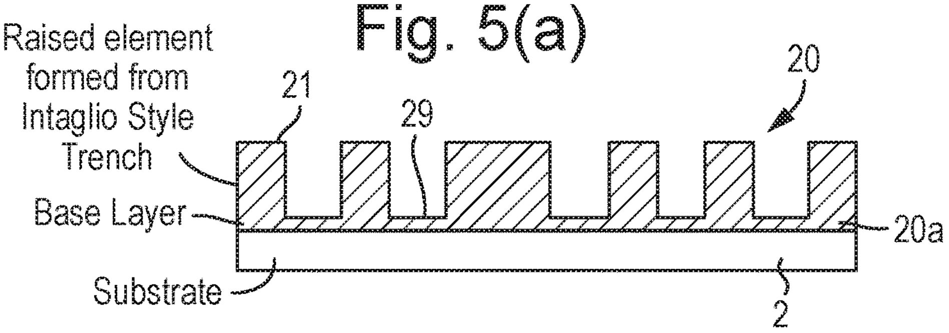
FIGS. 5(*a*) to 5(*c*) shows a cross-section through a portion of an example security device.
Figure 5B:
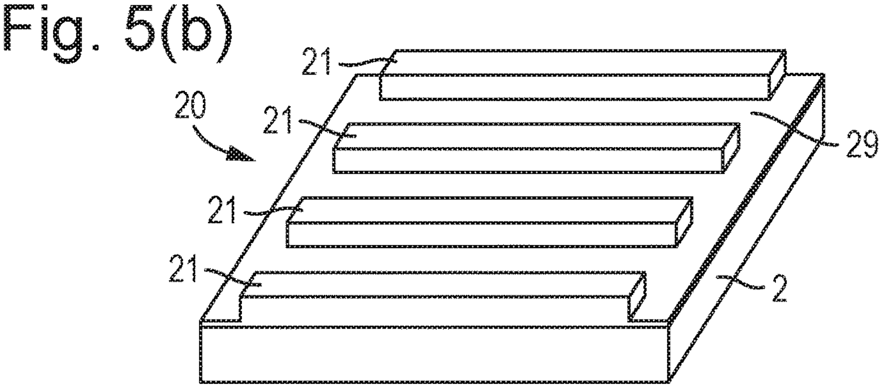
Figure 5C:
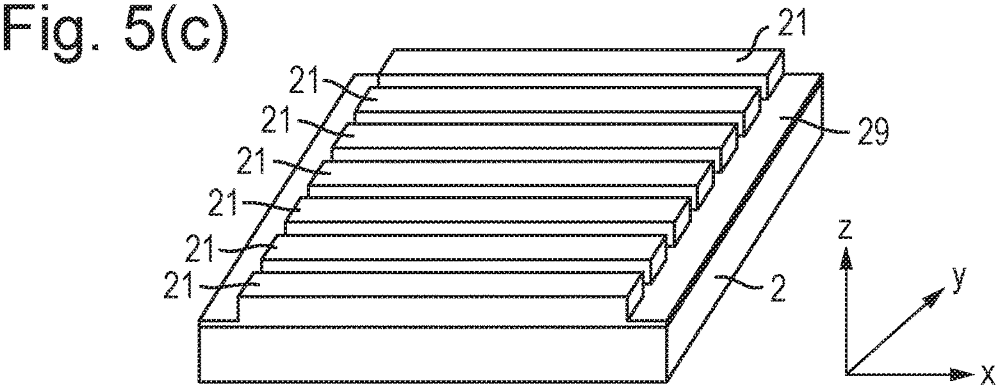

FIG. 5(*a*) shows a schematic cross-section through a portion of either device from which it will be seen that the individual elements 21 are formed as raised elements in a surface relief structure 20 formed of cured material 20*a*, by a cast-cure process. Preferably, the material is semi-transparent and carries a visible colourant so as to contrast with the underlying substrate. The base layer 29 of the material which extends between the raised elements 21 is preferably sufficiently thin so as to have a much lower optical density than the raised elements so that a contrast is visible between them.

The size, spacing and/or height of the raised elements 21 can be varied across the device through appropriate design of the casting mould so as to convey the desired screen image or other feature.

Typical parameters of conventional intaglio trenches used to form known print elements are given below. The relief on the casting tool used to form cast-cured raised elements in accordance with embodiments of the present invention can, if desired, be configured with the same or similar parameters:

For a Paper Substrate:

- Linewidth range for trenches that will contain ink/print are typically 50 μm-8 mm, more preferably 50 μm-3 mm, even more preferably 50 μm-1 mm
- Linewidth range for trenches that will contain embossing only (no ink) are typically 30 μm-8 mm, more preferably 30 μm-3 mm, even more preferably 30 μm-1 mm
- Minimum Gaps between trenches are typically 30 μm
- Depth range for trenches are typically 20-150 μm, more preferably 25-125 μm, even more preferably 35-90 μm For a Polymer Substrate:

- Linewidth range for trenches that will contain ink/print are typically 50 μm-8 mm, more preferably 50 μm-3 mm, even more preferably 50 μm-1 mm
- Linewidth range for trenches that will contain embossing only (no ink) are typically 30 μm-8 mm, more preferably 30 μm-3 mm, even more preferably 30 μm-1 mm
- Minimum Gap between trenches are typically 30 μm
- Depth range for trenches are typically 10-100 μm, more preferably 15-85 μm, even more preferably 20-55 μm.

Cast-cure can in theory match these parameters (and as discussed above is advantageously substrate-independent), the only limitation is the thickness of UV resin that can be cured effectively. Cast-cure does not have the depth limitations that intaglio has on polymer substrate. In particular, cast-cure techniques can produce larger, smaller and/or more complex structures than intaglio (so long as the curable material can be cured), as these processes are not limited by the ink, print, or embossing constraints of conventional intaglio.

In all of the embodiments it will be understood that the size (e.g. height, width), shape, orientation and/or spacing can vary between raised elements of the casting.

FIGS. 5(*b*) and 5(*c*) are perspective views through portions of respective devices illustrating a plurality of raised protrusions 21 joined by a base layer 29. The raised protrusions 21 are in the form of elongate line elements and may define image elements of a screened image for example. The raised protrusions may therefore be regarded as raised elements. In both cases, the surface relief structure 20 will have a relatively smooth tactility as a user runs their finger along the length of the raised elements in the direction of the x-axis. However, as the user runs their finger along the y-axis perpendicular to the length of the elements, the surface relief structures of FIGS. 5(*b*) and 5(*c*) will exhibit different tactility levels due to the difference in spacing between the elements, with the spacing in FIG. 5(*c*) being smaller (and therefore having a smoother tactility) than that of FIG. 5(*b*).

The security level of the device may be raised through the addition of various features. The control of the tactility exhibited by the surface relief structure may be increased through the addition of a sub-structure as will now be described. This additional control of the tactility advantageously increases the security level of the device.

Figure 6:
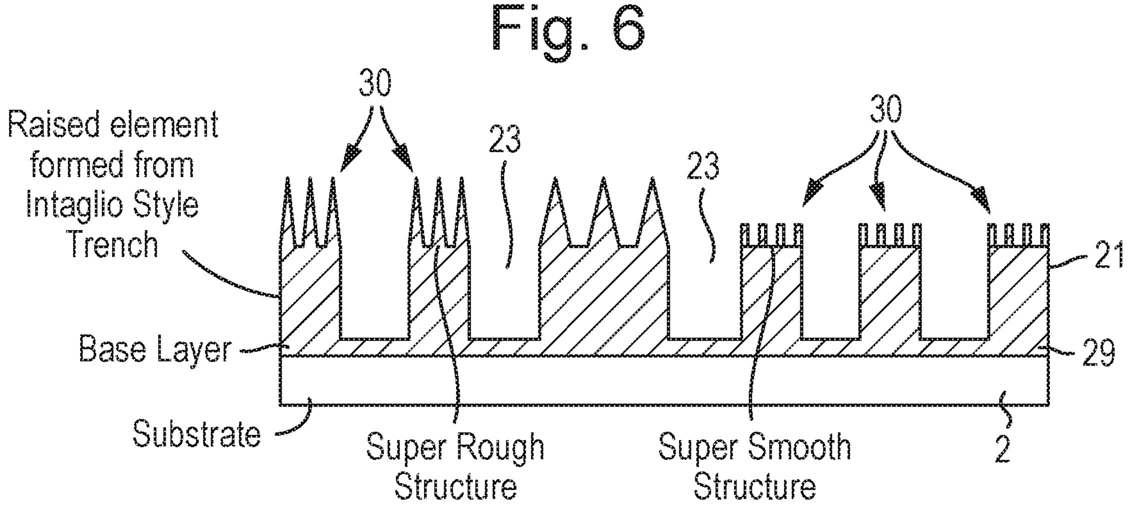
FIG. 6 shows a cross-section through a portion of a security device according to an embodiment of the invention.
Figure 7:
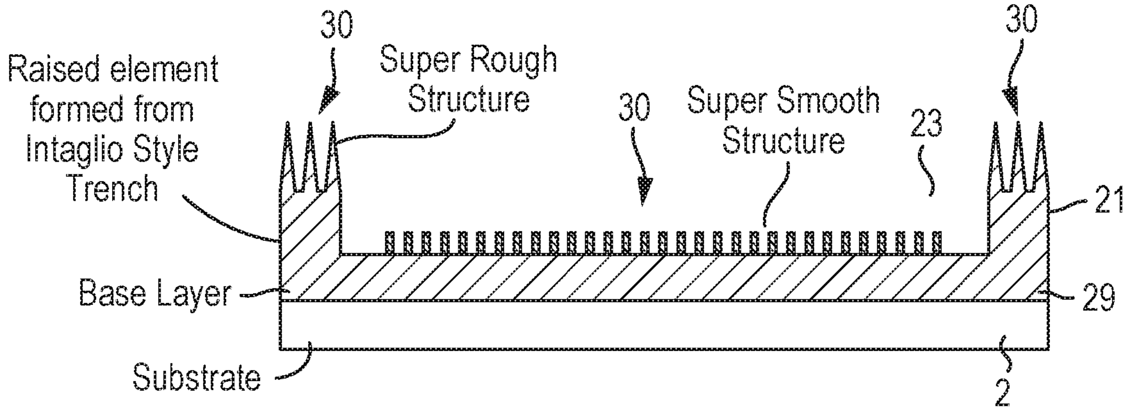
FIG. 7 illustrates a cross-section through a portion of a security device according to a further embodiment of the invention.

In FIGS. 6 and 7, a sub-structure (shown generally at 30) is provided on the tops of the raised elements 21 and/or on the base layer 29 in the recesses 23 between the raised elements 21. This sub-structure 30 is on a scale smaller than that of the relief elements 21 themselves, for instance defining multiple peaks and depressions on a single one of the raised element tops. This can be achieved by providing the casting mould with a suitable sub-structure relief inside the troughs from which the raised elements are to be cast. Due to the nature of the cast-cure process these will be faithfully replicated in the finished product.

It will be understood that the primary structures 21 (the raised elements) can vary from one another in the same device—e.g. having different heights and widths and/or shapes. Likewise, the secondary structures 30 (sub-structure) can also vary from one another in the same device—e.g. coarser/finer structure/tactility. All combinations of the two are also envisaged.

In the examples shown in FIGS. 6 and 7, the sub-structures 30 are tactile structures so that the degree of tactility can be controlled, and varied, if desired, across the security device. For instance, FIG. 6 shows an example in which the raised elements 21 in one region are equipped with a sub-structure on their tops which is relatively rough to the touch, and those in another region are relatively smooth. In the FIG. 7 example, the tops of the raised elements are made relatively rough while the recess 23 between them is provided with a tactile structure which feels relatively smooth. In preferred cases this is an asymmetric structure which feels smoother in one direction than the opposite. Such asymmetry will be discussed in further detail herein.

Figure 2A:
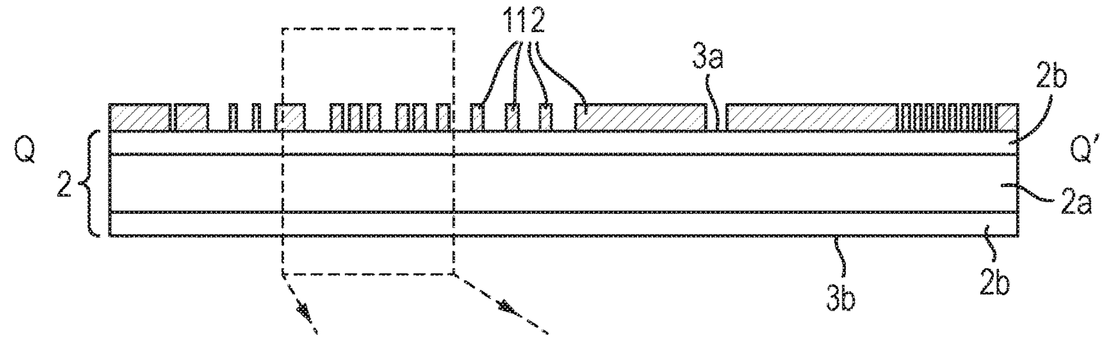
FIG. 2 shows a schematic cross section through the security device of FIG. 1.
Figure 2B:
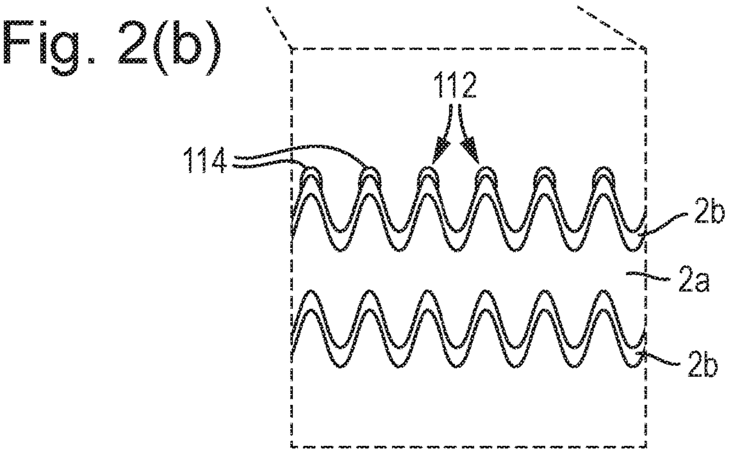
Figure 3A:
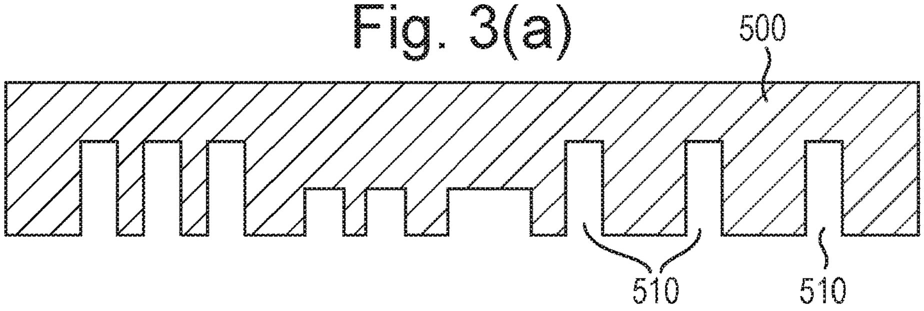
FIG. 3 schematically illustrates a conventional intaglio printing process.
Figure 3B:
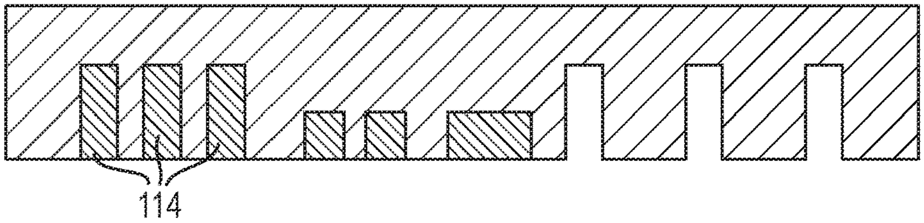
Figure 3C:
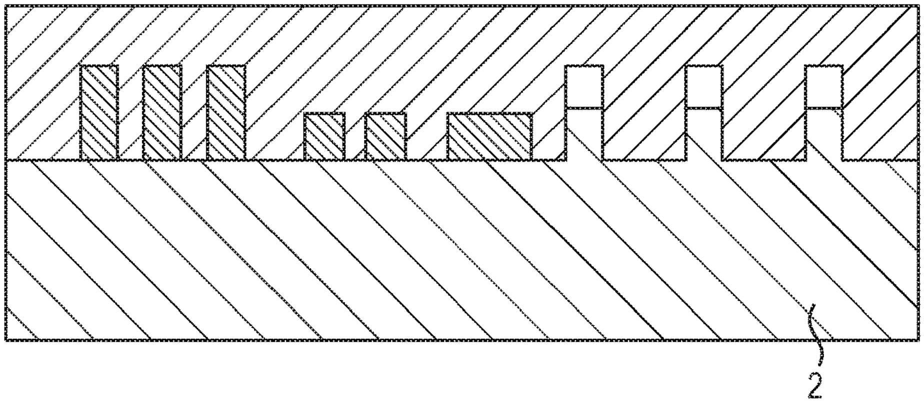
Figure 3D:
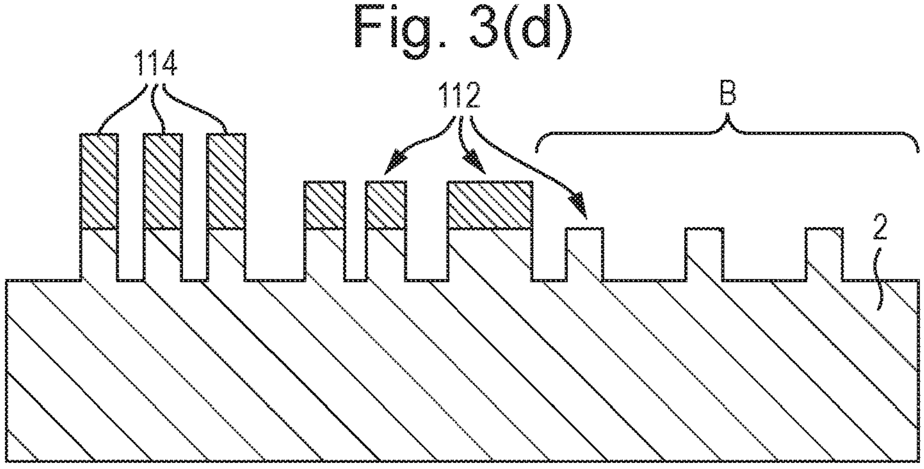
Figure 8A:
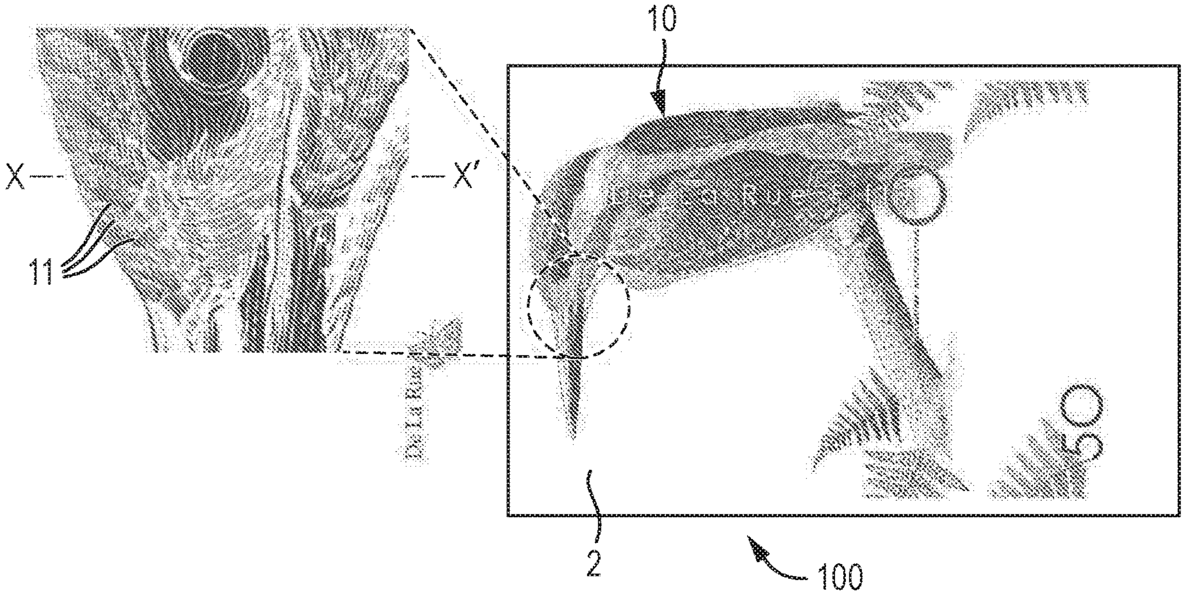
FIG. 8(*a*) shows an example embodiment of a security document having a security device 10 in accordance with the present invention, in plan view.
Figure 8B:
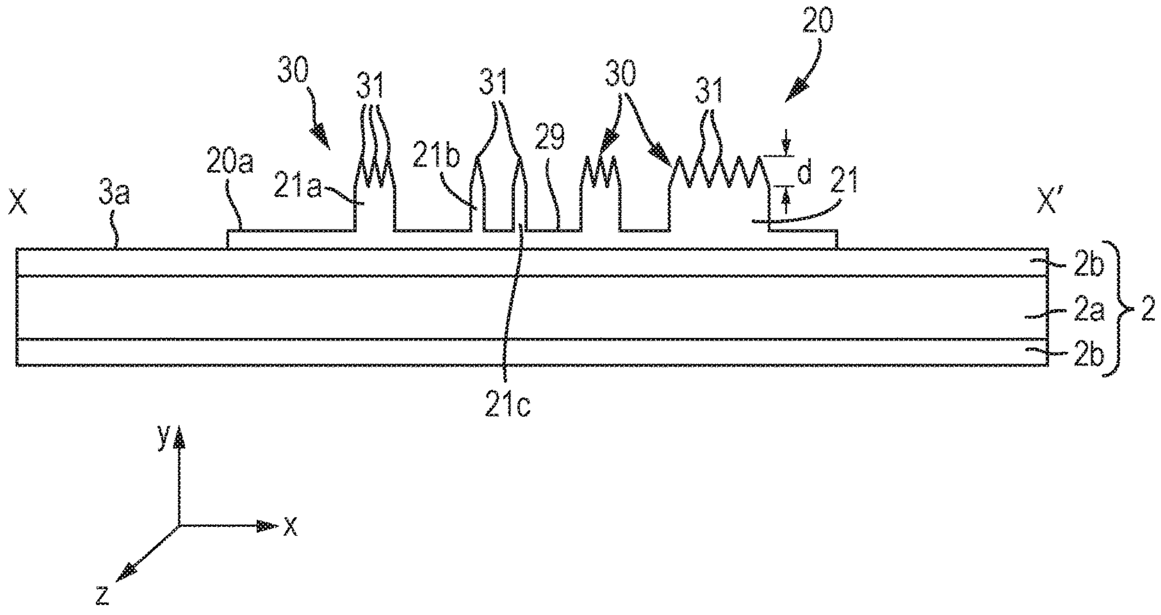

FIG. 8 shows an example embodiment of a security document 100 having a security device 10 in accordance with the present invention. FIG. 8(*a*) shows the document 100 and device 10 in plan view including an enlarged portion, and FIG. 8(*b*) illustrates a schematic cross section of the device 100 taken along the line X-X'. Again, in this example the document substrate 2 is shown as a multilayer substrate having a polymer core substrate 2*a*, which is transparent (e.g. BOPP), and opacifying layers 2*b* on either side. In practice multiple opacifying layers will be used to achieve the desired opacity. In this example, the security device 10 is provided in a non-window region (i.e. the opacifying layer is present on both sides of the polymer core substrate in the region of the device 10) and is intended to be viewed in reflection, although other arrangements of the device in window and half-window regions are envisaged as will be outlined in more detail herein. The substrate does not show the localised raised areas and depressions caused by embossing (as shown in FIG. 2(*b*)), and is therefore referred to as "flat".

The device 10 exhibits the same linework image (e.g. macro image) of a kingfisher as in FIG. 1, made up of an array of spaced image elements 11 which vary in e.g. size, shape and/or spacing across the image so as to convey the features of a multi-tonal screened image (e.g. the kingfisher's head, eye, beak etc. appear in different tones) as shown more clearly in the enlarged section of FIG. 8(*a*). The image elements are preferably of such a size that they are individually discernible under close inspection or low magnification.

As schematically illustrated in FIG. 8(*b*), the security device 10 comprises a surface relief structure 20 disposed on a first surface 3*a* of the substrate 2, where in this example the first surface 3*a* of the multilayer substrate 2 is a first surface of opacifying layer 2*b*. The surface relief structure 20 is formed of a continuous body of cured material 20*a* having a profile of varying height (parallel to the y-axis). The surface relief structure 20 comprises a primary set of relief elements in the form of raised protrusions 21. The raised protrusions correspond to the image elements 11 exhibited by the device, and therefore may be referred to as raised elements. Here, the raised elements vary in size and spacing across the surface relief structure 20 so as to convey the multi-tonal image of the kingfisher. For example, the raised elements 21*a* and 21*b* have a different size (e.g. a width parallel to the x-axis), and the spacing between raised elements 21*a* and 21*b* is greater than that between raised elements 21*b* and 21*c*. An observer of the device will perceive the corresponding regions of the image to exhibit different tones due to the variation in size and spacing of the raised elements 21, thereby exhibiting the multi-tonal image of the kingfisher shown in FIG. 8(*a*).

As can be seen in FIG. 8(*b*), the raised elements 21 of the surface relief structure are joined to one another by a base layer 29 of the same cured material 20*a*, which extends between each of the raised elements. The base layer 29 is an artefact of the cast-curing process by which the surface relief structure 20 is formed. The base layer is preferably sufficiently thin (in a direction parallel with the y axis) so as to have a much lower optical density than the raised elements 21 so that a contrast is visible between them. The height (e.g. "thickness") of the base layer 29 may be varied across the surface relief structure if desired to provide further optical effects due to the variation in optical density in regions of different base layer height.

Figure 9:
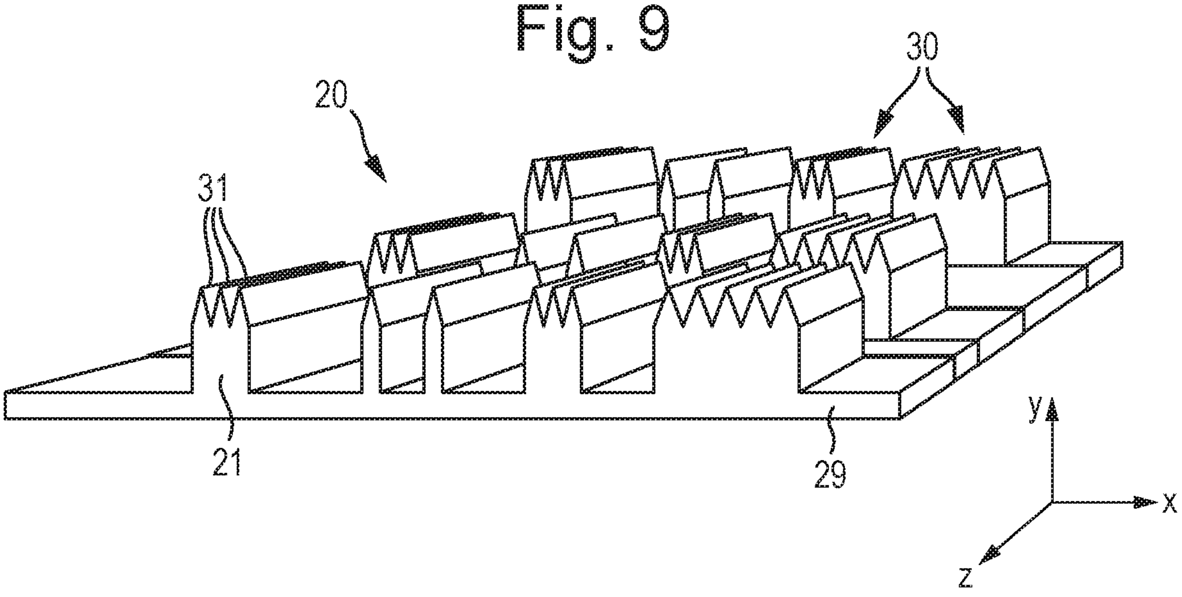
FIG. 9 is a perspective view of a portion of a security device according to an embodiment of the invention.

The surface relief structure 20 further comprises a secondary set of relief elements 31 that define tactile structures 30. In the region of the device X-X' illustrated in FIG. 8(*b*), the tactile structures 30 are disposed only on the tops of the raised elements 21, and the secondary set of relief elements (referred to here as "tactile protrusions") 31 are in the form of elongate symmetrical linear microprisms extending into the plane of the page, as shown more clearly in FIG. 9. Although the surface relief structure 20 will exhibit an inherent tactility due to the raised elements 21 (i.e. the primary relief structures), the tactile structures 30 provide additional control of the tactility experienced by a user. The tactile feel of the tactile structures 30 (e.g. how rough or smooth they are perceived to be) is defined at least partly by the height, spacing (pitch), shape and/or orientation of the tactile protrusions 31. The height, d, of an individual tactile protrusion 31 (e.g. here the distance between the top of the raised protrusion and the top of the tactile protrusion, "protrusion height") corresponds to the depth of the corresponding recess in the tool from which it is formed. In general, an increased height of the tactile protrusions 31 results in increased roughness of the corresponding tactile structure 30. An increased pitch of the tactile protrusions 31 generally results in increased roughness of the corresponding tactile structure 30. The shape of the tactile protrusions typically also contributes to the tactility level of the tactile structures. In the example shown in FIG. 8, the tactile structures 30 exhibit a relatively high level of tactility (roughness). The orientation of the tactile protrusions may also be used to control the perceived tactility of the device, particularly advantageously allowing directional control of the perceived tactility.

Where the tactile protrusions 31 are in the form of elongate linear microprisms, the resulting tactile structures 30 have an asymmetrical arrangement since the authenticator will perceive a difference in tactility level when running their finger along the surface relief structure in different directions. Referring to FIGS. 8 and 9, when the authenticator runs their finger across the surface relief structure 20 in the x-direction, they will experience a relatively rough texture due to the plurality of peaks and depressions defined by the microprisms. When running their finger along the z direction (i.e. along the length of elongation of the microprisms), the tactile structures will exhibit a smoother texture as the peaks and depressions defined by the microprisms will be less perceptible.

Figure 10A:
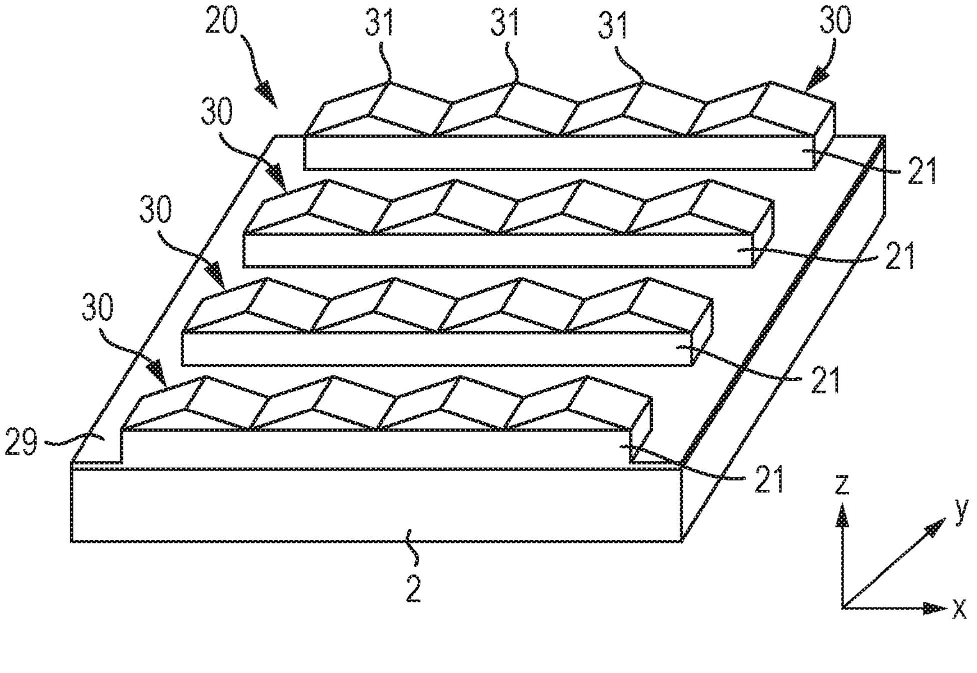
FIGS. 10 to 17 illustrate perspective views through portions of security devices according to various embodiments of the invention.
Figure 10B:
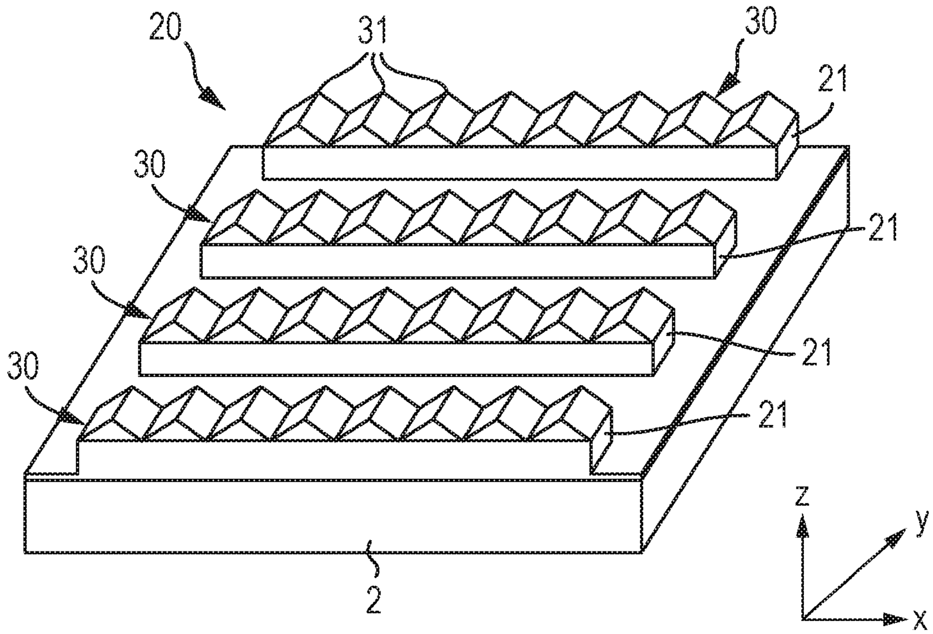
Figure 10C:
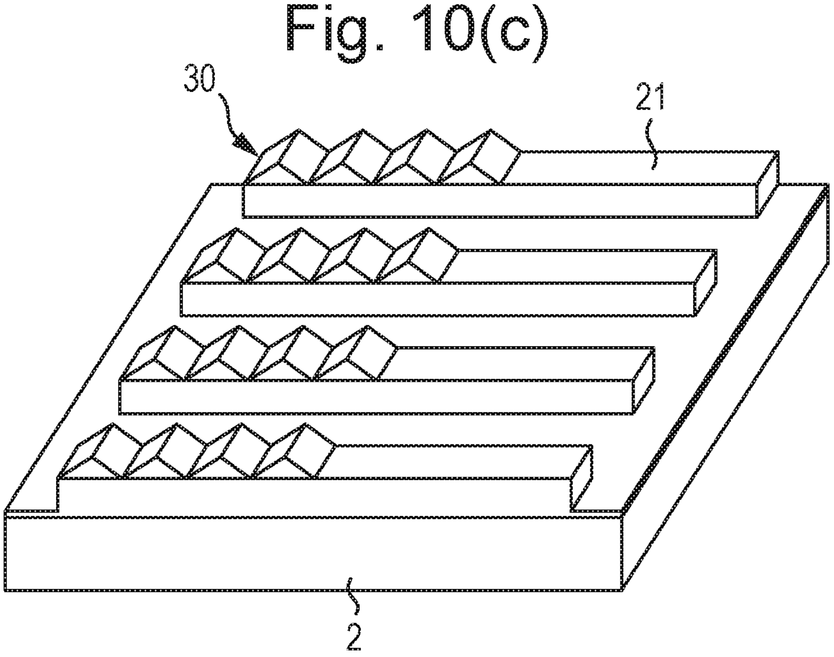

FIGS. 10 to 20 illustrate further examples of sub-structures 30 being disposed on the tops of raised elements 21. FIG. 10(*a*) illustrates a surface relief structure 20 having a plurality of raised elements 21 as shown in FIG. 5(*b*), with the tops of each raised element carrying a sub-structure 30 in the form of a tactile structure. The tactile structures 30 are each comprised of a plurality of tactile protrusions 31 in the form of symmetric linear microprisms orientated in a cross direction with respect to the direction of elongation of the linear raised elements 21. Thus, in contrast to the relief structure of FIG. 5(*a*), as the user runs their finger along the x-direction, the tactile structures 30 give rise to a coarser tactility. A different tactility level is also perceived along the y-axis.

In FIG. 10(*b*), the tactile structures 30 disposed on the tops of the raised elements 21 are again comprised of an array of linear microprisms 31, however with a smaller pitch (increased periodicity) compared to the tactile structures 30 of FIG. 10(*a*). Therefore, the surface relief structure 20 in FIG. 10(*b*) will have a lower tactility level along the x-axis compared to the structure of FIG. 10(*a*). The tactile structure 30 may cover only a portion of a respective raised element, as shown in FIG. 10(*c*).

Figure 11A:
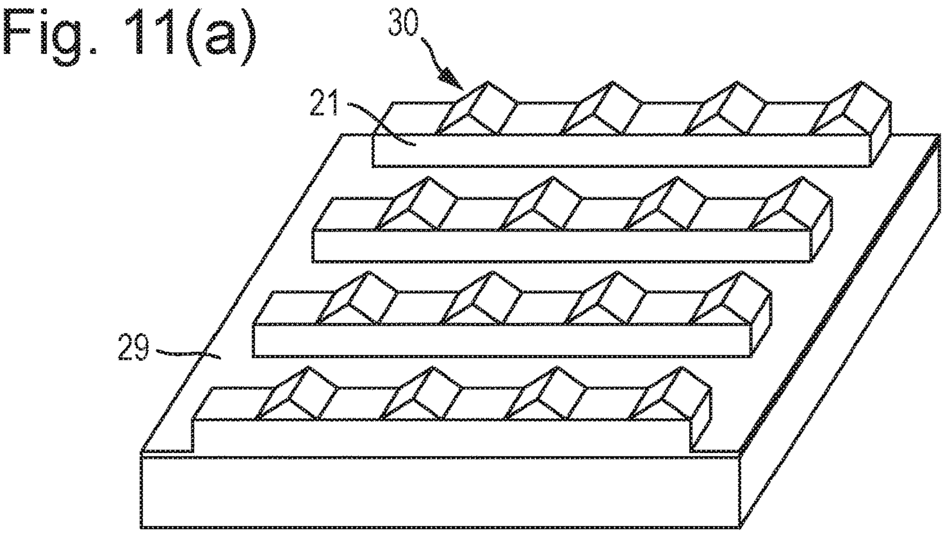
Figure 11B:
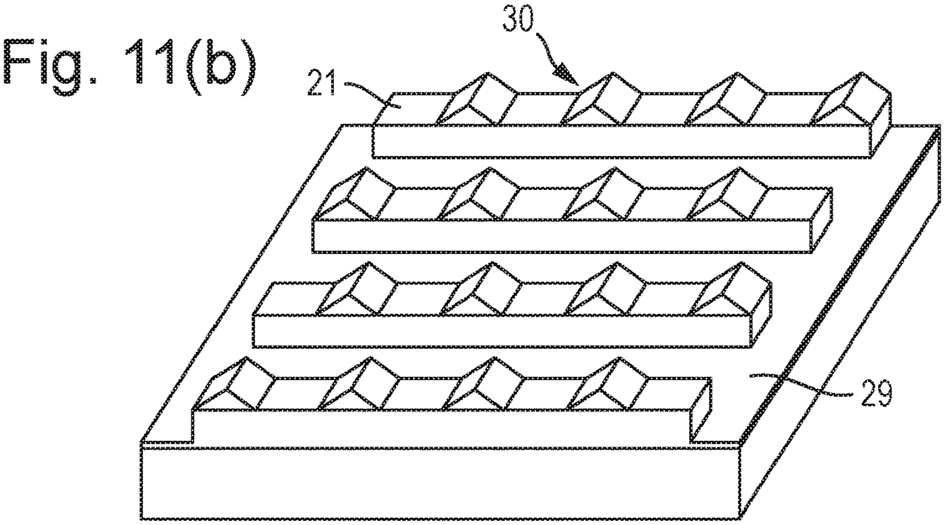
Figure 11C:
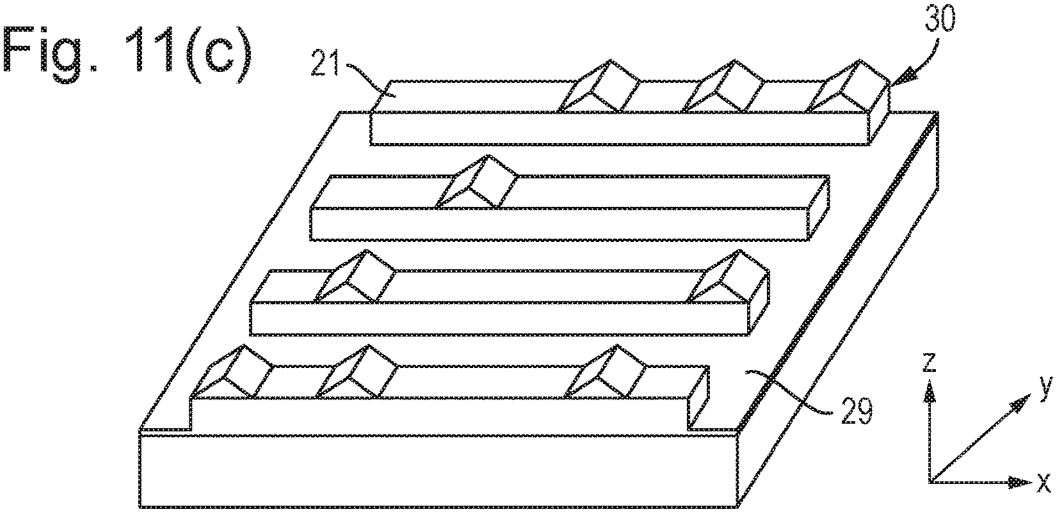

FIGS. 11(*a*) to 11(*c*) illustrate further examples of tactile structures 30 that may be utilised to control the tactility level of a surface relief structure. In these examples, the tactile structures 30 exhibit gaps between the individual tactile protrusions 31. In FIG. 11(*a*), the tactile structures 30 exhibit periodic gaps between the individual tactile protrusions 31, with the tactile protrusions 31 being positioned in the same relative locations on the individual raised elements 21. In FIG. 11(*b*), the gaps between individual tactile protrusions 31 are periodic within an individual tactile structure 30, but the relative positioning of the tactile protrusions on different raised elements varies. In FIG. 11(*b*), the arrangement of the tactile structures 30 are in anti-phase. In FIG. 11(*c*), the arrangement of the gaps between the individual tactile protrusions 31 are aperiodic (e.g. random).

Figure 12:
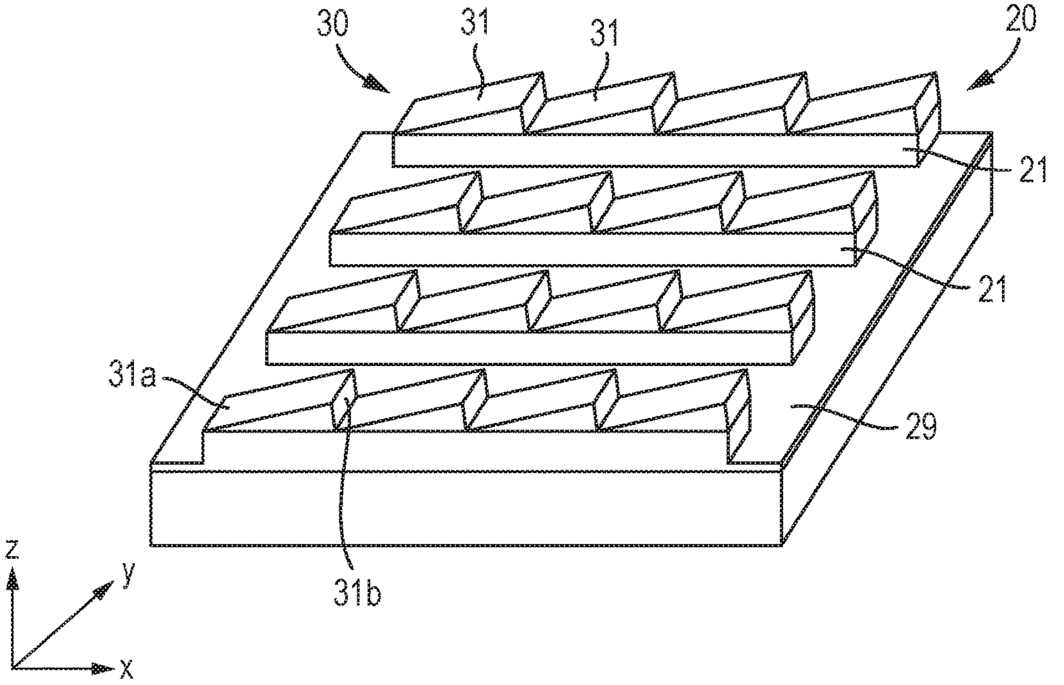

FIG. 12 illustrates an example surface relief structure 20 in which the tactile protrusions 31 are in the form of asymmetrical prismatic structures. Here, facet 31*a* defines a more acute angle with the top of the raised element 21 than the facet 31*b*. Therefore, the user will experience a difference in tactility level as they run their finger along different directions along the x-axis. The surface relief structure will exhibit a coarser tactility level when moving from right to left along the x-axis than from left to right.

Figure 13:
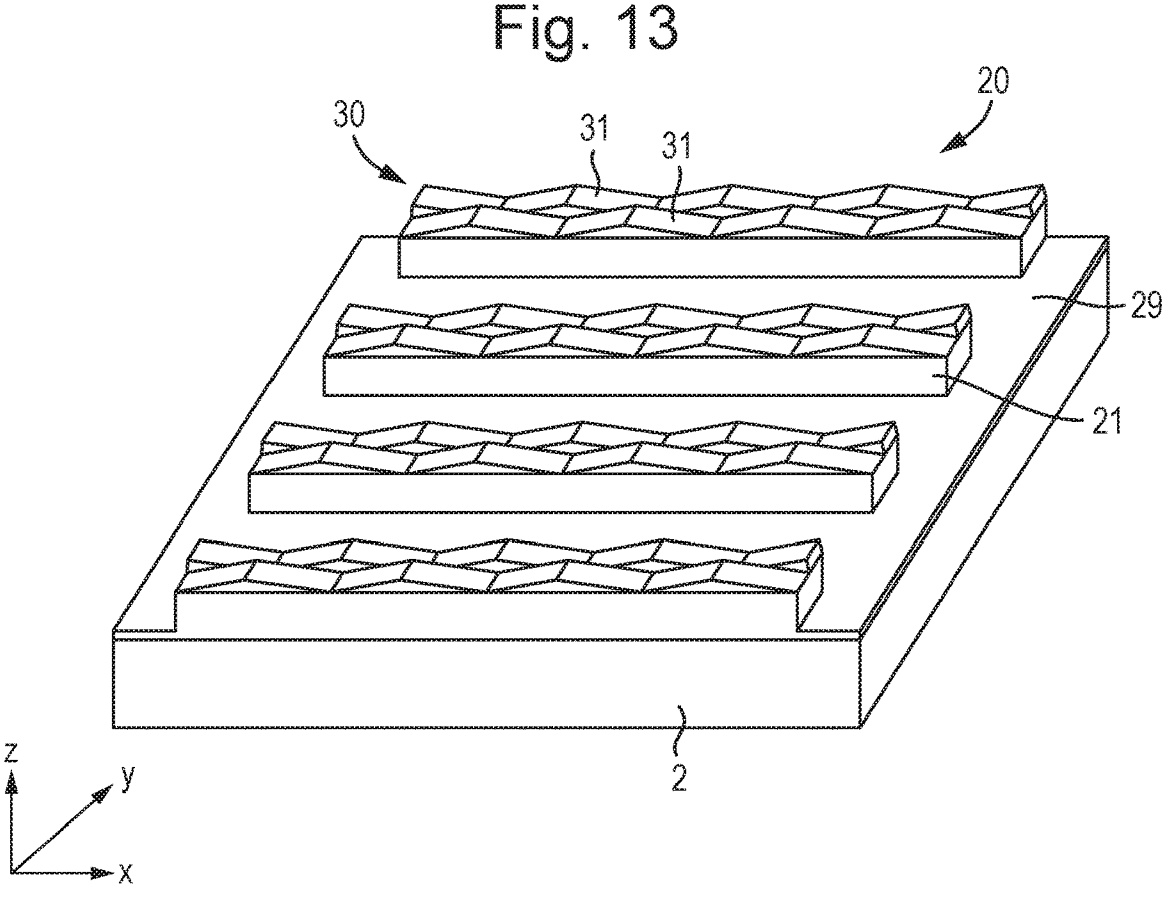

In FIG. 13, the tactile structures 30 comprise two arrays of tactile protrusions 31. In this example the arrays are substantially the same structure (an array of symmetrical linear microprisms) but are arranged in anti-phase. In other examples, the arrays may define different structures and/or be arranged with any degree of phase relationship.

Figure 14:
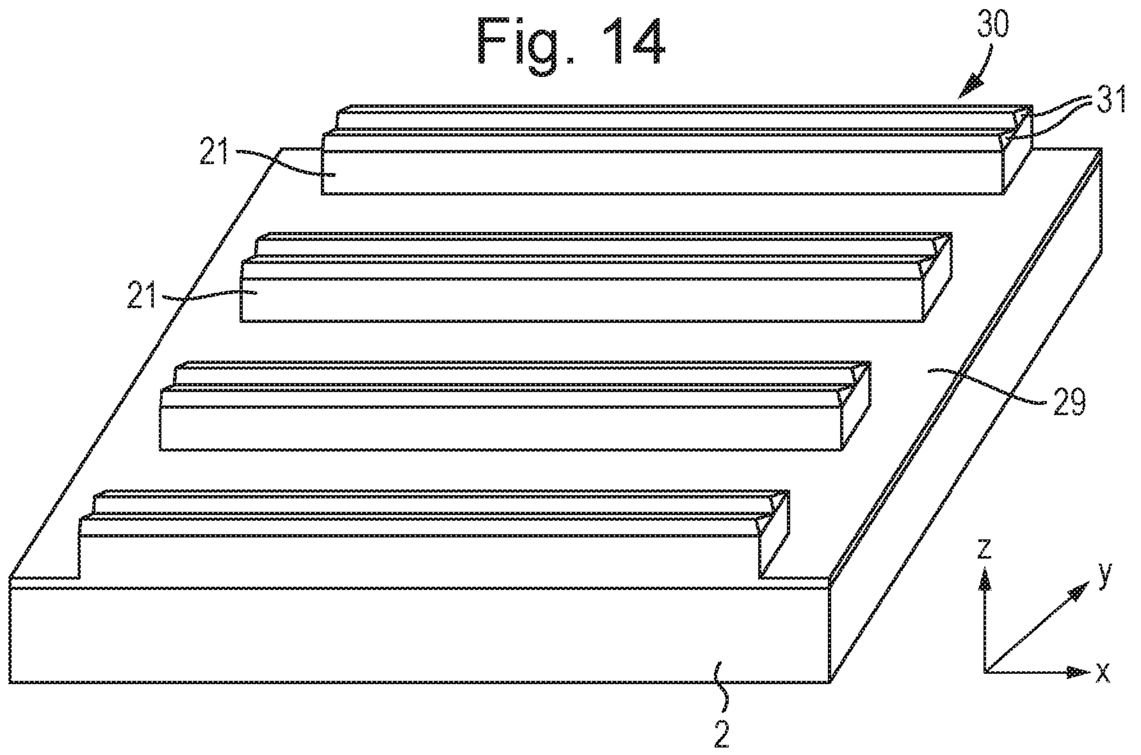

FIG. 14 illustrates a further example of a surface relief structure which illustrates how the orientation of the tactile protrusions 31 can be used to control the perceived tactility exhibited by the device. Here, the tactile protrusions 31 are in the form or linear microprisms, but instead of their long axes being aligned in a cross direction to the long axes of the primary relief elements 21, the long axes of the tactile protrusions 31 are aligned parallel to the direction of elongation of the raised elements 21. Therefore, the user will perceive a relatively smooth tactility level as they run their finger along the length of the raised elements 21 (along the x-axis), and a relatively rough tactility level in the cross direction (along the y-axis). Furthermore, the microprisms 31 in FIG. 14 have an asymmetrical cross-section, giving rise to a difference in tactility level dependent on the direction of the user's finger along the y-axis.

Figure 15:
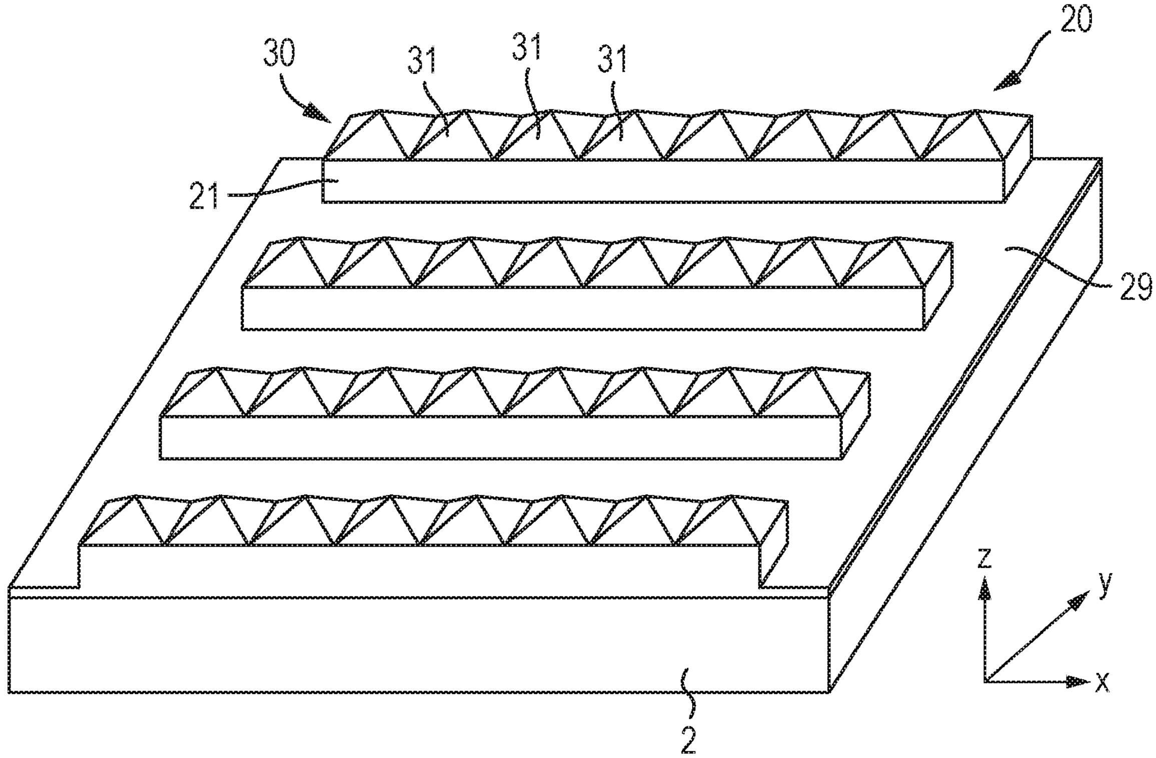

In the examples shown in FIGS. 8 to 14, the tactile structures were in the form of an array of microprisms 31. These provide a directional tactility level; in other words the tactility level is dependent on the direction of travel of a user's finger along the surface relief structure. FIG. 15 illustrates a surface relief structure 20 comprising a plurality of raised line elements 21 as before, each with a tactile structure 30 formed of a plurality of tactile protrusions 31 in the form of square base pyramidal structures. Whereas the linear microprisms exhibited a principal component of tactility in one direction (perpendicular to the direction of elongation), the pyramidal structures of FIG. 15 exhibit principal tactility components in two directions, here along both the x and y axes.

Figure 16A:
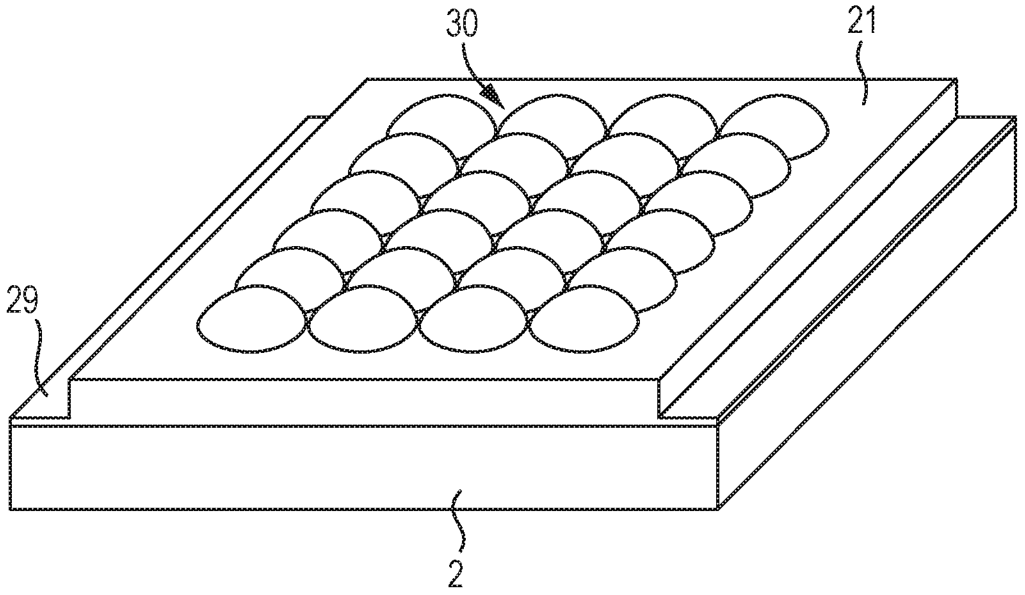
Figure 16B:
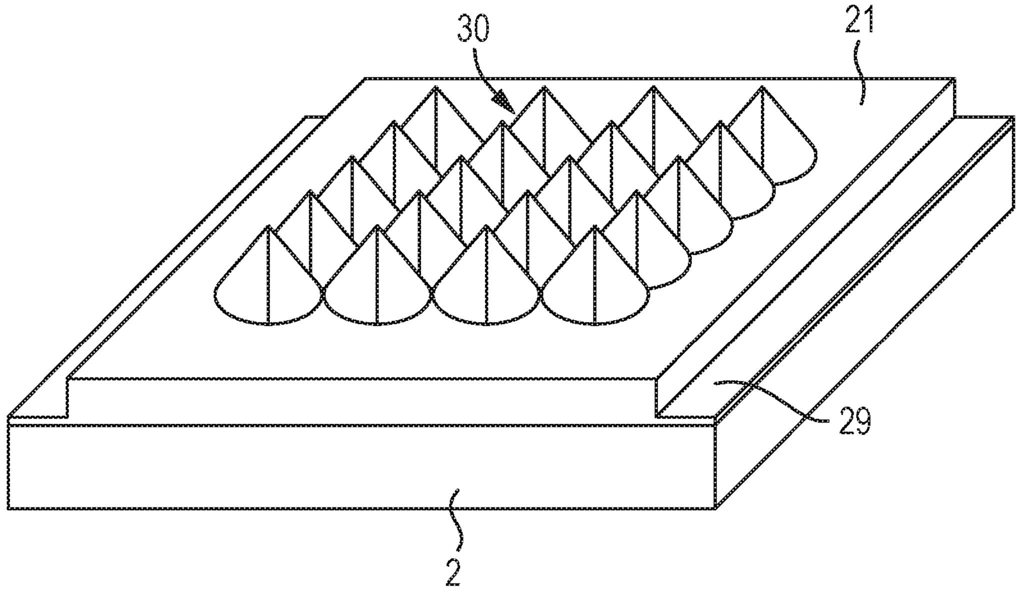

Tactile protrusions having more than two principal components of tactility are also envisaged, for example a six-sided based pyramidal structures, hemispheres (see FIG. 16(*a*)) cones (FIG. 16(*b*)), or cylinders ("rods").

In FIGS. 16(*a*) and 16(*b*), the raised element 21 on which each tactile structure is formed is in the form of a continuous "block print" defining a part of an image exhibited by the device 10. For example, the block print may be used in combination with a plurality of screened image elements in order to exhibit the overall image.

Figure 17A:
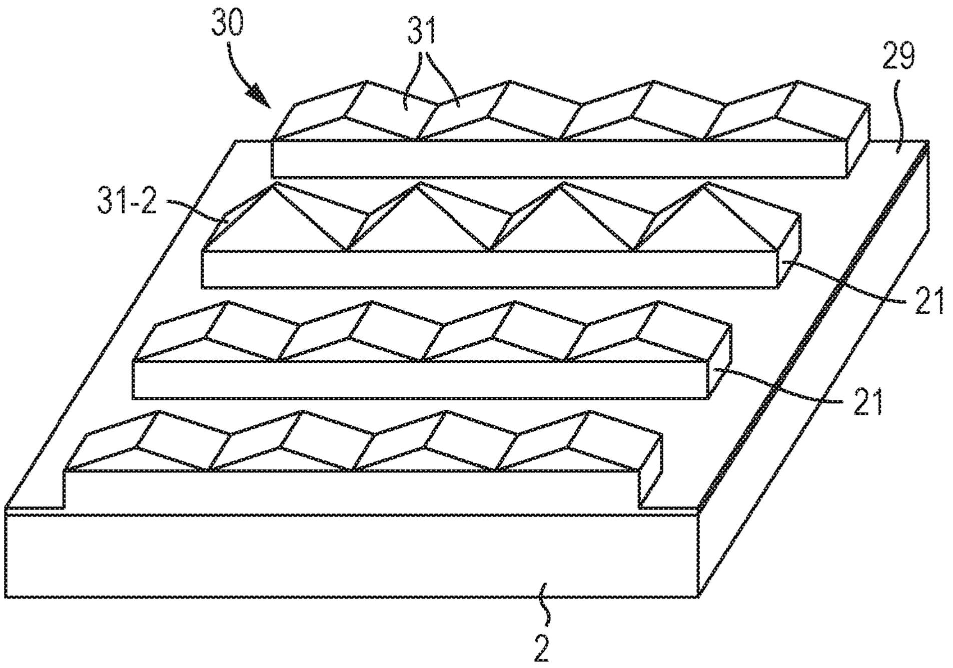
Figure 17B:
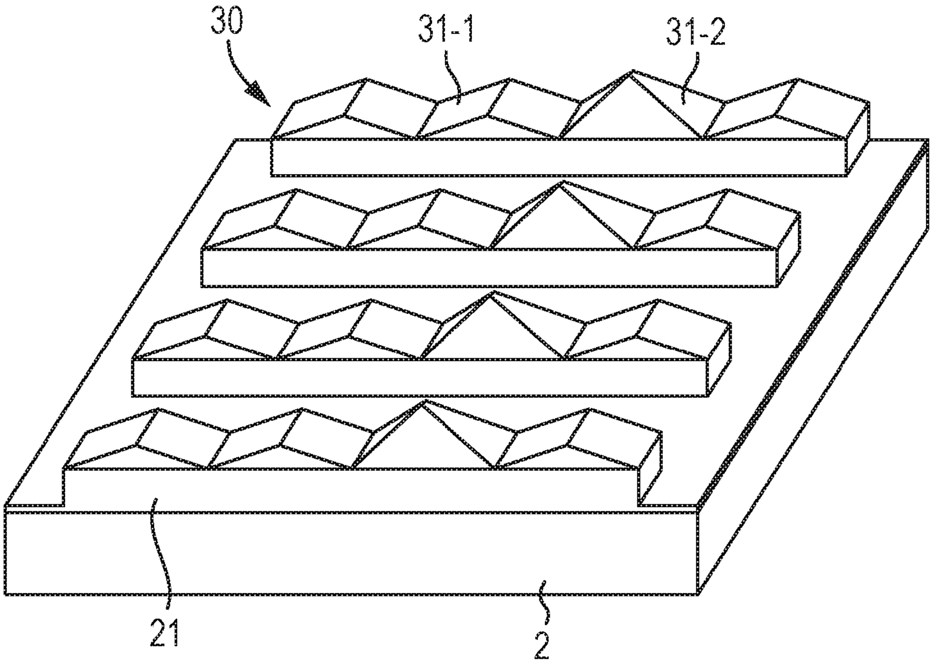

The tactile structures may comprise different tactile protrusions, as schematically illustrated in FIG. 17. In FIG. 17(*a*) the surface relief structure 20 comprises tactile protrusions 31-1 in the form of symmetrical linear microprisms, as well as tactile protrusions 31-2 in the form of pyramidal structures. In FIG. 17(*a*), the individual tactile protrusions within a particular tactile structure are the same, but in alternative embodiments, the tactile protrusions may vary within a single tactile structure 30, as shown in FIG. 17(*b*). It is also noted from FIGS. 17(*a*) and (*b*) that the heights of the individual tactile protrusions (and therefore the tactile structures) may vary across the surface relief structure, in order to further control the exhibited tactility level.

Figure 18:
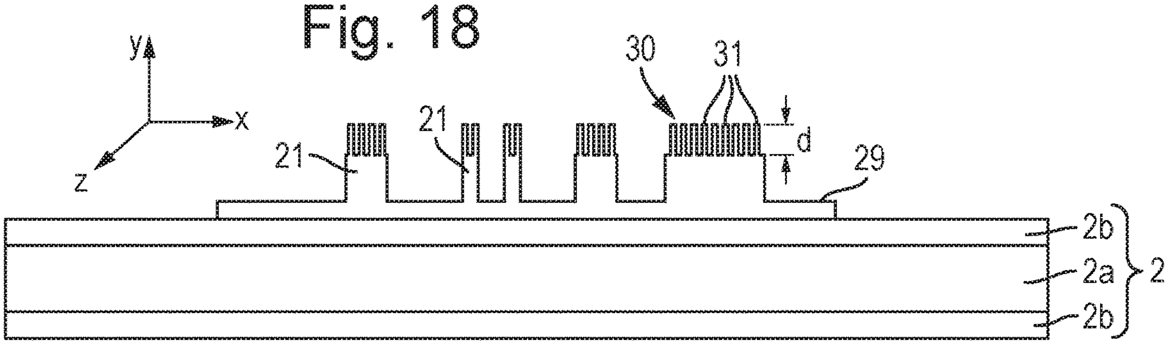
FIG. 18 is a cross-sectional view through a portion of a security device according to the invention.
Figure 19:
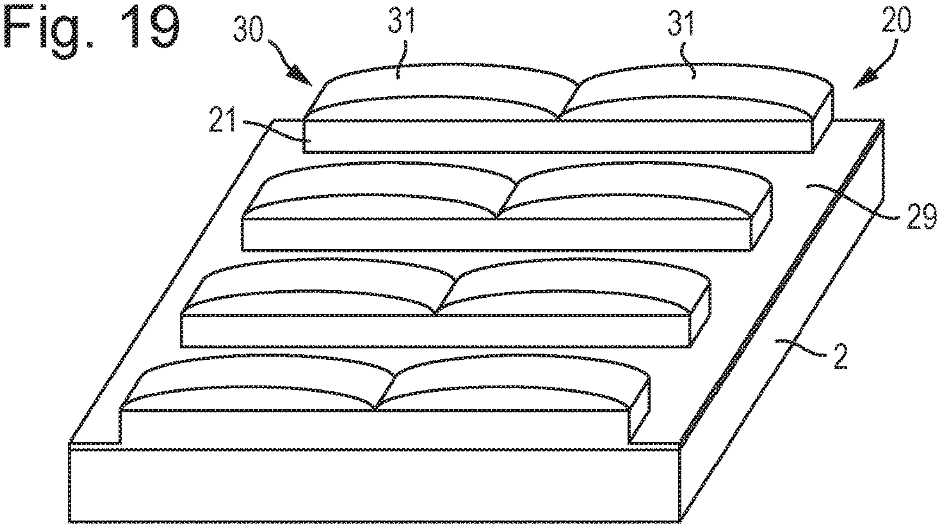
FIGS. 19 and 20 illustrate perspective views of portions of security devices according to further embodiments of the invention.

In the examples thus far, the tactile protrusions 31 have typically comprised angled facets resulting in a vertex or edge. FIG. 18 is a schematic cross-sectional view through a security device according to a further embodiment of the invention in which the tactile protrusions 31 are in the form of cylindrical elements (or "rods") extending from the tops of the raised elements 21, and having a square-wave profile in cross-section. FIG. 19 illustrates a further example embodiment in which the tactile protrusions 31 have a curved surface. Such tactile protrusions may be in the form of regular curved elements (as shown) or irregular elements. In some examples, the tactile structures may comprise a continuous element having features at a smaller scale than the primary relief elements 21.

Figure 20:
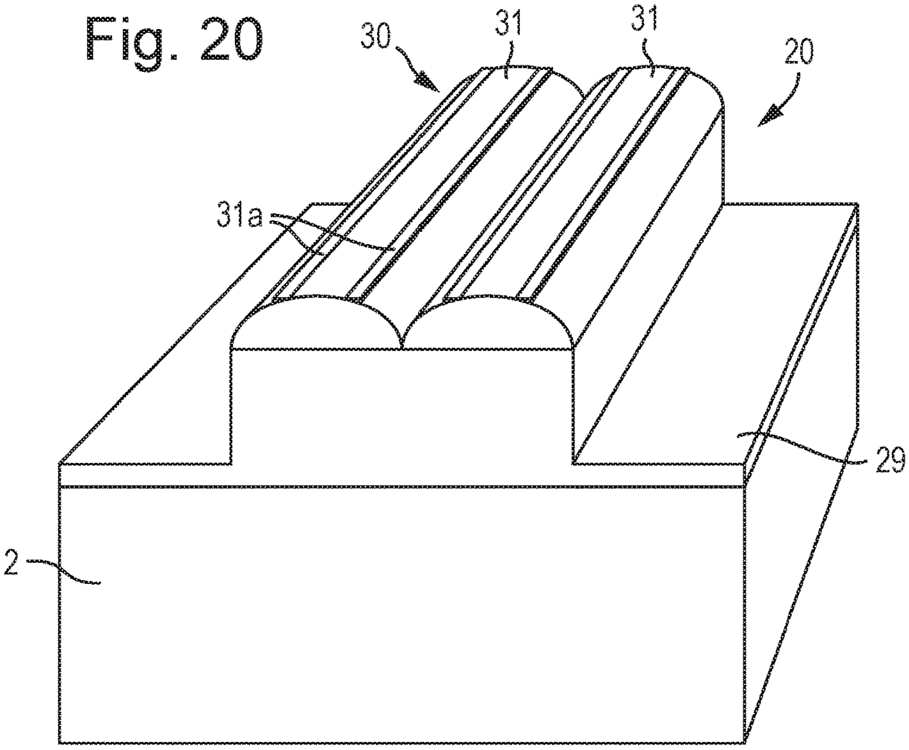

FIG. 20 illustrates an example in which the tactile protrusions 31 comprise a further sub-structure, here shown as elongate strips 31*a* disposed on the curved surface of tactile protrusions 31.

Figure 21:
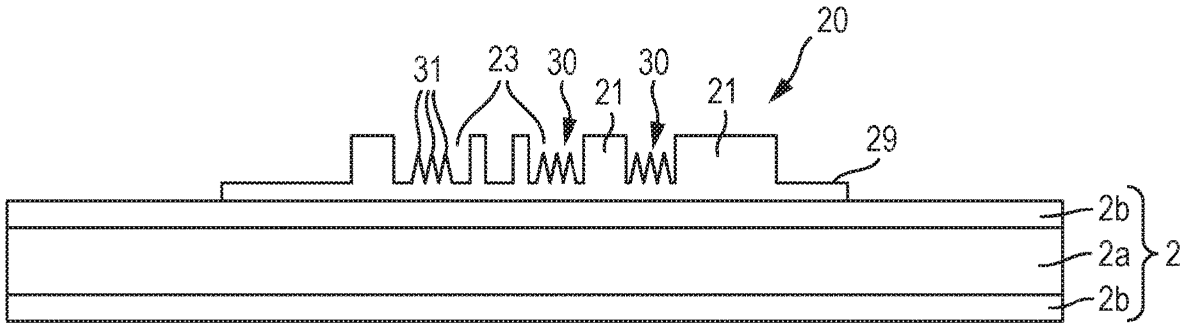
FIG. 21 is a cross-sectional view through a portion of a security device according to the invention.

In FIGS. 8 to 20, for simplicity the tactile structures 30 are shown as being disposed only on the tops of the primary relief elements (raised elements) 21. FIG. 21 schematically illustrates a cross-sectional view of a security device, in which the tactile structures 30 are disposed only in the recesses 23 between the raised elements 21. In the example of FIG. 21, the tactile protrusions 31 are formed on the base layer 29 that extends between the raised elements 21.

Figure 22A:
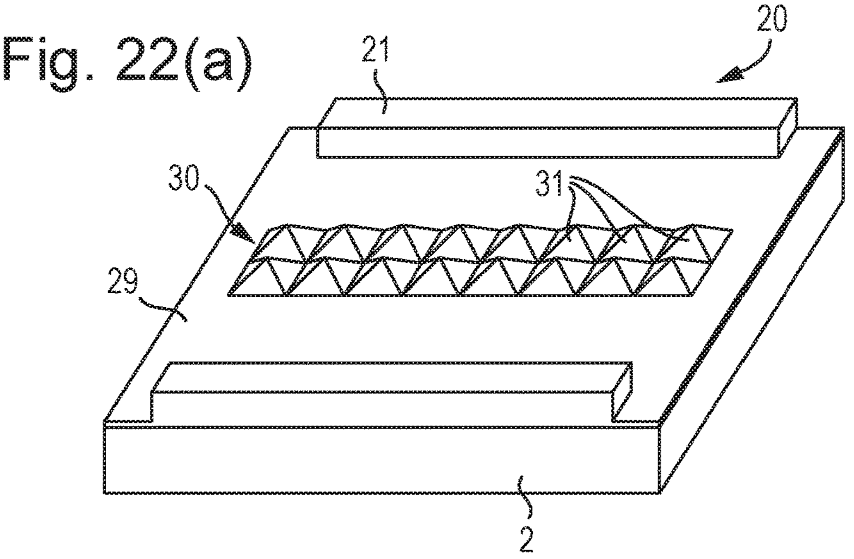
FIGS. 22(*a*) to 22(*c*) illustrate perspective views of portions of further security device according to the invention.
Figure 22B:
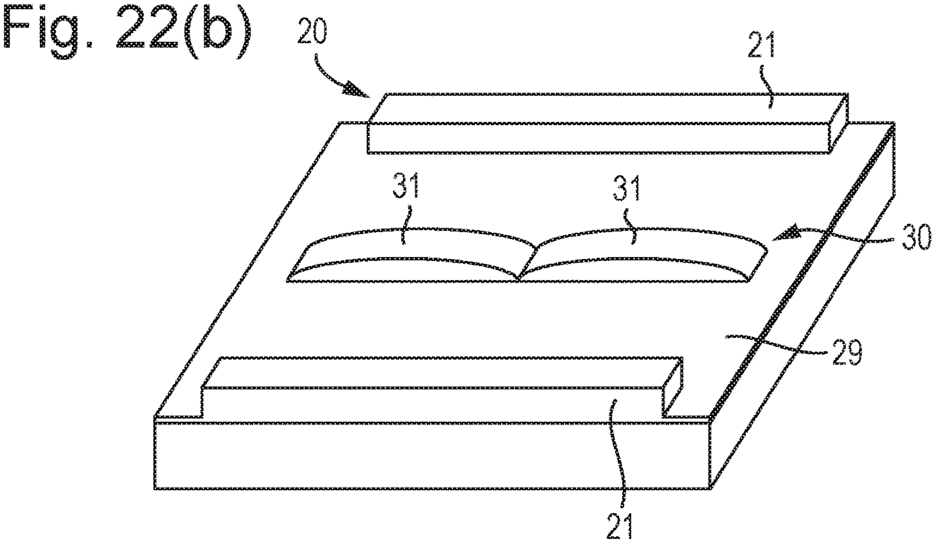
Figure 22C:
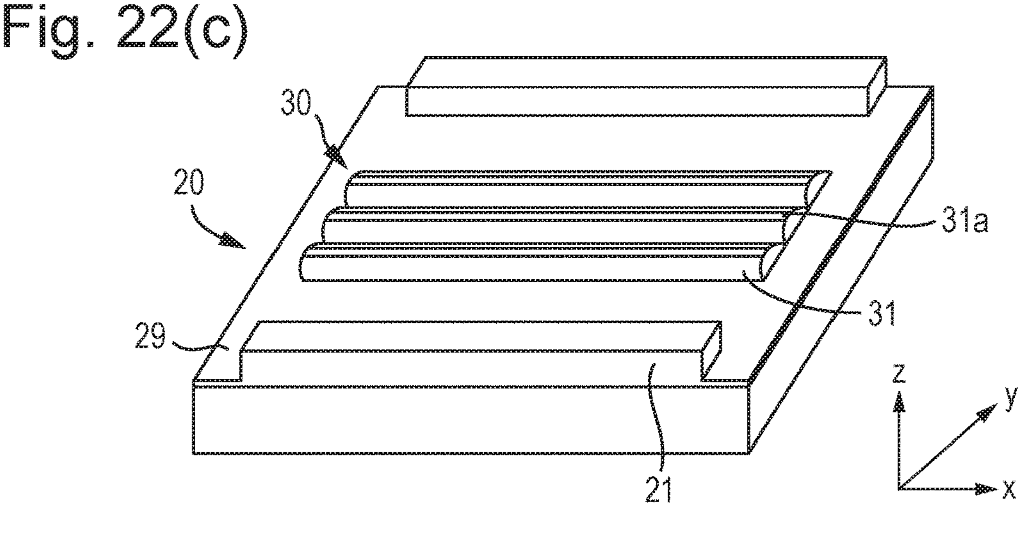

FIG. 22 shows further examples, in perspective view, of surface relief structures 20 comprising tactile structures 30 disposed only in the recesses between raised elements 21. In FIG. 22(*a*), the tactile protrusions 31 are in the form of square-based pyramids; in FIG. 22(*b*), the tactile protrusions 31 are in the form or curved structures and in FIG. 22(*c*), the tactile protrusions 31 are in the form of curved structures having a further substructure 31*a* in the surface thereof.

Figure 23:
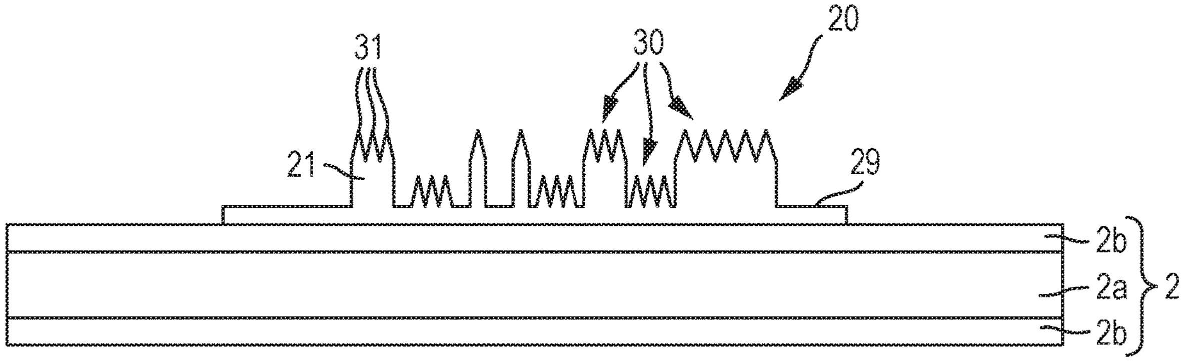
FIGS. 23 and 24 show cross-sectional views through portions of security devices according to the invention.

In general, the tactile structures may be disposed on either the tops of the raised protrusions, in the recesses, or disposed on a combination of both. FIG. 23 illustrates a cross sectional view of a security device, in which the tactile structures 30 are disposed on both the tops of the raised elements 21 and in the recesses between them.

Figure 24A:
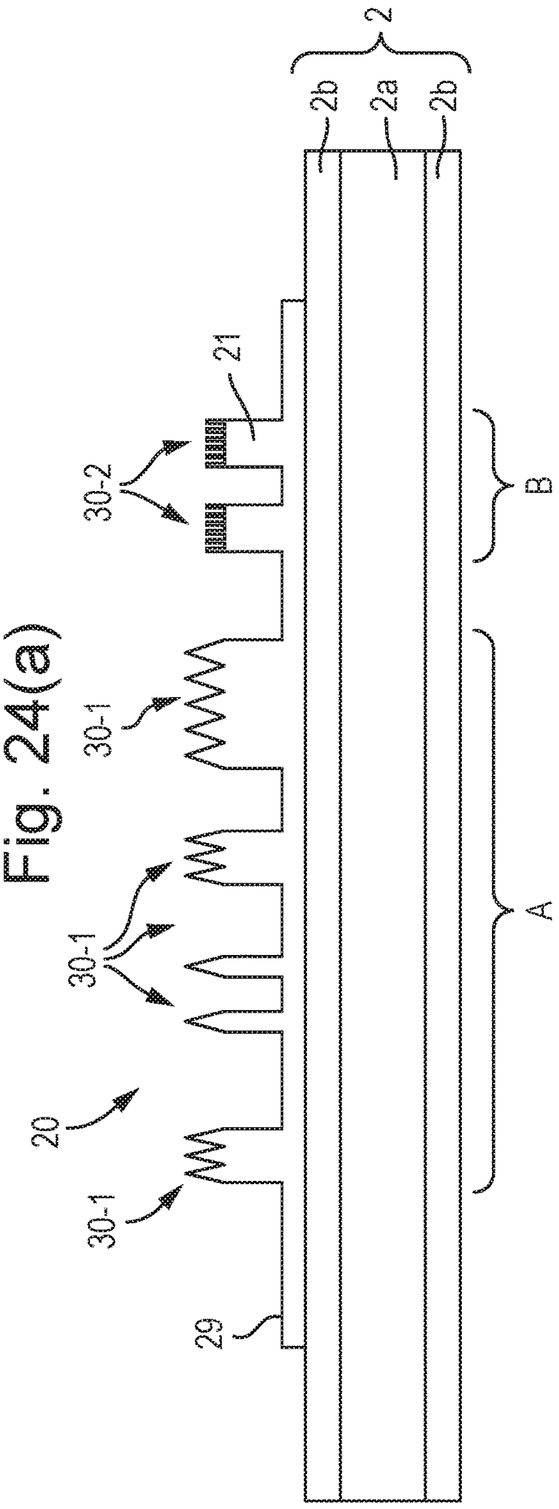
Figure 24B:
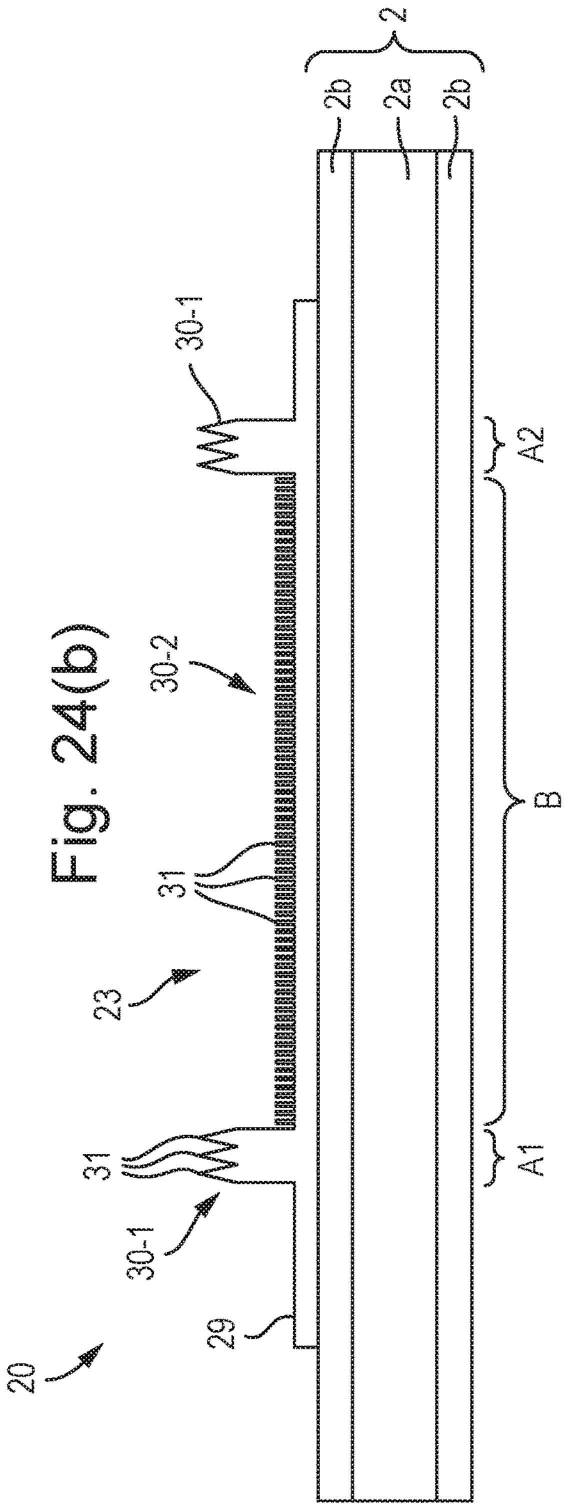

A combination of different tactile structures exhibiting different levels of roughness/smoothness can be utilised in the same surface relief structure in order to provide further control and complexity to the overall tactile effect exhibited by the device, thereby raising the security level. Such embodiments are schematically illustrated in FIGS. 24(*a*) and 24(*b*), where the surface relief structure 20 comprises tactile structures 30 exhibiting different tactility levels. In FIG. 24(*a*), the tactile structures 30 are disposed only on the tops of the raised elements 21, rather than in the recesses. In region A of the surface relief structure 20, the tactile protrusions are in the form of elongate linear microprisms whereby the tactile structures 30-1 have a relatively rough feel, and in region B of the surface relief structure the tactile protrusions 31 are in the form of rod structures such that the tactile structures 30-2 exhibit a relatively smooth tactile feel.

In FIG. 24(*b*), the tactile structures 30 are present both on the tops of the raised elements 21 and in the recess 23 between them. In this example, the tactile structures 30-1 on the tops of the raised elements 21 (regions A1 and A2 of the surface relief structure 20) provide a relatively rough tactile feel, whereas the tactile structure 30-2 present on the base layer 29 in the recess 23 (region B) exhibits a smooth feel as the user runs their finger across the device.

Figure 25:
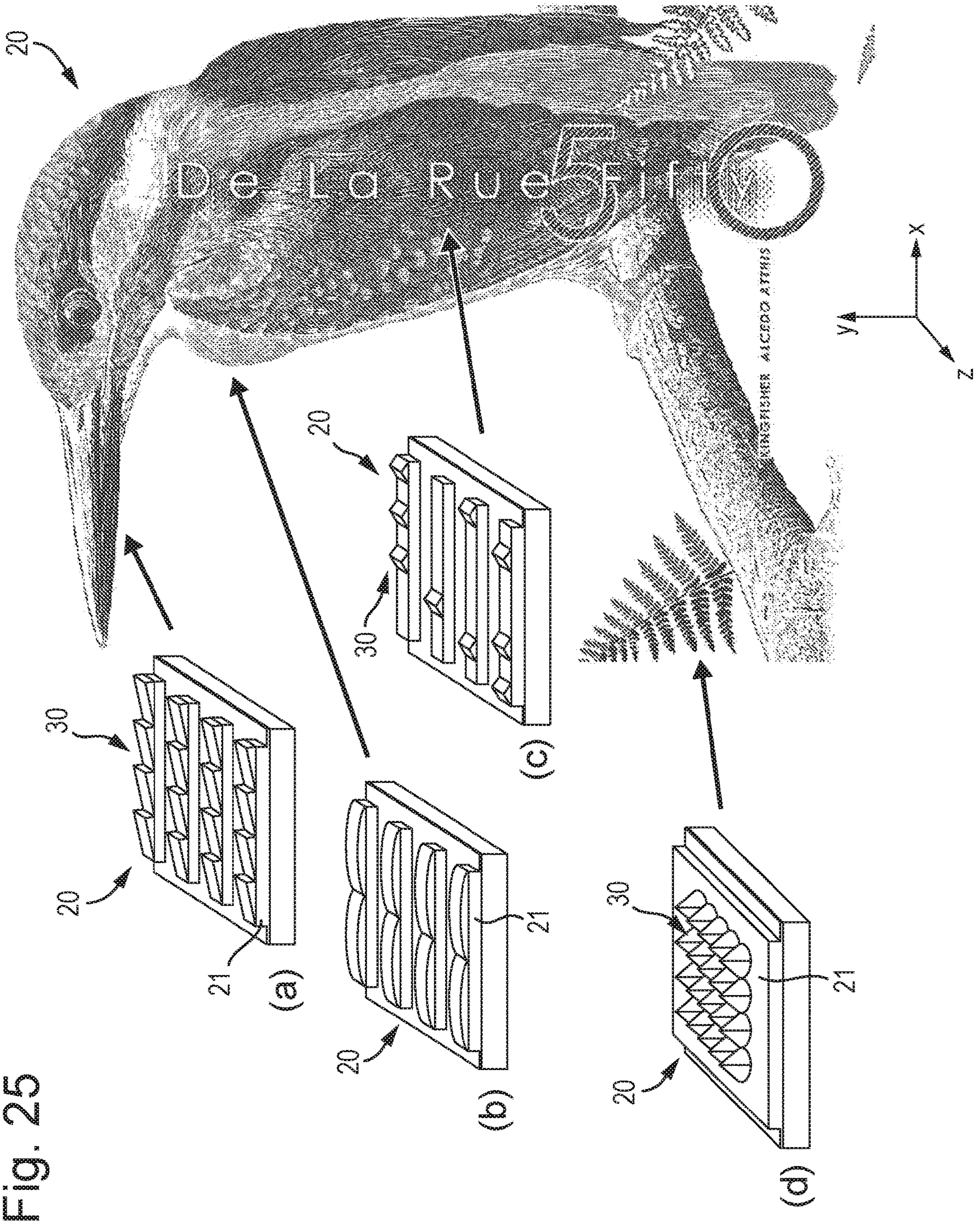
FIGS. 25(*a*) to 25(*d*) schematically illustrate how the tactility of various portions of an image may be varied in accordance with the image.

The variation in tactility may be provided in accordance with the image exhibited by the surface relief structure, in order to provide a particularly secure device. For example, referring back to the image of the kingfisher in FIG. 8(*a*) the tactility level of the tactile structures 30 may vary across the device as schematically illustrated in FIG. 25. FIG. 25 shows, by way of example, four different regions of the surface relief structure 20, with tactile structures 30 that vary in in correspondence with the respective part of the image. FIG. 25 illustrates a portion of the surface relief structure 20 corresponding to the kingfisher's beak: that is, the raised elements 21 in this region of the surface relief structure 20 correspond to line image elements defining the beak. Tactile structures 30 comprising asymmetrical prismatic structures are disposed on the tops of the raised elements 21 so as to provide an asymmetrical high tactility along the x-axis (along the direction of the beak). In the region of the surface relief structure 20 shown in FIG. 25 (*b*), the tactile protrusions 31 are in the form of curved structures giving a smooth tactile feel in accordance with the kingfisher's breast. FIG. 25(*c*) shows the region of the surface relief structure corresponding to the wings, and the tactile structures are composed of aperiodically spaced prismatic structures. In FIG. 25(*d*), the raised element 21 is in the form of a continuous print defining a fern leaf, with the tactile structure 30 comprising a plurality of right circular cones disposed on the top of the raised element, providing a substantially symmetrical tactile effect.

Figure 26A:
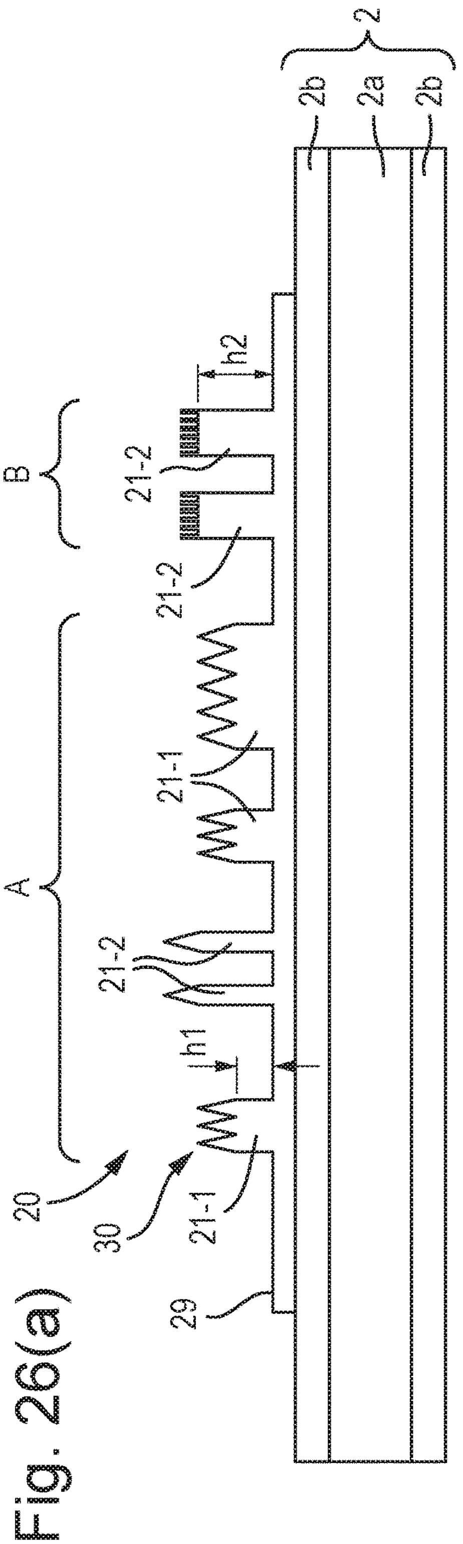
FIGS. 26(*a*) and 26(*b*) illustrate portions of security devices according to the invention.
Figure 26B:
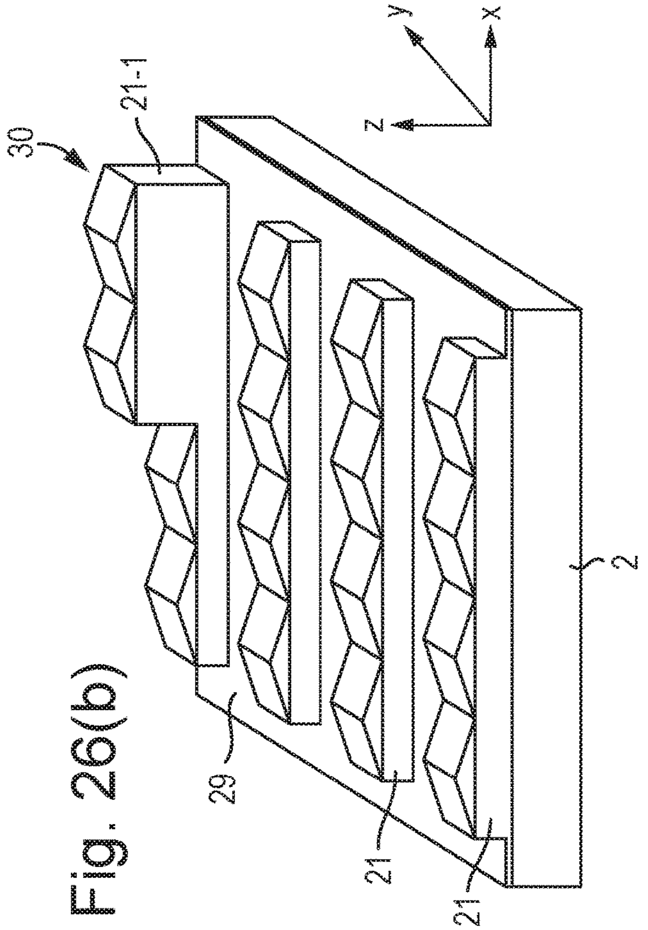

In the examples discussed thus far, the primary set of relief elements 21 of the surface relief structure 20 have each had the same height. FIG. 26(*a*) illustrates a cross-sectional view of a security device according to an embodiment of the invention in which the primary set of relief elements 21 (again, here in the form of raised elements corresponding to respective image elements of an image exhibited by the device) vary in height across the surface relief structure. For example, the individual raised elements 21-1 each have the same height h1 above the base layer which is lower than the height h2 of raised elements 21-2 above the base layer, h2. The surface relief structure 20 comprises tactile structures 30 disposed on the tops of each of the raised elements 21. In this example, the tactile structures 30 located on the tops of the raised elements 21-1 have a relatively rough tactility level. The tactile structures 30 located on the tops of the raised elements 21 vary in tactility level, with the tactile structures in region A providing a relatively rough feel, and the tactile structures in region B forming a smooth structure. The variation in height of the raised elements of the primary relief structures may provide perceived differences in tone across the exhibited image (e.g. due to differences in optical density as a result of the different thickness of cured material that light is required to pass through), as well as introducing further tactile effects across the surface relief structure.

FIG. 26(*b*) shows, in perspective view, a further example of a surface relief structure in which the primary set of relief elements 21 vary in height. Whereas in FIG. 26(*a*) the heights of the individual relief elements 21 differed, FIG. 26(*b*) shows an example where an individual relief element 21-1 varies in height across its domain.

Figure 27:
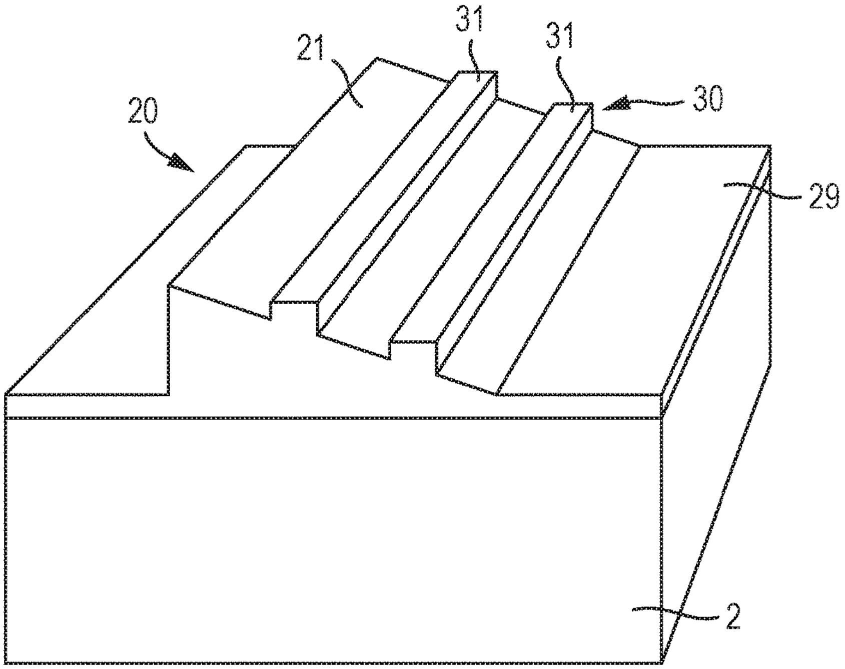
FIG. 27 illustrates, in perspective view, a portion of a security device according to a further embodiment of the invention.

FIG. 27 illustrates an example surface relief structure in which a raised element 21 varies in height continuously across its domain. In this example the raised element is in the form of a prismatic structure having an asymmetrical cross section, thereby providing directional tactility in a cross direction to its direction of elongation. The tactile protrusions 31 forming the tactile structure 30 on the top of the raised element further contribute to the overall tactile effect.

Figure 28A:
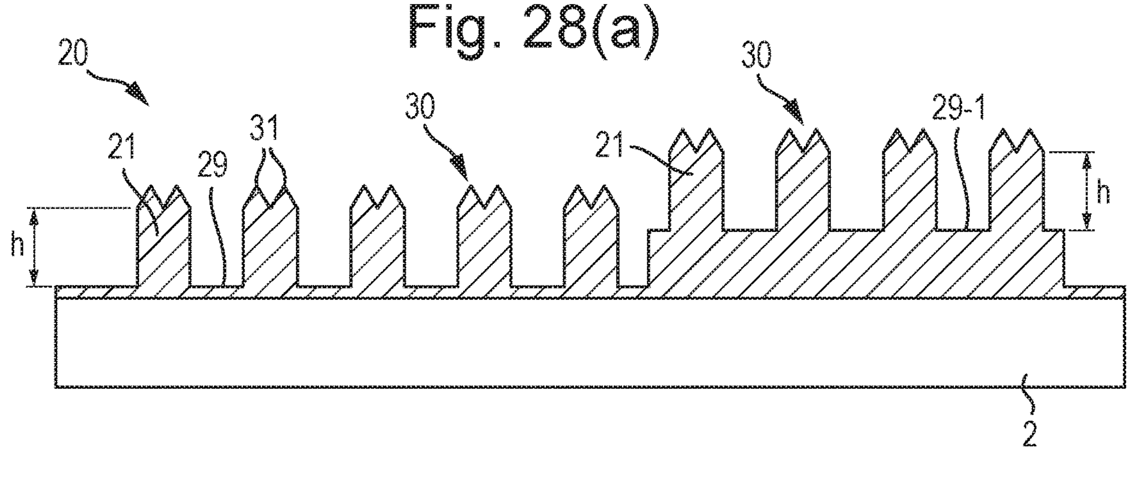
FIGS. 28(*a*) and 28(*b*) are cross-sectional views through portions of security devices exhibiting varying base layer height.
Figure 28B:
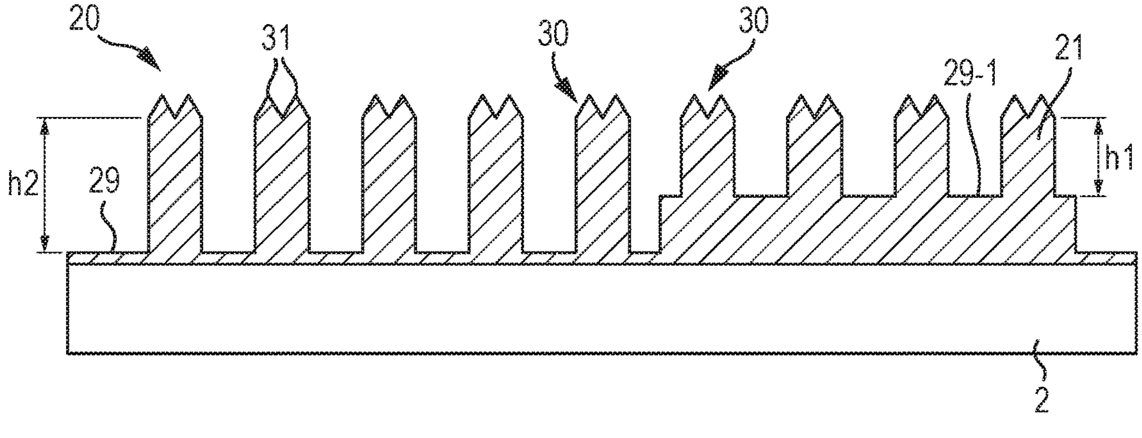

As has been discussed, the raised elements 21 of surface relief structures 20 that are formed during a cast cure process are joined together by a base layer 29 of the same cured material. The height of the base layer 29 may be varied across the surface relief structure to provide further tactile or optical effects, as is schematically shown in FIGS. 28(*a*) and 28(*b*). In the surface relief structures of both FIGS. 28(*a*) and 28(*b*), the base layer 29 comprises a region 29-1 of relatively increased height (thickness). In FIG. 28(*a*), each of the raised elements 21 has the same individual height above the base layer (shown at h) corresponding to the depth in the trench of the casting tool, and therefore the tops of the raised elements 21 disposed on the raised region of base layer 29-1 have a greater height above the substrate than the tops of the raised elements disposed on the lower part of the base layer. Therefore, the heights of the tactile structures 30 above the substrate 2 vary across the surface relief structure, adding further complexity to the tactile effect.

In FIG. 28(*b*), the individual heights (h1) of the raised elements 21 on the raised region of base layer 29-1 are smaller than those of the raised elements disposed on the lower portion of the base layer (h2) such that the tops of the raised elements 21 (and therefore the tactile structures) have the same height above the substrate across the surface relief structure.

Figure 29:
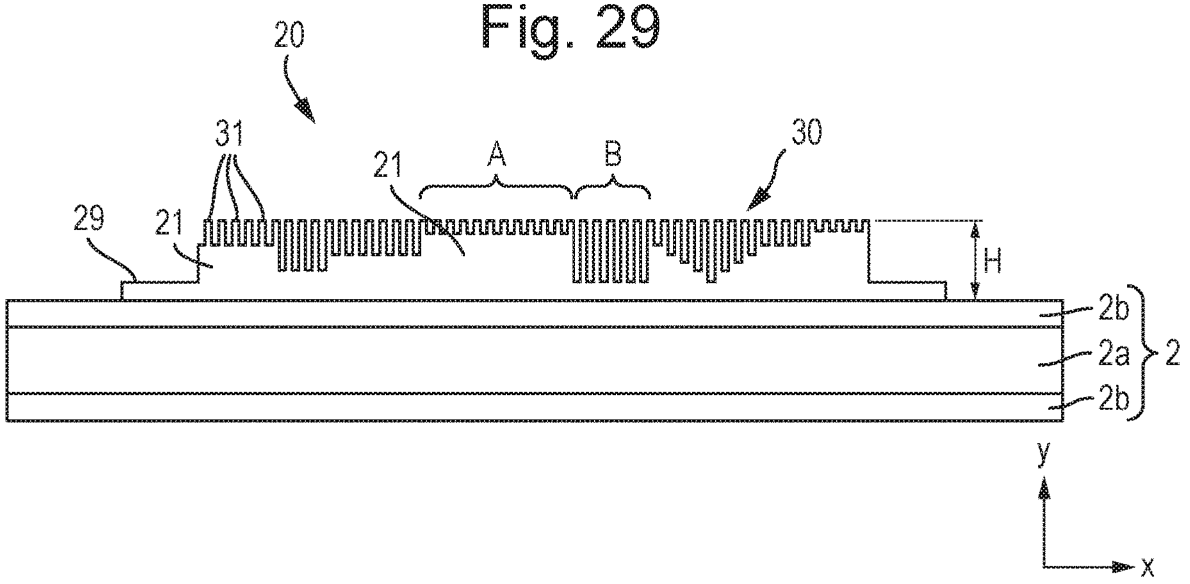
FIG. 29 is a cross-sectional view through a portion of a security device according to the invention.

FIG. 29 shows a schematic cross-section through a portion of a further device, in which the tactile protrusions 31 of the tactile structures 30 vary in height so as to compensate for height differences across the primary set of relief elements 21 and the base layer. Consequently, the tops of the tactile protrusions 31 have a substantially uniform height above the substrate (or thickness of curable material), H, across the surface relief structure. For example, the individual tactile protrusions 31 located on the top of raised protrusion 21 in region A have a smaller protrusion height than the tactile protrusions 31 located within the recess in region B of the device. In this way, the tops of each of the tactile protrusions of the surface relief structure have substantially the same height above the surface 3*a* of the substrate 2, but the surface relief structure still exhibits a variation in perceived tactility across its domain due to the differences in protrusion heights of the individual tactile protrusions 31. Such embodiments are particularly advantageous where it is desired that a security document that the device is located on or integrated within has a substantially uniform thickness in order to improve ream shape and document handling, as the surface relief structure may be used to compensate for the local variation in document thickness, for example within a window region defined by the localised absence of opacifying layers. In another example, the surface relief structure 20 may be configured to have substantially the same overall height as a separate feature on the document.

Figure 30A:
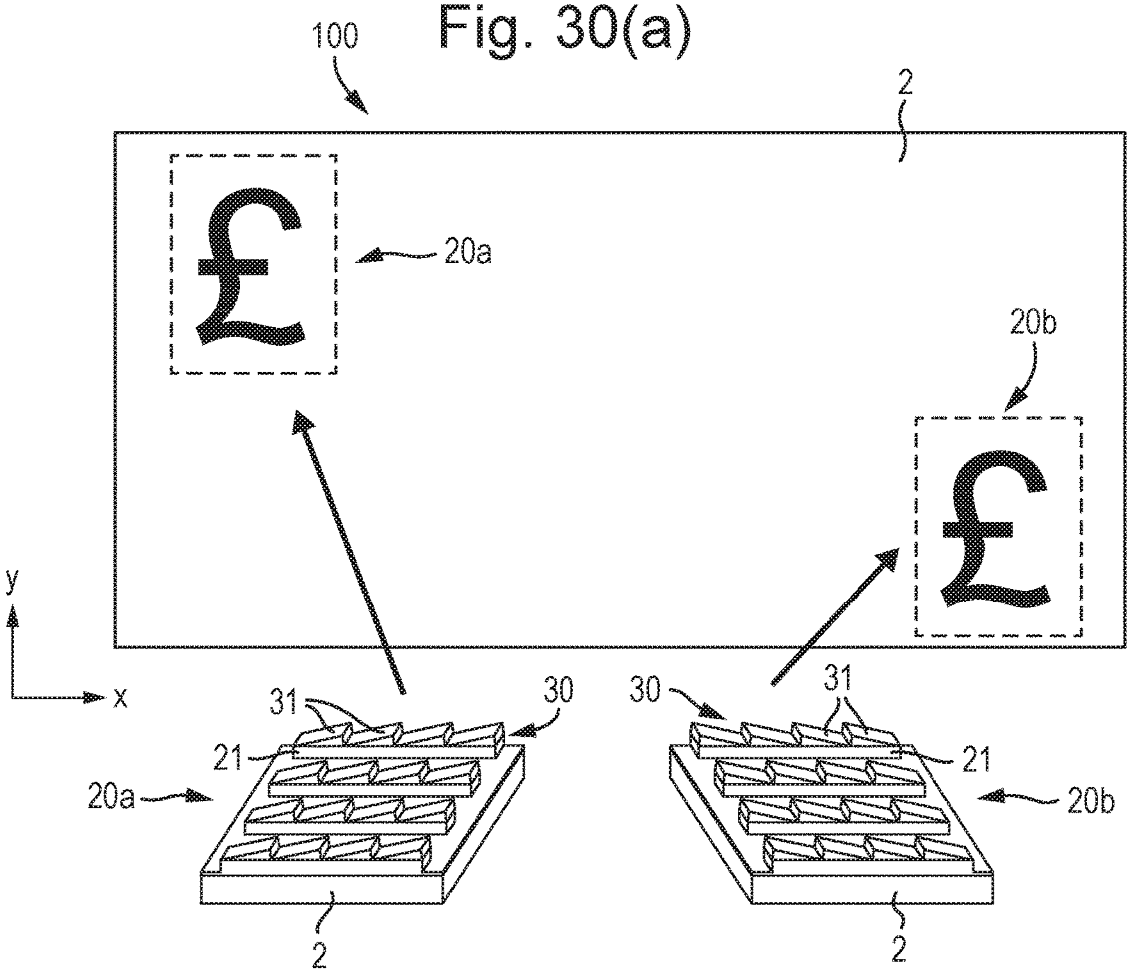
FIGS. 30(*a*) to 30(*c*) illustrates security documents carrying security devices according to the invention.
Figure 30B:
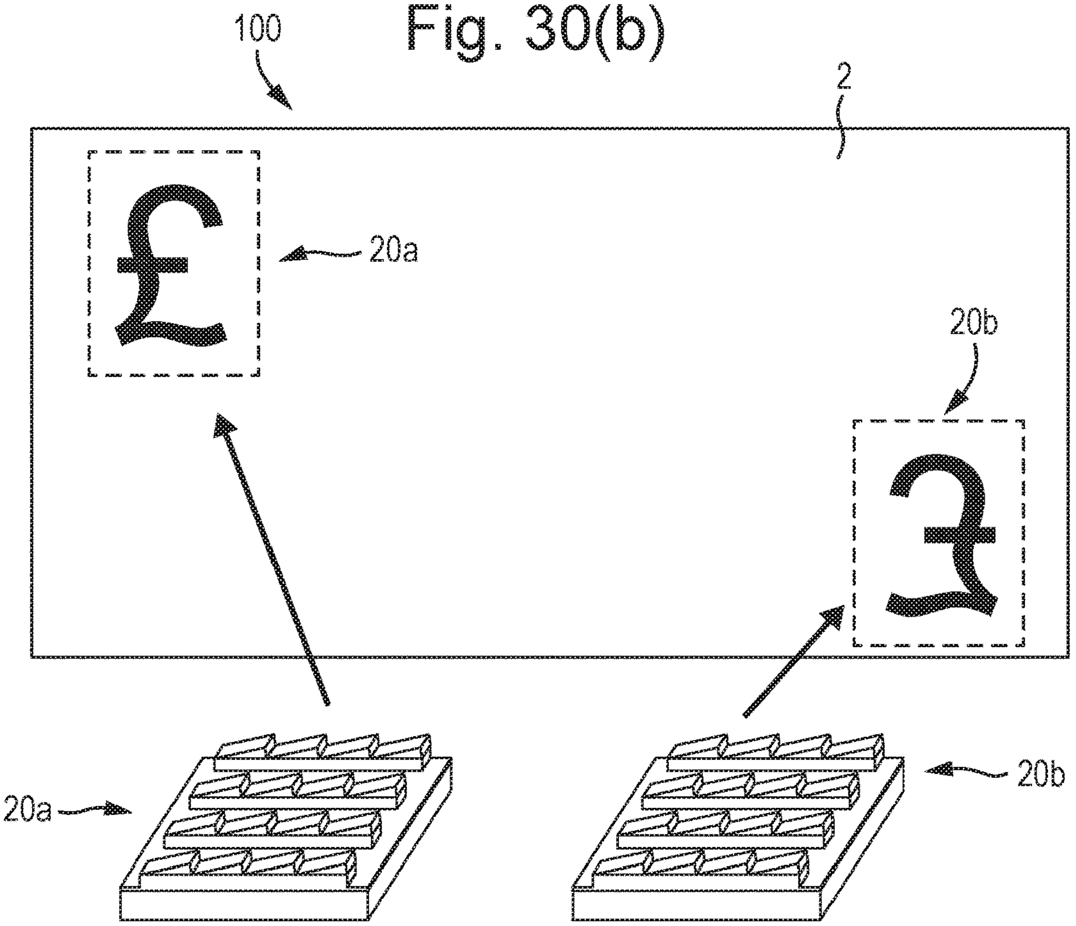
Figure 30C:
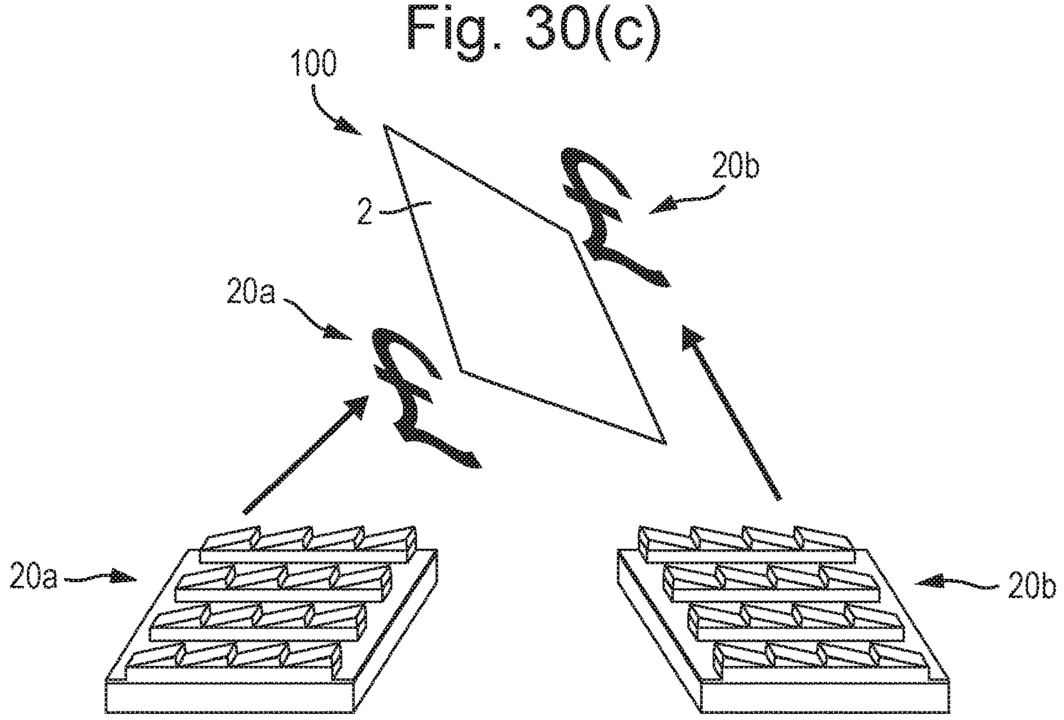

FIG. 30 illustrates a further embodiment of the present invention, in which directional tactility provided by the tactile structures is used to provide a secure device. FIG. 30(*a*) illustrates a security document 100, in this case a banknote. The banknote comprises a device having two surface relief structures 20*a*, 20*b*. Each surface relief structure comprises a plurality of raised elements 21 in the form of image elements defining a "£" symbol. A plurality of tactile protrusions 31 in the form of asymmetrical prismatic structures are disposed on the tops of each of the raised elements 21. The arrangement of the tactile protrusions 31 of structure 20*a* substantially opposes the arrangement of the tactile protrusions 31 of structure 20*b* such that, although the two surface relief structures 20*a*, 20*b* exhibit the same image, they provide a different orientational feel along the x-axis. More specifically, the image exhibited by the first structure 20*a* will feel relatively rough when a user moves their finger from right to left along the x-axis, and will feel relatively smooth when moving from left to right. Conversely, the structure 20*b* will feel relatively rough when moving from left to right and relatively smooth when moving from right to left. This difference in directional tactility associated with an otherwise identical features provides a particularly secure document.

FIG. 30(*b*) illustrates a similar example. Here, the tactile structures have the same arrangement on both structures 20*a*, 20*b*, although the orientation of the images is reversed as defined by the raised elements. Although FIGS. 30(*a*) and 30(*b*) illustrate separate surface relief structures 20*a*, 20*b*, in alternative embodiments a single surface relief structure (i.e. a single continuous block of cured material) may comprise different regions formed in manner described above.

FIG. 30(*c*) illustrates a security document 100 similar to that illustrated in FIG. 30(*a*), with the surface relief structures being disposed on opposing sides of the document substrate.

In developments of the invention, the surface relief structure 20 may be combined with a decorative layer in order to provide further complex effects that increase the security level of the device, as will now be described with reference to FIGS. 31 and 32.

Figure 31A:
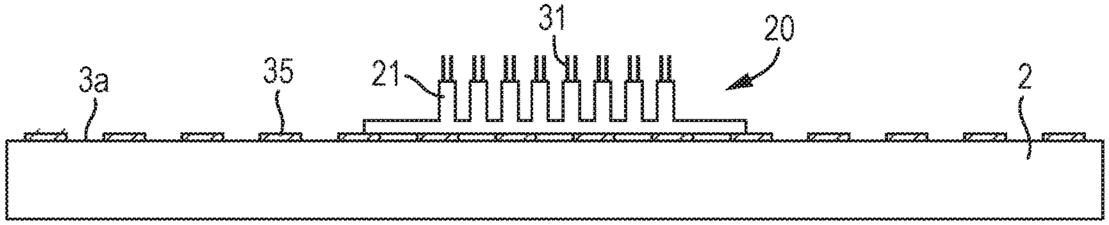
FIGS. 31(*a*) to 31 (*c*) show cross-sections through example security devices comprising a decorative layer.
Figure 31B:
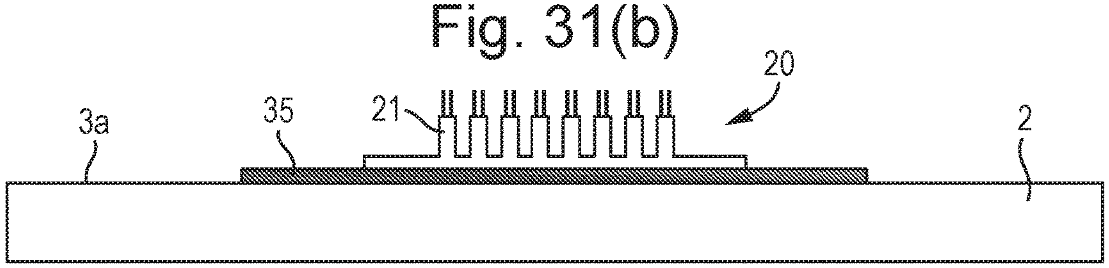
Figure 31C:
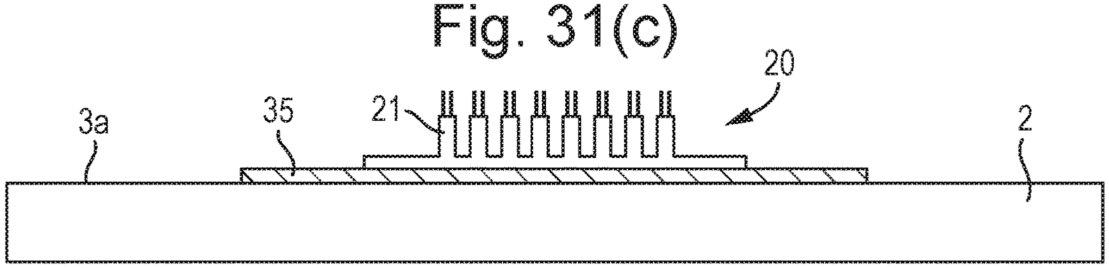

FIG. 31(*a*) illustrates a cross sectional view of a security device comprising a decorative layer 35 in the form of a print layer applied to the surface 3*a* of the substrate 2. In this example the substrate 2 is a paper substrate and the print layer 35 is formed by lithographic printing, although it should be understood that the print layer may be formed by other printing processes such as gravure, offset, flexographic, inkjet or any other convenient method. Here, the cured material of the surface relief structure 20 is substantially transparent and colourless, with the primary set of relief elements being in the form of raised elements 21 corresponding to image elements of a multi-tonal image. The print layer may be used to provide colour to the multi-tonal image exhibited by the surface relief structure 20, with the print layer being visible through the transparent cured material of the surface relief structure.

Thus, the print layer may be in the form of an area of uniform colour overlapping with the surface relief structure 20 such that the multi-tonal image exhibited by the surface relief structure 20 appears coloured. In other examples, the print layer 35 may define substantially the same image elements as the raised elements 21 of the surface relief structure, with the image elements of the print layer and the raised elements of the surface relief structure being provided in register (i.e. in overlapping alignment, or "superimposed"). As is illustrated in FIG. 31(*a*), the print layer 35 may be in the form of a print working that covers substantially the whole substrate 2, or at least a substantial part of it, for example 50% or more. This is particularly the case when the security document is a banknote, where a decorative print layer in the form of a lithographic print working may be provided on the substrate surface before the casting of the surface relief structure 20 in a conventional banknote production work flow. In other examples the print layer 30 may cover a smaller area than the surface relief structure 20. For example, the print layer may be laterally completely within the lateral confines of the surface relief structure.

In FIG. 31(*b*) the decorative layer 35 is in the form of an optically variable layer, in particular a colour shifting layer, here a liquid crystal film disposed on a paper substrate 2. Similarly to the example of the print layer above, the colour shifting layer may be provided (e.g. printed) so as to define substantially the same image elements as the raised elements of the surface relief structure 20, or may be provided so as to have a different form to the surface relief structure. In FIG. 31(*c*) the decorative layer 35 is in the form of a holographic foil, and again the substrate 2 is a paper substrate. It is noted that the arrangements seen in FIGS. 31(*b*) and 31(*c*) where the surface relief structures are disposed on frangible decorative layers such as liquid crystal films and holographic layers would be either very difficult or impossible to achieve using conventional intaglio printing, since the high temperatures and pressures involved in the intaglio process, together with the embossing of the substrate, would typically damage such features. Thus, the combination of the surface relief structure and decorative layer in these embodiments provides a device that is particularly difficult to counterfeit.

In the examples of FIGS. 31(*a*) to 31(*c*), the decorative layer 35 and the surface relief structure 20 are both disposed on the same surface 3*a* of a paper substrate. However, it is envisaged that in alternative embodiments, the decorative layer 35 and surface relief structure 20 may be provided on opposing surfaces of a transparent or translucent region of a substrate 2, such as a window or half-window region of a polymer-based substrate. In such embodiments, the surface relief structure and the decorative layer are arranged to at least partially overlap such that their combined effects may be observed at least at one observation angle.

Figure 32:
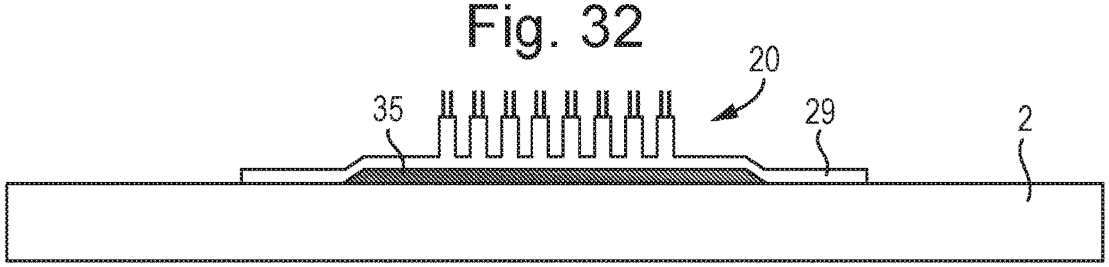
FIG. 32 shows a cross-section through a further device according to the invention the comprises a decorative layer.

FIG. 32 shows a further embodiment which is similar to that shown in FIG. 31(*b*). In this embodiment, the decorative layer 35 is in the form of a colour shifting film and the surface relief structure 20 is configured so as to encapsulate the colour shifting film, i.e. so as to completely cover the film and sealing it from the atmosphere or anything external. Here, the base layer 29 of the surface relief structure 29 laterally extends around the periphery of the raised elements 21 so as to encapsulate the decorate layer 35. In this way, the colour shifting film 35 is protected from external influences and the lifetime of the security device is prolonged. Although this embodiment is described with reference to a decorative layer in the form of a colour shifting film, it will be appreciated that the surface relief structure may be used to encapsulate and protect substantially any decorative layer. Such embodiments are particularly advantageous when the decorative layer is in the form of a metallic layer, since metallic elements are often susceptible to corrosion from alkaline components. Encapsulating the decorative layer with a surface relief structure acts as a chemical barrier, preventing alkaline materials or other corrosive materials from contacting the metal. In extensions of this aspect of the invention, the cured material of the surface relief structure may be utilised as a protective outer layer of a security document 100, in a similar manner to an outer varnish layer of a banknote for example.

Figure 33:
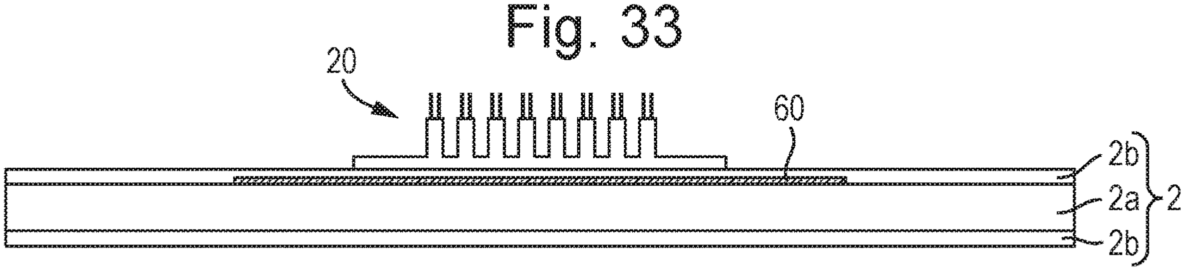
FIG. 33 is a cross-sectional view of a portion of a device in which the substrate comprises an integral decorative mark.

In a further development of the invention, increased complexity can be achieved by additionally providing an integral decorative mark 60 in the substrate 2, as schematically shown in FIG. 33. Decorative marks are formed during manufacture of a document substrate, rather than being applied to the substrate during later processing thereof (as with the decorative layers described with reference to FIGS. 31 and 32). Typically, a decorative mark may be integrated into a multilayer polymer document substrate during the same process as that which applies the opacifying layer 2*b* to the core substrate 2*a*, e.g. via gravure printing. Thus, the integral decorative mark 60 will be in precise register with the opacifying layers 2*b* and particularly any window regions or half-window regions they define. Such decorative marks can be incorporated into security devices of the sort herein disclosed, by arranging the surface relief structure(s) to partially or fully overlap the decorative mark 60 or otherwise interact with it (e.g. appearing to abut, surround or interlock with the decorative mark). Although an integrated decorative mark will typically be in the form of a print working as described above, the decorative mark could comprise or be in the form of other elements or components such as an optically variable component (e.g. colour shifting layers or holographic foils) or reflective/metallic component as described above with reference to embodiments including decorative layers.

In embodiments where the security device comprises a decorative layer and/or a decorative mark in the form of a print working, the print could be applied using standard, visibly coloured ink(s). To further increase the security level, in other embodiments, the print may comprise one or more substances which are responsive to non-visible wavelength (s), preferably UV or IR, the print optionally being invisible under white light illumination. For instance, the print working could comprise a pair of inks which appear matched to one another under one illumination condition (e.g. white light) and different from one another under another illumination condition (e.g. UV light). Examples of suitable materials from which the print layer may be formed are disclosed in WO-A-2004/050376 and WO-A-2018/206936. In other examples, the print working may comprises substances which emit red, green and blue light under illumination by a corresponding excitation waveband. Examples of suitable substances are disclosed in WO-A-2020/030893.

In the examples discussed above, the cured material of the surface relief structure has been at least partially transparent and colourless. However, the cured material may carry a visible colourant. Such a visible colourant may be visible under white light illumination, or could be responsive to non-visible wavelength(s) such as UV or IR, as discussed above.

Figure 34:
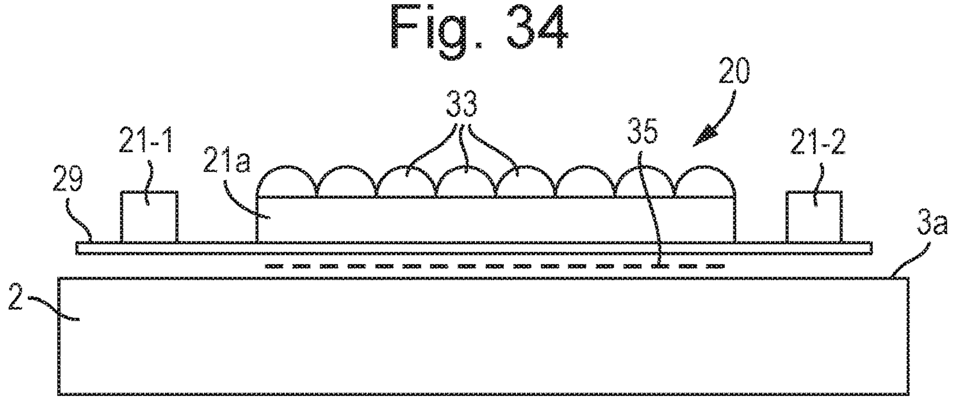
FIG. 34 illustrates a cross-sectional view through a portion of a security device according to a further embodiment of the invention.

In the examples described thus far, we have discussed sub-structures defining tactile structures that provide increased control of the tactility of the surface relief structure. Alternatively or in addition, the sub-structures could define optical elements such as prisms, mirrors, focussing elements or caustic structures so as to provide the device with an additional optical effect. An example is schematically illustrated in FIG. 34 which is a cross-sectional view through such a device. Here, the surface relief structure 20 comprises a plurality of primary relief structures 21, and a secondary set of relief structures in the form of cylindrical lenses 33, formed of a substantially transparent cured material (although other lens geometries such as spherical lenses may be used dependent on the desired optical effect). The cylindrical lenses are disposed on the top of a raised protrusion in the form of a raised platform 21*a*. Raised protrusions 21-1, 21-2 of the primary set of relief elements define elements of an (e.g. screened) image that is exhibited by the device. The surface relief structure 20 is formed on paper substrate 2, upon which a decorative layer 35 has been applied to its first surface 3*a*. The decorative layer in this example is in the form of a print layer exhibiting an array of microimage elements. The array of cylindrical lenses 33 are applied in overlapping alignment with the print layer such that the lenses 33 and the microimage elements of the print layer cooperate to exhibit an optically variable effect, such as a lenticular image switching effect or moiré magnification effect. The height of the raised platform 21*a* is such that the decorative layer 35 lies substantially within the focal plane of the cylindrical lenses Such a device will exhibit an (e.g. screened) image due to the presence of raised elements 21-1, 21-2 together with the optically variable effect generated by the cooperation of the cylindrical lenses 33 and decorative layer 35. This generates a particularly secure device that is difficult to counterfeit.

In variations of this embodiment, the decorative layer may be formed on the opposing surface. In such cases, the formation of the surface relief structure 20 and the formation (e.g. printing) of the decorative layer may be performed simultaneously, taking place at the same position along the machine direction, at the same time. This achieves the highest level of registration between the two constituent parts of the security device, since there can be no slippage or distortion of the substrate occurring after one step is performed and before the other (since there is no interval between them). Suitable apparatus for performing simultaneous cast-curing and printing on opposite sides of a substrate is disclosed in WO-A-2018/153840 and WO-A-2017/009616. The level of registration that can be provided by simultaneous casting and printing using the apparatus disclosed therein cannot be achieved on a web press or in two separate processes.

Figure 35A:
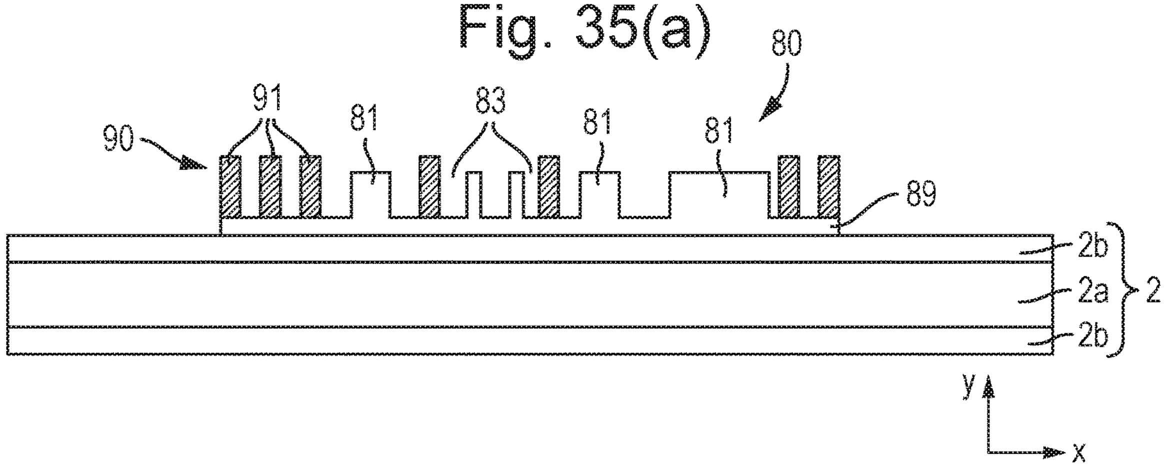
FIGS. 35(*a*) to (*c*) illustrate cross-sectional views through security devices according to the invention comprising an embossed structure.
Figure 35B:
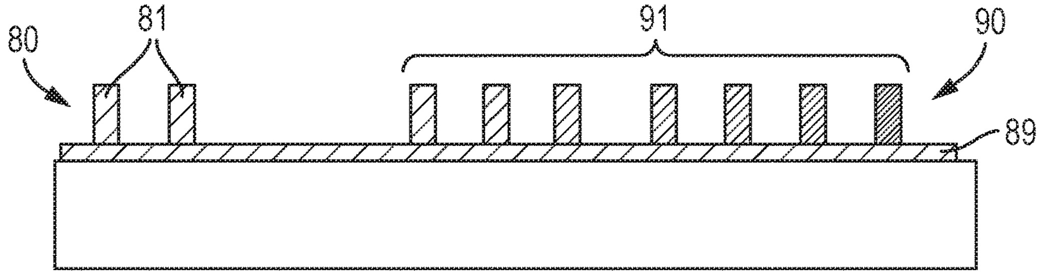
Figure 35C:
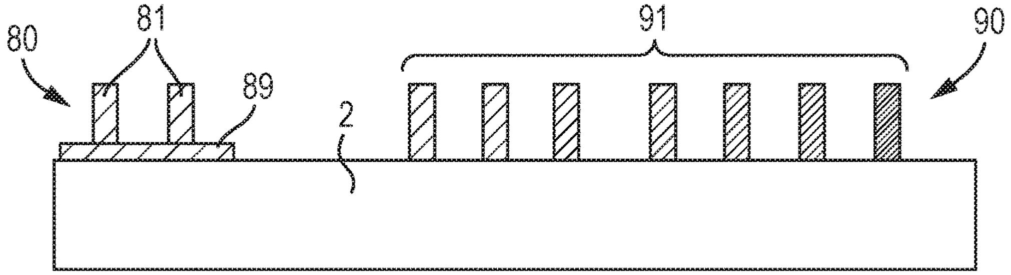

Thus far we have considered ways in which the security level of the device may be raised by the addition of a sub-structure. FIG. 35(*a*) shows an example in which the security device comprises both a cast-cured structure (shown generally at 80) and an inked embossing (shown generally at 90) formed by intaglio. In FIG. 35(*a*), the intaglio elements 91 are arranged on top of the cast-cured structure 80, in the recesses 83 between raised protrusions 81, with the intaglio elements being disposed on the base layer 89 of the cast-cured structure 80. The cast-cured structure 80 may be formed of an elastomeric cured material (examples may be found in WO2017/009620; e.g. page 34, line 22 to page 35, line 11) to facilitate the intaglio printing process after the cast-cure structure has been laid down, although this is not essential. FIG. 35(*b*) illustrates a further example in which the intaglio elements 91 are disposed on the base layer of the cast-cured structure 80. In the example of FIG. 35(*b*), the intaglio elements 91 are laterally spaced from the raised protrusions 81 of the cast structure 80, rather than being fully integrated with the cast structure as in FIG. 35(*a*).

In other embodiments, the inked embossing 90 formed by intaglio may be provided adjacent the cast-cure structure, as shown in FIG. 35(*c*) where the intaglio elements 91 are disposed directly on the substrate 2. In FIG. 35(*c*) the cast structure 80 and the inked embossing are laterally spaced, although in alternative embodiment they may abut each other.

The use of an embossed structure in addition to the surface relief structure formed by cast-cure advantageously provides further tactile and/or optical effects that may be perceived by the authenticator. Typically, the elements of the inked embossing will define elements of an image such that the inked embossing exhibits an image, which may complement or be a constituent part of an image exhibited by the cast-cured structure for example.

Figure 36:
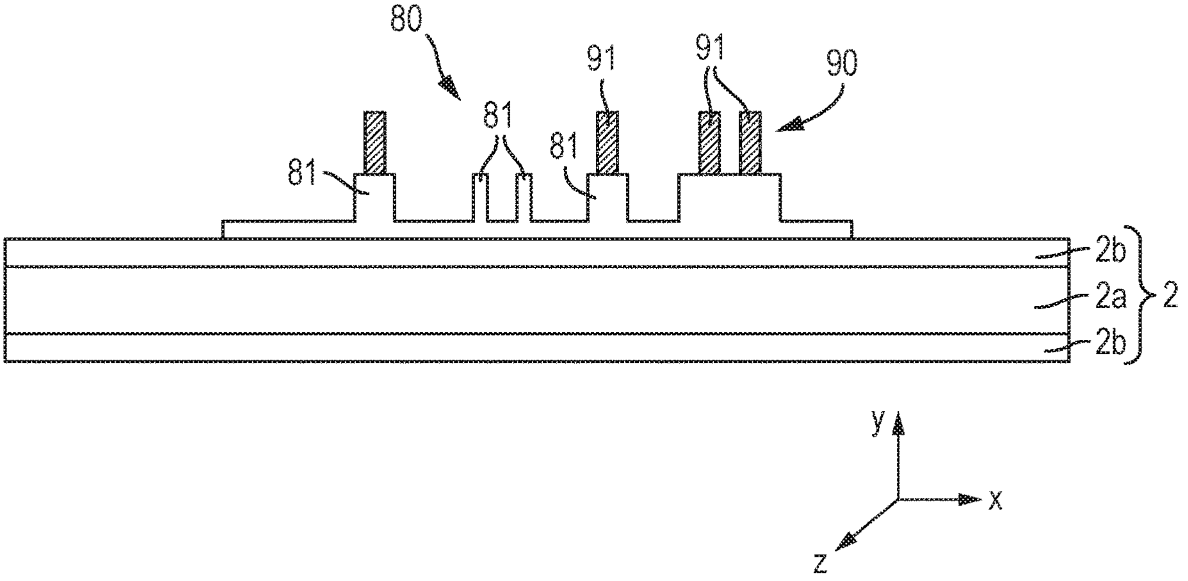
FIGS. 36 to 42 show further cross-sections of devices according to the invention that comprise an embossed structure.

FIG. 36 illustrates a further example in which the security device comprises both a cast-cured structure 80 and an inked embossing 90 formed by intaglio, in which the intaglio elements 91 are arranged only on the tops of the raised protrusions 81 of the cast-cured structure. It is noted that the registration of the intaglio elements 91 to the features of the cast-cured structure 80 (e.g. the intaglio elements being positioned only within the recesses or only on the tops of the cast elements 81) is shown in one direction (parallel to the x axis). However, such registration may also be in any direction relative to the cast structure 80, for example parallel to the z-axis.

Figure 37:
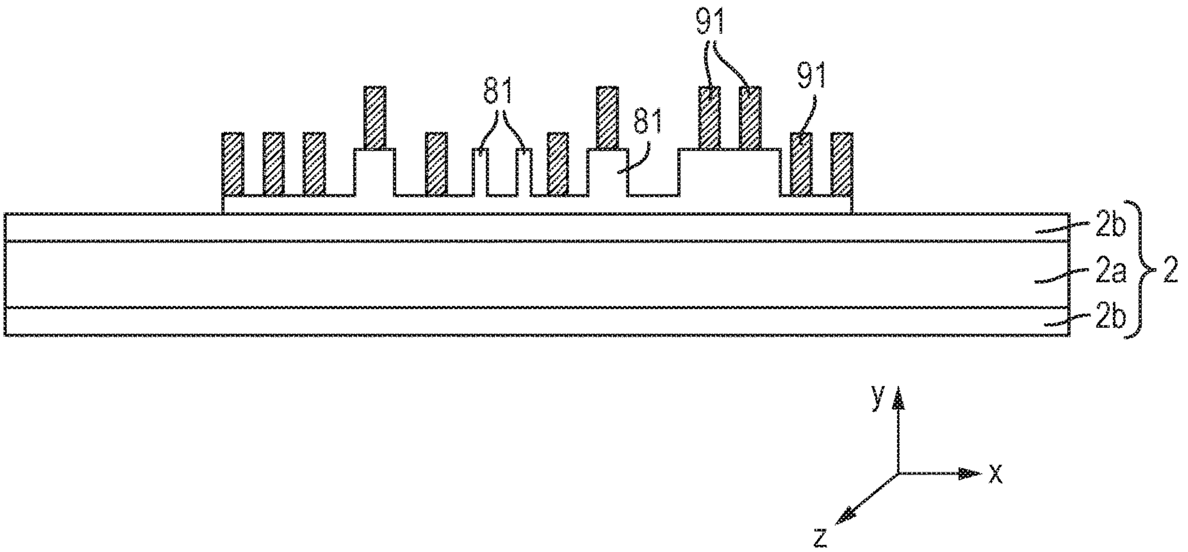

FIG. 37 shows a further example in which the intaglio elements 91 are located both on the tops of the raised protrusions 81 of the cast-cured structure, as well as within the recesses between them.

Figure 38A:
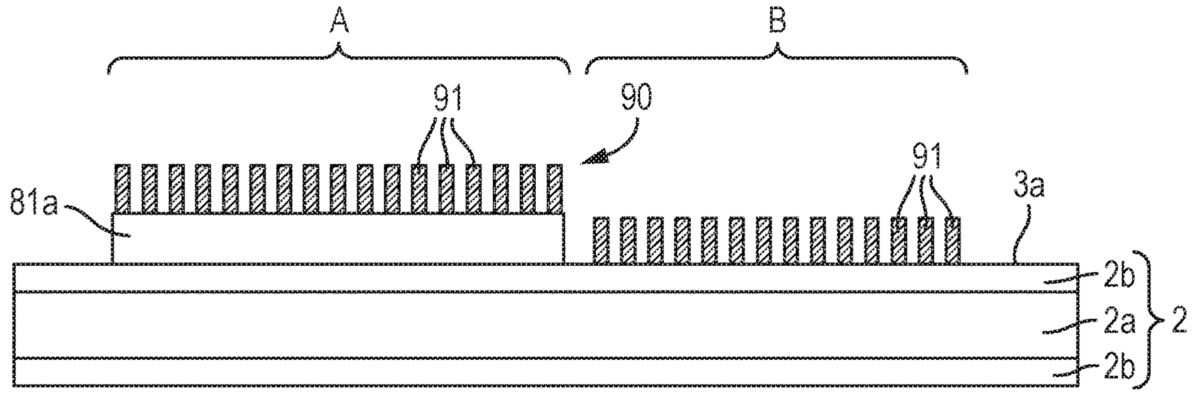
Figure 38B:
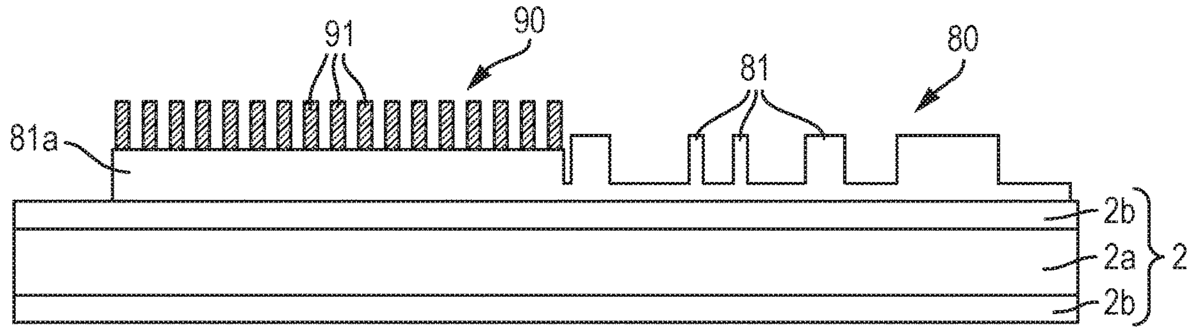
Figure 38C:
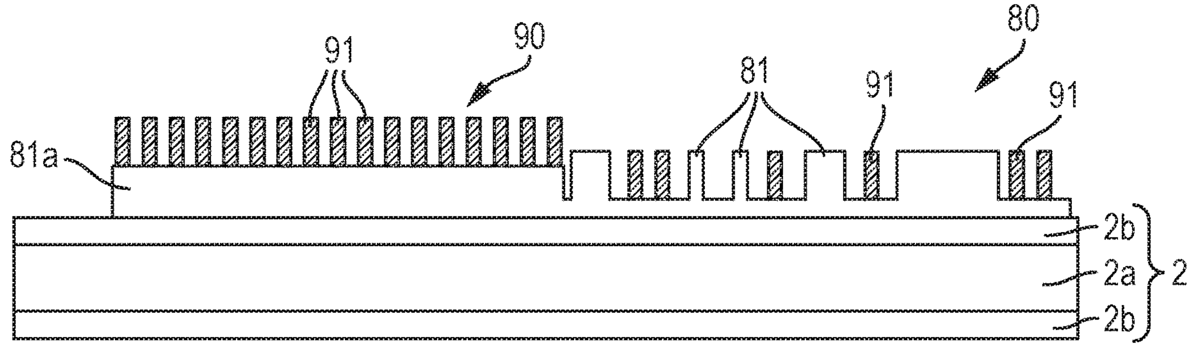

FIGS. 38(*a*) to 38(*c*) illustrate further developments of the invention, where the cast-cured structure 80 comprises a raised platform 81*a*, and the intaglio working is applied over the raised platform. In FIG. 38(*a*), the intaglio elements 91 are applied both over the raised platform 81*a* (region A), as well as within a region B that is adjacent to the cast platform. In other words, the intaglio elements 91 in region B are formed directly on the surface 3*a* of the substrate 2. The intaglio working in region B may be formed separately to that in region A; for example it may be provided before the casting of the raised platform 81*a* and subsequent provision of the intaglio elements 91 in region A. However, preferably the intaglio elements in both regions A and B will be applied in the same working, which advantageously allows the provision of intaglio elements 91 at different heights using one intaglio plate or blanket. FIGS. 38(*b*) and 38(*c*) illustrate variations in which the cast-cured structure 80 comprises a plurality of raised protrusions 81 adjacent to the raised platform 81*a*, corresponding to elements of a screened image. In FIG. 38(*b*), the intaglio elements 91 are provided only on the raised platform, whereas in FIG. 38(*c*), the intaglio elements are disposed across both the raised platform 81*a* and the region of raised elements 81.

Figure 39:
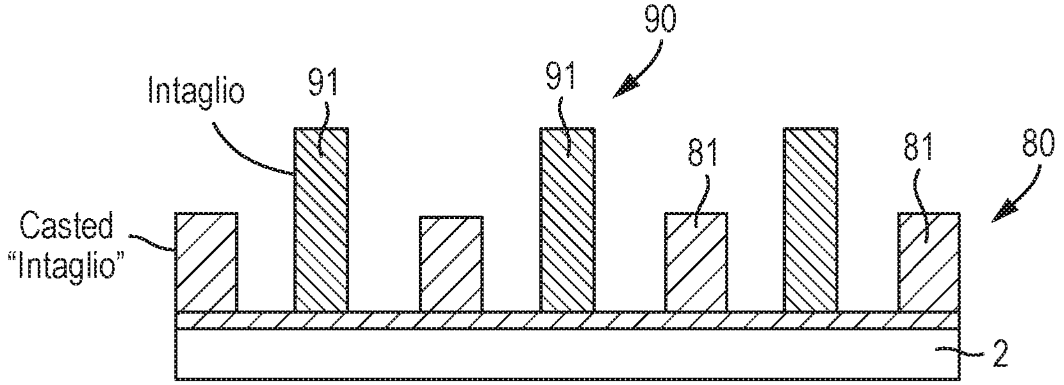
Figure 40:
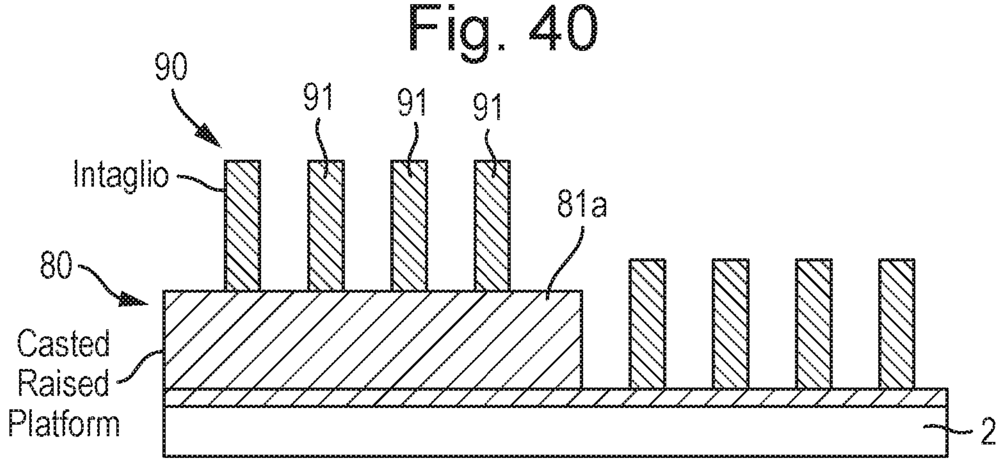

FIGS. 39 and 40 show further examples in which the security device comprises both a cast-cured structure 80 and an inked embossing 90 formed by intaglio. In FIG. 39, the intaglio elements 91 are arranged on top of the cast-cured structure 80, in the recesses between raised protrusions 81. In the FIG. 40 example, the cast-cured structure defines at least one raised planform 81*a* and the intaglio 90 is applied over both it and an adjacent base layer region 89. In this way the cast-cure can be used to improve the achievable height ranges of the elements.

Figure 41:
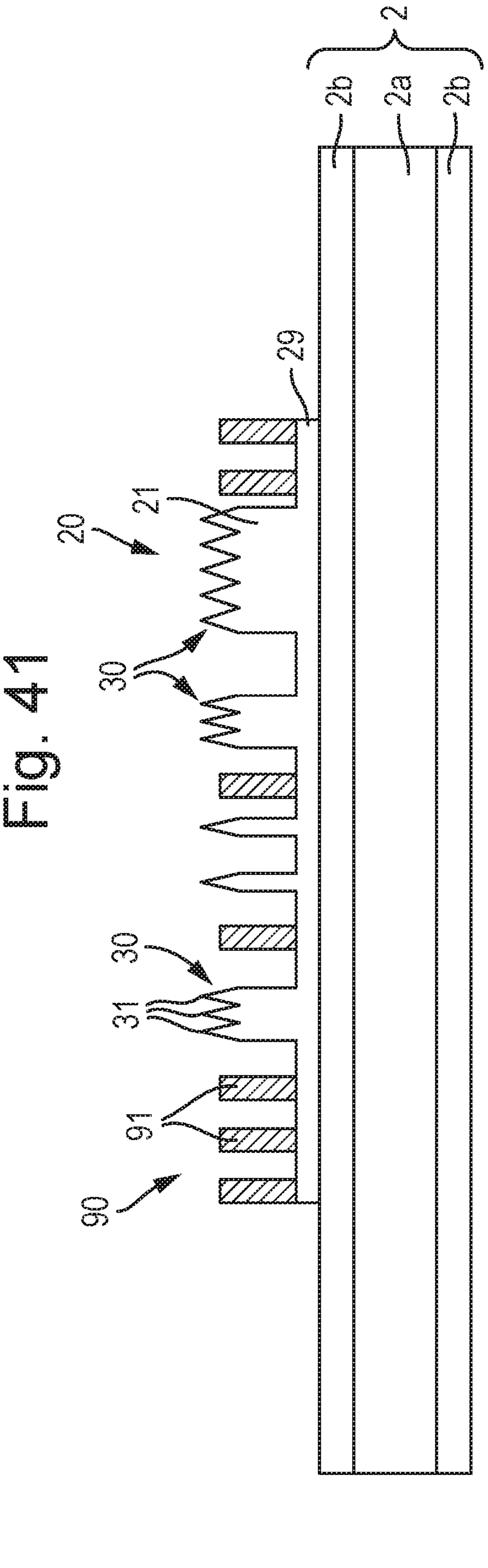
Figure 42:
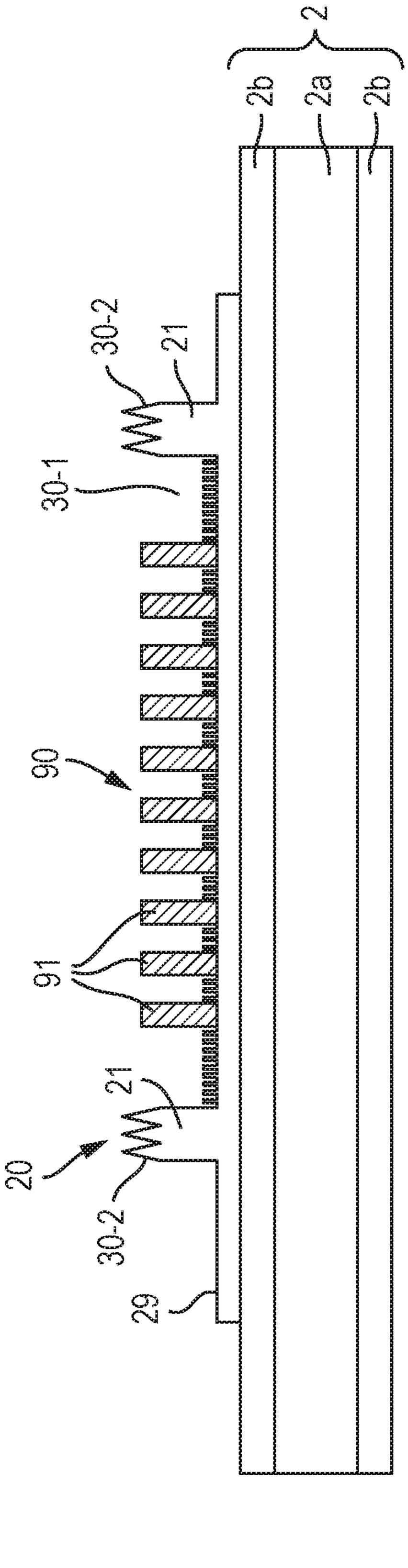

FIGS. 41 and 42 illustrate examples of security devices in which the cast-cured structure is in the form of a surface relief structure 20 comprising tactile structures 30 as has previously been described. In FIG. 41, the cast surface relief structure 20 comprises a plurality of raised protrusions 21 with tactile structures 30 disposed on the tops of the raised protrusions only. The intaglio working 90 is registered with the surface relief structure 20 such that the intaglio elements 91 are disposed only within the recesses between the raised protrusions 21. An authenticator running their finger over the structure shown in FIG. 41 will experience perceptible differences in tactility due to the difference in size and shape between the intaglio elements 91 and the tactile structures 30 of the cured surface relief structure.

The embossed structure may be applied over a sub-structure of the cast surface relief structure 20. An example of this is illustrated in FIG. 42, where the cured surface relief structure 20 comprises a secondary set of relief elements defining a tactile structure 30-1 within the recess between raised elements 21, the intaglio elements 91 being formed on top of the tactile structure 30-1. In other variations, the embossed elements may be formed on the tactile structures 30-2 disposed on the tops of the primary relief elements 21 of the cast structure.

In each of FIGS. 35 to 42, the embossed structure has been an inked embossing. Typically, the ink will carry a colour visible to the naked eye under at least some viewing conditions (typically white light illumination). Particularly in embodiments in which the cast surface relief structure also carries a colour, this allows complex colour effects to be generated, for example the provision of colour images. In variants of these examples, the intaglio embossing could be a blind emboss, i.e. without ink.

It is noted that FIGS. 35 to 42 do not illustrate the embossed nature of the substrate that will be present in practice (and schematically shown in FIG. 2(*b*)) due to the intaglio process. Preferably, in embodiments comprising both a cast structure and an embossed structure, the cured resin of the cast structure is at least as flexible (i.e. has the same flexibility or more flexible) than the substrate.

Figure 43:
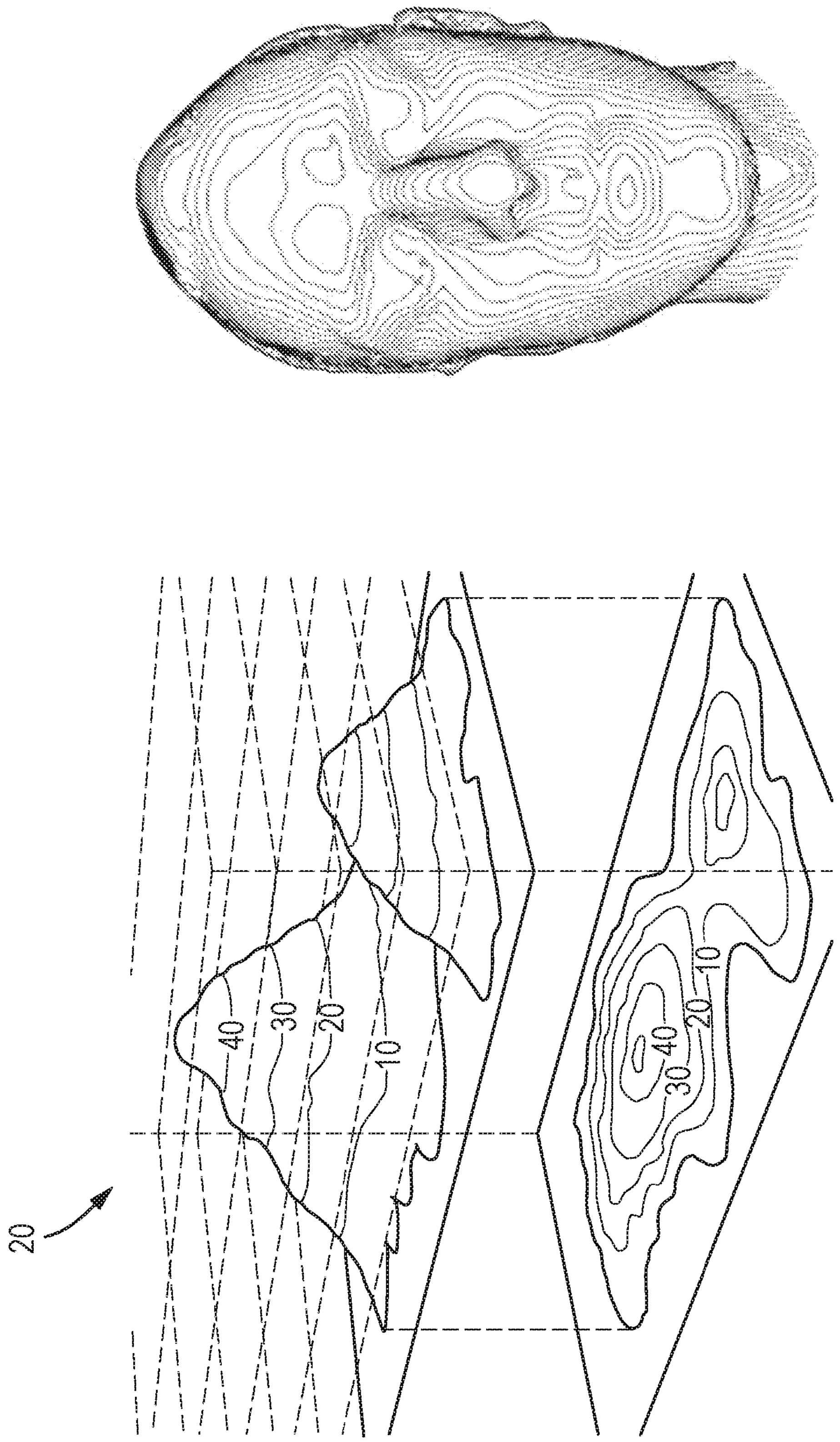
FIG. 43 shows a device according to a further aspect of the invention.
Figure 44A:
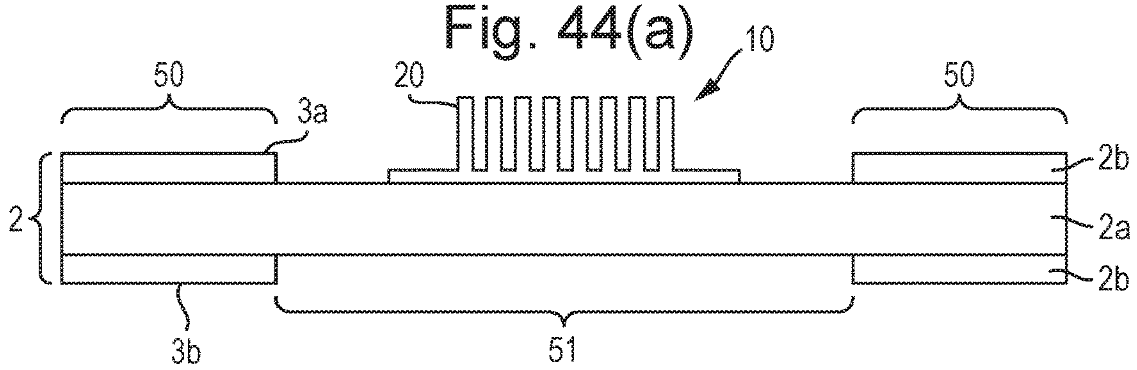
FIGS. 44(*a*) to 44(*e*) illustrate further embodiments of security devices according to the invention, in cross-section.
Figure 44B:
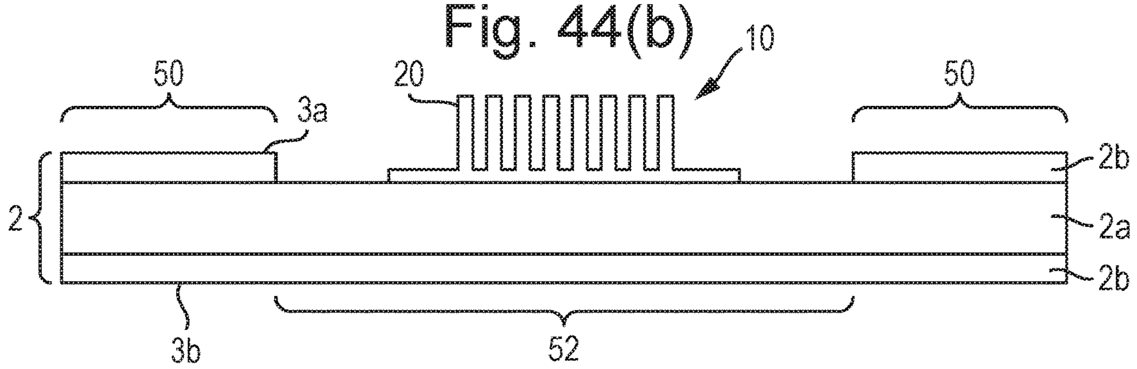
Figure 44C:
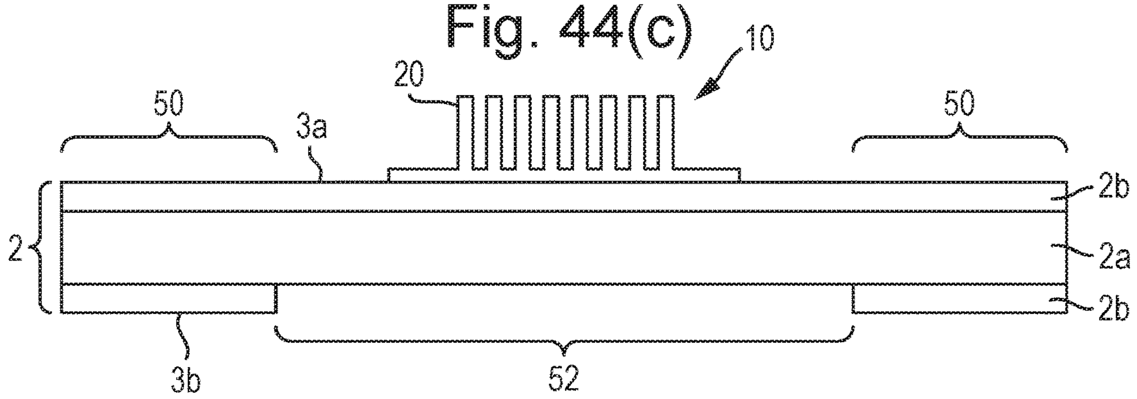
Figure 44D:
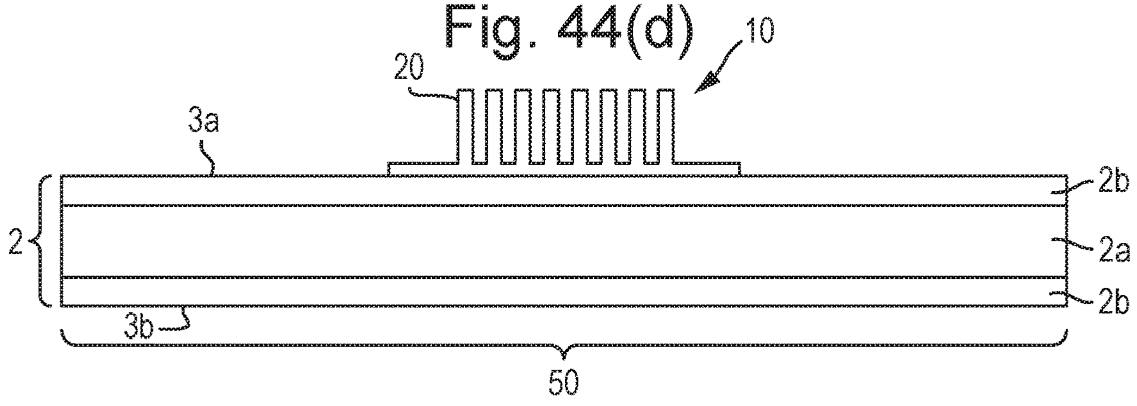
Figure 44E:
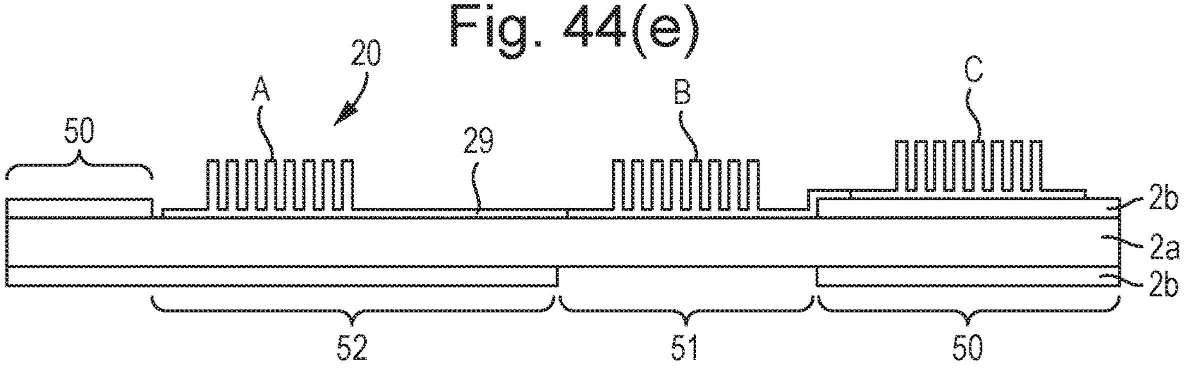

FIG. 43 depicts a further alternative in which the cast-cure structure is configured so as to vary in height so as to follow the contours of a 3D image, such as a face (portrait), a mountain or other object. Here, the surface relief structure 20 comprises multiple sub-structures that contribute to defining a whole three dimensional profile with tactility.

Figure 45:
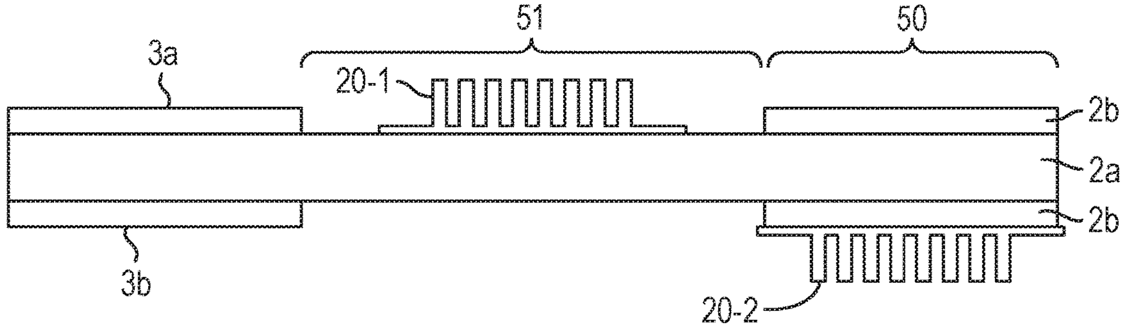
FIG. 45 shows, in cross section, a further embodiment of a security device according to the invention.
Figure 46A:
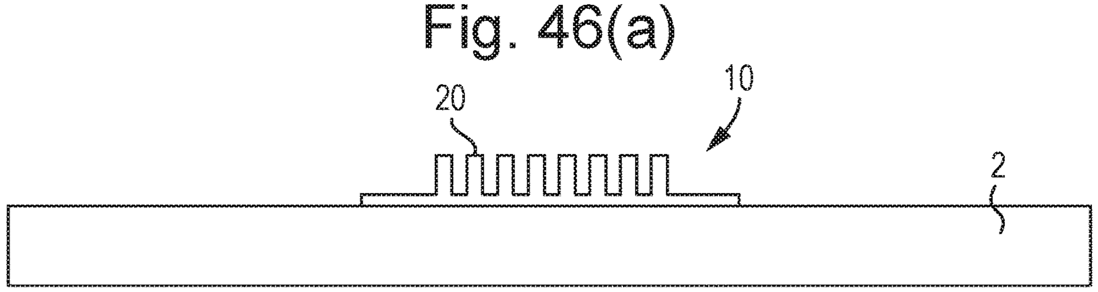
FIGS. 46(*a*) and 46(*b*) show, in cross-section, further embodiments of security devices according to the invention.
Figure 46B:
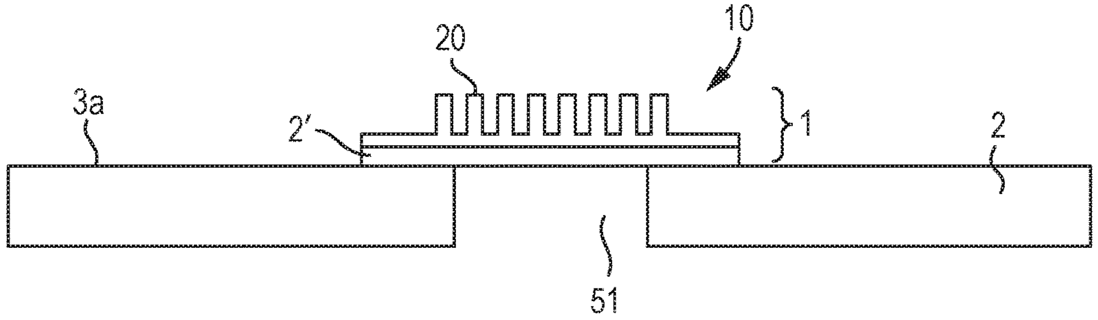

In general, the security device 10 of the present invention may be provided within a window region, half-window region or a non-window region of the substrate (or a combination thereof), and some examples of possible configurations are shown in FIGS. 44 to 46. For simplicity the surface relief structures are only depicted schematically.

In each of FIGS. 44(*a*) to 44(*e*), the substrate 2 is depicted as a multilayer substrate comprising a transparent core substrate 2*a* of a polymer such as BOPP with opacifying layers 2*b* arranged on each side thereof. FIG. 44(*a*) depicts a security device 10 arranged in a window region 51 of the substrate 2, i.e. where both opacifying layers 2*b* are absent so that the substrate is locally transparent. Regions of the substrate 2 having its standard, base level of opacity are referred to as non-window regions 50. In the examples shown, this corresponds to regions where both the opacifying layers 2*b* on the two sides 3*a*, 3*b* of the substrate are uniformly present. In FIG. 44(*a*), the window region 51 is surrounded by non-window regions 50. In these non-window regions the substrate 2 has its highest level of opacity.

In FIG. 44(*b*), the device 10 is located in a half-window 52, i.e. where one of the opacifying layers 2*b* is absent and the other present. Thus, the half-window region 52 is translucent rather than transparent, and has a lower opacity than the surrounding non-window regions 50. In this example, the half window region 52 is formed by locally omitting the opacifying layer 2*b* on the first surface 3*a* of the substrate so that the surface relief structure is formed directly on the surface of transparent core substrate 2*a* (optionally via a primer layer or other surface treatment). The reverse arrangement is shown in FIG. 44(*c*), where the half-window is formed by retaining the opacifying layer on the first surface 3*a* of the substrate and omitting it from the second surface 3*b*.

FIG. 44(*d*) illustrates a security device located within a non-window region 50 of the substrate 2. The non-window region may be opaque if desired, in which case the optical effect exhibited by the surface relief structure will be visible in reflected light only. In some embodiments it may be desirable that the non-window region 50 in which the security device is located has a sufficiently low level of opacity such that the security device 10 may be viewed in transmitted light. Standard polymer banknote substrates and conventional paper banknote substrates typically meet this requirement.

FIG. 44(*e*) schematically illustrates a more complex example, in which the same surface relief structure 20 is formed across different regions of the substrate 2. Here, the surface relief structure in the form of a continuous block of cured material comprises three laterally separate regions of relief elements (shown generally at A, B and C), joined by the base layer 29. In this example, the relief elements of region A are disposed in half-window region 52; the relief elements of region B are disposed in window region 51; and the relief elements of region C are disposed in non-window region 50.

As mentioned, more than one opacifying layer may be present on each side of the core substrate in order to provide the desired level of opacity.

In some embodiments, two or more surface relief structures 20-1, 20-2 may be provided on opposing sides of a security document substrate, as shown in FIG. 45. Here the two surface relief structures define separate security devices, with surface relief structure 20-1 disposed in a window region 51 on the first surface 3*a* of the substrate and surface relief structure 20-2 disposed in a non-window region 50 on the opposing surface 3*b* of the substrate.

In other embodiments, such as is shown in FIG. 46(*a*), the security device 10 could be formed on a conventional document substrate 2. Such substrates are typically fibrous in nature, comprising for instance paper or regenerated cellulose as described in WO2020/156655.

In all of the embodiments described so far, as noted at the outset, it has been assumed that the security device is formed on a substrate 2 which also acts as the document substrate for the eventual security document 100. Suitable document substrates include polymer document substrates of the type already referred to above, where the substrate 2 comprises a core substrate of a transparent polymeric material such as polypropylene (PP) (most preferably bi-axially oriented PP (BOPP)), polyethylene terephthalate (PET), polyethylene (PE), polycarbonate (PC), polyvinyl chloride (PVC), nylon, acrylic, Cyclic Olefin Polymer (COP) or Cyclic Olefin Copolymer (COC), or any combination thereof. The polymer substrate 2*a* may be monolithic, e.g. formed from a single one of the above materials, or multi-layered, e.g. having multiple layers of the same type of polymer (optionally with different orientations) or layers of different polymer types. As mentioned previously, by "transparent" it is meant that the polymer substrate 2*a* is substantially visually clear, although it may carry a coloured tint and/or another optically detectable substance such as a fluorescent material.

One or both surfaces of the polymer substrate 2*a* may be treated to improve adhesion/retention of subsequently applied materials. For example, a primer layer may be applied to all or part of either surface of the polymer substrate 2*a*, e.g. by printing or coating. The primer layer is preferably also transparent and again could be tinted or carry another optically detectable material. Suitable primer layers include compositions comprising polyethylene imine, hydroxyl terminated polymers, hydroxyl terminated polyester based co-polymers, cross-linked or uncross-lined hydroxylated acrylates, polyurethanes and UV curing anionic or cationic acrylates.

Alternatively or in addition to the application of a primer layer, the surface of the polymer substrate 2*a* may be prepared for onward processing by controlling its surface energy. Suitable techniques for this purpose include plasma or corona treatment.

The opacifying layer(s) 2*b* each comprise a non-transparent material, the primary purpose of which is usually to provide a suitable background for later printing of graphics thereon. Thus, preferably, the opacifying layers comprise polymeric, non-fibrous material containing at least a light scattering substance such as a pigment. The opacifying layers 2*b* are preferably light in colour, most preferably white or another light colour such as off-white or grey so that a later-applied graphics layer will contrast well against it. In preferred examples, the opacifying layers each have a brightness L* in CIE L*a*b* colour space of at least 70, preferably at least 80 and more preferably at least 90. For example, each opacifying layer may comprise a resin such as a polyurethane based resin, polyester based resin or an epoxy based resin and an opacifying pigment such as titanium dioxide ($TiO_2$), silica, zinc oxide, tin oxide, clays or calcium carbonate.

Two or more opacifying layers may be applied to each surface of the polymer substrate 2*a*, in order to achieve the necessary opacity. The optical density of each layer by itself may typically be around 0.2 to 0.5. Preferably, three or more layers are applied to each surface, overlapping one another.

In a preferred embodiment, at least one of the opacifying layers (preferably one on each surface of the polymer substrate 2*a*) is made electrically conductive, e.g. by the addition of a conductive pigment thereto. This reduces the effect of static charges which may otherwise build up on the security document during handling.

The opacifying layers 2*b* are preferably applied to the polymer substrate 2*a* before the manufacture of the presently disclosed security device 10, using a printing process such as gravure printing, although in other cases the opacifying layers could be coated onto the substrate, or applied by offset, flexographic, lithographic or any other convenient method. Depending on the design of the security document, the opacifying layers may be omitted across gaps on one or both surfaces of the polymer substrate to form window regions (which may be full windows or half windows, or a mixture of both) as described above. This can be achieved through appropriate patterning of the opacifying layers during the application process. In alternative constructions, the opacifying layers 2*b* could comprise self-supporting pre-formed layers (optionally including apertures to later form windows) which are then laminated to the polymer substrate 2*a*. In this case, the opacifying layers could be polymeric or could be of fibrous construction, such as paper, thus rendering the security document a "hybrid" paper/polymer construction.

It is also possible to form the security device 10 on a substrate other than the document substrate 2. For instance, the security device 10 can be formed on its own substrate, resulting in a security article 1 such as a security thread, strip, foil or patch. The security article can then be affixed to or incorporated into a security document 100, e.g. by adhesive or via hot or cold stamping. An example of this is shown in FIG. 46(*b*), where the security device 10 is formed on a secondary substrate 2' such as a transparent polymer film (e.g. PET). This will typically be thinner than a document substrate 2 (e.g. of the order of 30 to 50 microns thick rather than 100 microns or greater). The surface relief structure 20 is formed on a first surface of the substrate 2'.

In this example, the security article 1 is shown to be affixed to a first surface 3*a* of the security document substrate 2 with the security device 10 (or at least a part thereof) over a window region 51 of the document formed by an aperture through the document substrate 2, as may typically be the case where the document substrate 2 is paper or similar. It is also possible to locate a security article 1 of this sort with the security device 10 in a non-window region 50 of the document substrate 2. Security articles 1 can alternatively be applied to polymer type document substrates, in window regions, half-window regions and/or non-window regions thereof.

In a further example, the secondary substrate 2' may be affixed to the document substrate 2 and then the surface relief structure 20 formed over the secondary substrate. The surface relief structure may be disposed only on the secondary substrate 2', or over a combination of the secondary substrate (fully or partially) and the document substrate.

Suitable apparatus, materials and methods for forming the relief structures disclosed herein are described in WO-A-2018/153840 and WO-A-2017/009616. In particular, the relief structures can be formed by the in-line casting devices detailed in WO-A-2018/153840 (e.g. that designated 80 in FIG. 4 thereof), using an embossing tool 85 carrying an appropriately designed micro-optical structure from which can be cast the desired relief structure shape. Similarly, the cast-curing apparatuses and methods disclosed in section 2.1 of WO-A-2017/009616 (e.g. in FIGS. 4 to 8 thereof) can also be used to form the presently disclosed relief structures, by replacing the relief 225 carried on casting tool 220 with an appropriate relief from which can be cast the desired shapes. In particular it will be noted that whilst WO-A-2017/009616 describes the use of the apparatus to form focussing elements, the same apparatus can be used to form any desired relief structure by appropriate reconfiguration the relief 225, including that envisaged herein.

Whichever casting apparatus is used, the curable material(s) from which the relief structure is cast may be applied either directly to the tool carrying the desired relief shape (e.g. to the embossing tool 85 of WO-A-2018/153840 or to the casting tool 220 of WO-A-2017/009616), or the curable material(s) may be applied directly to the substrate on which the relief structure is to be formed, and then brought into contact with the tool (e.g. by impressing the tool onto the deposited curable material). Both options are described in the aforementioned documents. Preferably, the latter option is employed and the curable material(s) are applied to the substrate by screen printing as detailed in WO-A-2018/153840, before being formed into the desired relief structure. If the former option is employed, it should be noted that there is preferably no wiping of the casting tool surface relief between applying the curable material to it, and bringing it into contact with the substrate, so that a base layer of curable material remains connecting the protrusions (e.g. raised elements) of the relief structure together on the substrate (the base layer will be of much lesser height than the protrusions).

Suitable curable materials are disclosed in WO-A-2017/009616, section 2.1. UV-curable materials are most preferred. Curing of the material(s) preferably takes place while the casting tool is in contact with the curable material, against the substrate.

In all of the above methods, the curable material in which the surface relief structure 20 is formed can be of various different compositions. The curable material is preferably radiation-curable and may comprise a resin which may typically be of one of two types, namely:

a) Free radical cure resins, which are typically unsaturated resins or monomers, pre-polymers, oligomers etc. containing vinyl or acrylate unsaturation for example and which cross-link through use of a photo initiator activated by the radiation source employed e.g. UV.

b) Cationic cure resins, in which ring opening (e.g. epoxy types) is effected using photo initiators or catalysts which generate ionic entities under the radiation source employed e.g. UV. The ring opening is followed by intermolecular cross-linking.

The radiation used to effect curing will typically be UV radiation but could comprise electron beam, visible, or even infra-red or higher wavelength radiation, depending upon the material, its absorbance and the process used. Examples of suitable curable materials include UV curable acrylic based clear embossing lacquers, or those based on other compounds such as nitro-cellulose. A suitable UV curable lacquer is the product UVF-203 from Kingfisher Ink Limited or photopolymer NOA61 available from Norland Products. Inc, New Jersey.

Due to the nature of the cast-cure process, the resulting relief structure will typically include a base layer of material on top of the substrate, connecting the protrusions of the relief at their base. In many cases this base layer is integral with the relief structure and formed of the same curable material(s), resulting from either the shape of the casting relief and/or the manner in which the curable material is pressed between the substrate and the casting tool during processing. An example of such a base layer and its formation is disclosed in WO-A-2017/009619, FIG. 8. It is also possible to provide (alternatively or in addition) a base layer in the form of a pedestal layer, applied in a preceding step. Apparatus and methods for providing such a pedestal layer are disclosed in WO-A-2017/09620, FIGS. 8 to 12.

WO-A-2018/153840 and WO-A-2017/009616 also disclose print stations, which may be disposed downstream of the above-described casting apparatus (but alternatively could be located upstream). Print stations such as these are suitable for applying any print elements mentioned herein, to the same side of the substrate as the cast relief structure, or to the opposite side. The apparatus disclosed in WO-A-2018/153840 can achieve particularly high registration between such cast relief structures and the printed elements.

Figure 47A:
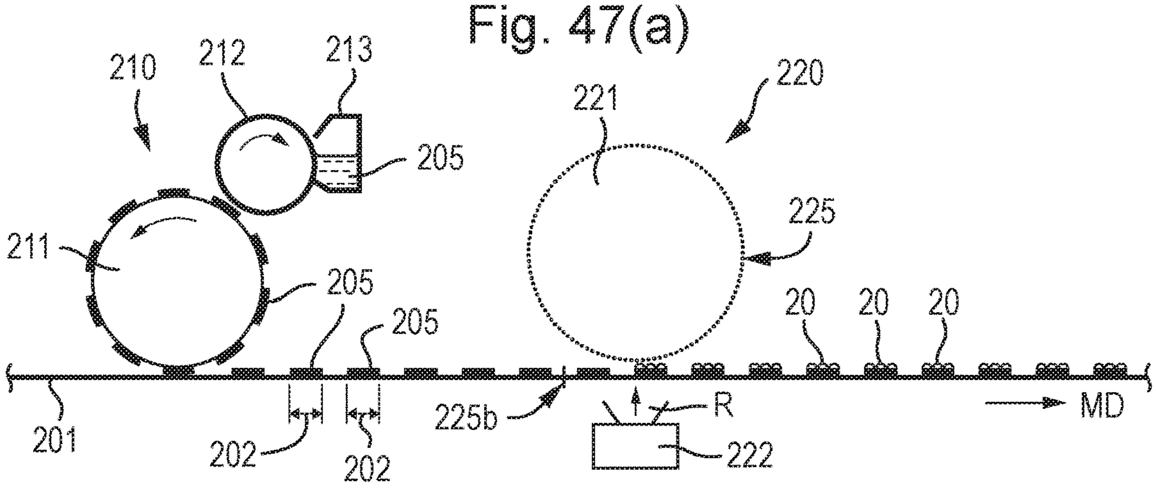
FIG. 47 illustrates one possible method of forming a surface relief structure according to the invention using a cast cure process.
Figure 47B:
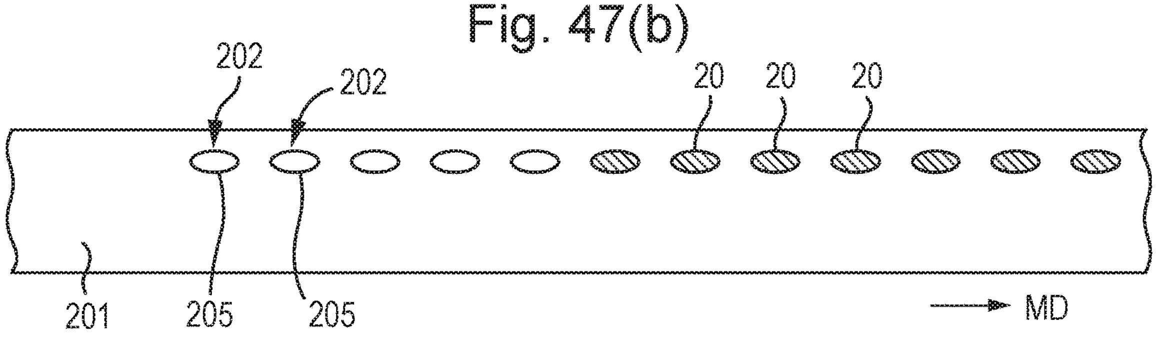

An example of a suitable cast-cure process for forming surface relief structures 20, 80 suitable for use in the security devices disclosed herein will be described with reference to FIGS. 47(*a*) and (*b*) hereto, which show the structure 20 only schematically. The process is shown as applied to a support layer 201, comprising a transparent or translucent film, which may be the aforementioned document substrate 2 or could be another substrate 2' which is either attached to or incorporated within the document substrate, or is later applied to the document substrate 2. FIG. 47(*a*) depicts the apparatus from a side view, and FIG. 47(*b*) shows the support layer in a perspective view, the manufacturing apparatus itself being removed for clarity.

A curable material 205 is first applied to the support layer 201 using an application module 210 which here comprises a patterned print cylinder 211 which is supplied with the curable material from a doctor chamber 213 via an intermediate roller 212. For example, the components shown could form part of a screen printing system. Other printing techniques such as lithographic, flexographic, offset or inkjet printing could also be used. Print processes such as these are preferred since the curable material 205 can then be laid down on the support 201 only in selected regions 202 thereof, the size, shape and location of which can be selected by control of the print process, e.g. through appropriate configuration of the pattern on cylinder 211. However, in other cases, an all over coating method could be used, e.g. if the surface relief structure is to be formed all over the support 201. The curable material 205 is applied to the support 201 in an uncured (or at least not fully cured) state and therefore may be fluid or a formable solid.

The support 201 is then conveyed to a casting module 220 which here comprises a casting tool 221 in the form of a cylinder carrying a surface relief 225 defining the shape of the surface relief structure which is to be cast into the curable material 205. As each region 202 of curable material 205 comes into contact with the cylinder 221, the curable material 205 fills a corresponding region of the relief structure, forming the surface of the curable material into the shape defined by the relief. The cylinder 221 may be configured such that the relief structure 225 is only provided at regions corresponding to the shape and position of the first regions 202 of curable material 205.

Having been formed into the correct surface relief structure, the curable material 205 is cured by exposing it to appropriate curing energy such as radiation R from a source 222. This preferably takes place while the curable material is in contact with the surface relief 225 although if the material is already sufficiently viscous this could be performed after separation. In the example shown, the material is irradiated through the support layer 201 (e.g. the paper or polymer substrate is sufficiently transparent to the curing radiation for the curing to take place) although the source 222 could alternatively be positioned above the support layer 201, e.g. inside cylinder 221 if the cylinder is formed from a suitable transparent material such as quartz. In an alternative embodiment, the curable material 205 could be applied directly onto casting tool 221 rather than on to the substrate 201. This could be done in an all-over or pattern-wise manner.

Figure 48:
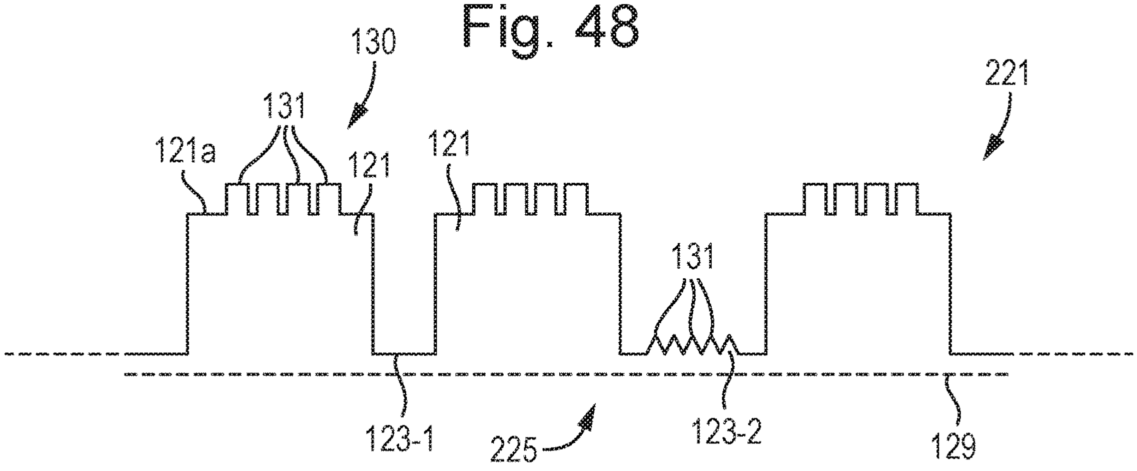
FIG. 48 is a schematic enlarged view of a portion of an example casting tool that may be used to form a surface relief structure according to the present invention.

FIG. 48 is a schematic cross-sectional view of a portion of an example casting tool 221 showing the surface relief 225 in more detail. The surface relief 225 of the casting tool comprises a plurality of trenches 121. The base 121*a* of each trench 121 comprises a sub-structure 130 comprising a plurality of sub-structure elements 131. Consequently, when the curable material 205 comes into contact with the surface relief 225 of the casting tool 221, a surface relief structure will be formed in the curable material that comprises a plurality of raised protrusions 21 having dimensions and shape corresponding to those of the trenches 121, with each raised protrusion having a plurality of tactile protrusions 31 on their tops having dimensions and shape corresponding to those of the elements 131 of the sub-structure of the casting tool. Thus, the sub-structure elements 131 of the casting tool typically have a depth between 2 μm and 75 μm, preferably between 2 μm and 25 μm, more preferably between 2 μm and 10 μm and a width of between 2 μm and 75 μm, preferably between 2 μm and 25 μm, more preferably between 2 μm and 10 μm. The trenches 121 preferably have a depth in in the range of 20 μm to 200 μm, preferably 20 μm to 150 μm, more preferably 20 μm to 100 μm and even more preferably 20 μm to 50 μm, and a width in the range of 20 μm-8 mm, more preferably 30 μm-3 mm, even more preferably 30 μm-1 mm even more preferably 50 μm-500 μm. The raised areas ("spaces") between the trenches of the surface relief structure will correspond to the base layer of the final surface relief structure. These may form a uniform region of base layer in the final surface relief structure (123-1), or alternatively the casting tool 221 may comprise a sub-structure formed of a plurality of sub-structure elements 131 as shown at 123-2 such that the final surface relief structure of cured material exhibits a tactile structure in a recesses between the primary elements. Due to the nature of the cast-cure process, the surface relief structure 225 defined in the casting tool 221 will be replicated exactly in the final device.

Typically, in embodiments in which the curable material is applied directly onto casting tool 221, the curable material is applied so as to substantially fill the trenches 121, as well as form a thin layer of curable material over raised areas of the surface of the casting tool 221, as schematically shown at 129 in FIG. 48. Following the casting process, this thin layer of curable material 129 forms the integral base layer of the surface relief structure. In alternative methods, the curable material 205 may be applied to the casting tool so as to be present only within the trenches 121, for example by using a doctor blade or other removal means to remove layer 129. In such examples, a tie-coat layer is then applied over substantially the whole surface of the die form 221, i.e. coating both the filled recessed areas of the trenches and the raised areas between them. The curable material of the tie coat may or may not be of the same composition as the curable material 205 in the trenches. In particularly preferred embodiments, the tie coat composition may be selected so as to improve the adhesion between the curable material 205 and the support layer. The tie coat is applied by a tie coat application module. It is desirable for the tie coat to be applied in a continuous, homogenous manner at the micron level hence it is preferably applied in a metered way via a slot die and transfer roller combination. The tie coat may be partially cured before the casting tool and the substrate are brought into contact.

Suitable substrates on which the disclosed devices can be formed are disclosed in WO-A-2017/009616, section 1, and apparatus/methods for applying opacifying layers thereto in section 4, including the formation of window regions. Preferably, the opacifying layers are applied before formation of the presently disclosed security devices on the substrate. For instance, the sheet material supplied to the apparatus of WO-A-2018/153840 may comprise a polymer substrate of the sort disclosed in WO-A-2017/009616, already provided with one or more opacifying layers. The security devices disclosed herein may be disposed in a window region defined by the opacifying layers, or in a non-window region.

Further exemplary embodiments of the present disclosure are set out in the following numbered clauses:

Numbered Clause 1: A security device, comprising:

a surface relief structure formed of a cured material on a substantially flat substrate, the surface relief structure defining a primary set of relief elements at a first scale and a secondary set of relief elements at a second scale which is smaller than the first, the primary set of relief elements including a plurality of raised protrusions spaced by recesses and the secondary set of relief elements being disposed on the tops of the raised protrusions and/or in the recesses.

Numbered Clause 2. A security device according to Numbered Clause 1, wherein the secondary set of relief elements define tactile structures.

Numbered Clause 3. A security device according to Numbered Clause 2, wherein the tactility level (roughness/smoothness) of the tactile structures is configured to vary across the relief structure, the tops of the raised protrusions in a first region preferably having a higher tactility level than those in a second region of the device.

Numbered Clause 4: A security device according to Numbered Clause 2 or 3, wherein the tactile structures on the tops of the raised protrusions have a higher tactility level than those in recesses between the raised protrusions.

Numbered Clause 5. A security device according to Numbered Clause 1, wherein the secondary set of relief structures define optical elements, preferably prisms, mirrors or focussing elements such as lenses or focussing mirrors.

Numbered Clause 6. A method of manufacturing a security device, comprising forming a surface relief structure on a substantially flat substrate from a curable material and curing the material, wherein the surface relief structure is formed by:

providing a casting tool having a relief structure defined in a surface thereof, the relief structure corresponding to the surface relief structure;

applying the curable material to the substrate or to the relief structure of the casting tool;

bringing the substrate and the casting tool together, to thereby form the curable material in accordance with the relief structure and curing the curable material such that the surface relief structure formed of the cured material is retained on the substrate;

wherein the surface relief structure defines a primary set of relief elements at a first scale and a secondary set of relief elements at a second scale which is smaller than the first, the primary set of relief elements including a plurality of raised protrusions spaced by recesses and the secondary set of relief elements being disposed on the tops of the raised protrusions and/or in the recesses.

Numbered Clause 7. A method according to Numbered Clause 6, configured to provide the security device with the features of any of Numbered Clauses 1 to 5.

Numbered Clause 8. A security device, comprising a surface relief structure formed of a cured material on a substrate and, on or adjacent the cured material on the substrate, an embossed structure.

Numbered Clause 9. A security device according to Numbered Clause 8, wherein the surface relief structure formed of the cured material defines a plurality of raised elements spaced by a recessed base layer and raised portions of the embossing are located on the base layer.

Numbered Clause 10. A security device according to Numbered Clause 8, wherein the surface relief structure formed of the cured material defines at least one platform and an adjacent base layer region, the platform being higher than the base layer region, raised portions of the embossing being located on the platform and/or on the base layer region.

Numbered Clause 11. A method of manufacturing a security device, comprising:

a) forming a surface relief structure on a substrate from a curable material and curing the material, wherein the surface relief structure is formed by:
   a1) providing a casting tool having a relief structure defined in a surface thereof, the relief structure corresponding to the surface relief structure;
   a2) applying the curable material to the substrate or to the relief structure of the casting tool;
   a3) bringing the substrate and the casting tool together, to thereby form the curable material in accordance with the relief structure and curing the curable material such that the surface relief structure formed of the cured material is retained on the substrate; and
b) performing intaglio printing on the substrate to form an inked or un-inked embossing thereon, the embossing being located on or adjacent the surface relief structure.

Numbered Clause 12. A method according to Numbered Clause 11, configured to provide the security device with the features of any of Numbered Clauses 7 to 10.

Numbered Clause 13. A security device, comprising a surface relief structure formed of a cured material on a substantially flat substrate, the surface relief structure following the contours of a three-dimensional image, preferably a portrait.

The invention claimed is:

1. A security device, comprising:

a surface relief structure formed of one or more cured material(s) on a substantially flat substrate, the surface relief structure defining a primary set of relief elements at a first scale and a secondary set of relief elements at a second scale which is smaller than the first, the primary set of relief elements including a plurality of raised protrusions spaced by recesses and the secondary set of relief elements being disposed on a top of at least one of the raised protrusions and/or in at least one of the recesses, wherein the security device exhibits an image, and wherein elements of the image are provided solely by the surface relief structure, wherein the recesses between the raised protrusions comprise a base layer of the cured material(s), or comprise a base layer of a different cured material, whereby the plurality of raised protrusions of the primary set of relief elements are joined by the base layer, the base layer having a lower height than the raised protrusions of the primary set of relief elements, and wherein a height and/or width of the raised protrusions of the primary set of relief elements varies across the surface relief structure.

2. A security device according to claim 1, wherein the secondary set of relief elements define tactile structure(s).

3. A security device according to claim 2, wherein a tactility level of the tactile structures is configured to vary across the surface relief structure.

4. A security device according to claim 2, wherein the tactile structures define a tactility level dependent on at least one of a size, shape, orientation and/or spacing of the secondary set of relief elements.

5. A security device according to claim 2, wherein in at least one region of the surface relief structure the tactile structures have an asymmetrical arrangement whereby a tactility level in a first direction differs from the tactility level in a second direction.

6. A security device according to claim 1, wherein the secondary set of relief elements are in the form of least one of: faceted structures or curved structures.

7. The security device of claim 1, wherein the image elements are line elements, dot elements or define indicia.

8. A security device according to claim 1, wherein at least one of a size, shape, orientation, spacing and/or color density of the raised protrusions varies across the surface relief structure so as to exhibit a multi-tonal version of the image.

9. A security document comprising a document substrate and a security device thereon, the security device being in accordance with claim 1, wherein the document substrate may or may not act as the substrate of the security device.

10. A security device, comprising:

a surface relief structure formed of one or more cured material(s) on a substantially flat substrate, the surface relief structure defining a primary set of relief elements at a first scale and a secondary set of relief elements at a second scale which is smaller than the first, the primary set of relief elements including a plurality of raised protrusions spaced by recesses and the secondary set of relief elements being disposed on a top of at least one of the raised protrusions and/or in at least one of the recesses, wherein the security device exhibits an image, and wherein elements of the image are provided solely by the surface relief structure, wherein the secondary set of relief elements define tactile structures, and wherein a tactility level of the tactile structures is configured to vary across the surface relief structure in a manner dependent on features of a corresponding part of the image, and wherein a height and/or width of the raised protrusions of the primary set of relief elements varies across the surface relief structure.

11. A method of manufacturing a security device, comprising forming a surface relief structure on a substantially flat substrate from one or more curable material(s) and curing the material(s), wherein the surface relief structure is formed by:

providing a casting tool having a relief structure defined in a surface thereof, the relief structure corresponding to the surface relief structure;

applying the one or more curable material(s) to the substrate and/or to the relief structure of the casting tool;

bringing the substrate and the casting tool together, to thereby form the curable material(s) in a manner that conforms to the relief structure and curing the curable material(s) such that the surface relief structure formed of the cured material(s) is retained on the substrate;

wherein the surface relief structure defines a primary set of relief elements at a first scale and a secondary set of relief elements at a second scale which is smaller than the first, the primary set of relief elements including a plurality of raised protrusions spaced by recesses and the secondary set of relief elements being disposed on a top of at least one of the raised protrusions and/or in at least one of the recesses, wherein the security device exhibits an image, and wherein elements of the image are provided solely by the surface relief structure, wherein the recesses between the raised protrusions comprise a base layer of the cured material(s), or comprise a base layer of a different cured material, whereby the plurality of raised protrusions of the primary set of relief elements are joined by the base layer, the base layer having a lower height than the raised protrusions of the primary set of relief elements, and wherein a height and/or width of the raised protrusions of the primary set of relief elements varies across the surface relief structure.

12. A security device, comprising:

a surface relief structure formed of one or more cured material(s) on a substantially flat substrate, the surface relief structure defining a primary set of relief elements at a first scale and a secondary set of relief elements at a second scale which is smaller than the first, the primary set of relief elements including a plurality of raised protrusions spaced by recesses and the secondary set of relief elements being disposed on a top of at least one of the raised protrusions and/or in at least one of the recesses, wherein the security device exhibits an image, and wherein elements of the image are provided solely by the surface relief structure, wherein the recesses between the raised protrusions comprise a base layer of the cured material(s), or comprise a base layer of a different cured material, whereby the plurality of raised protrusions of the primary set of relief elements are joined by the base layer, the base layer having a lower height than the raised protrusions of the primary set of relief elements, wherein the secondary set of relief elements define tactile structure(s), and wherein in at least one region of the surface relief structure the tactile structures have an asymmetrical arrangement whereby a tactility level in a first direction differs from the tactility level in a second direction.

13. A security device, comprising:

a surface relief structure formed of one or more cured material(s) on a substantially flat substrate, the surface relief structure defining a primary set of relief elements at a first scale and a secondary set of relief elements at a second scale which is smaller than the first, the primary set of relief elements including a plurality of raised protrusions spaced by recesses and the secondary set of relief elements being disposed on a top of at least one of the raised protrusions and/or in at least one of the recesses, wherein the security device exhibits an image, and wherein elements of the image are provided solely by the surface relief structure, wherein the secondary set of relief elements define tactile structures, and wherein a tactility level of the tactile structures is configured to vary across the surface relief structure in a manner dependent on features of a corresponding part of the image, wherein the secondary set of relief elements define tactile structure(s), and wherein in at least one region of the surface relief structure the tactile structures have an asymmetrical arrangement whereby a tactility level in a first direction differs from the tactility level in a second direction.

* * * * *